US012417888B2

(12) United States Patent
Yoo et al.

(10) Patent No.: US 12,417,888 B2
(45) Date of Patent: Sep. 16, 2025

(54) ARC PATH FORMATION UNIT AND DIRECT CURRENT RELAY INCLUDING SAME

(71) Applicant: LS ELECTRIC CO., LTD., Anyang-si (KR)

(72) Inventors: Jung Woo Yoo, Anyang-si (KR); Han Mi Ru Kim, Anyang-si (KR); Young Ho Lee, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 83 days.

(21) Appl. No.: 18/013,700

(22) PCT Filed: May 25, 2021

(86) PCT No.: PCT/KR2021/006517
§ 371 (c)(1),
(2) Date: Dec. 29, 2022

(87) PCT Pub. No.: WO2022/005020
PCT Pub. Date: Jan. 6, 2022

(65) Prior Publication Data

US 2023/0326694 A1 Oct. 12, 2023

(30) Foreign Application Priority Data

Jun. 29, 2020 (KR) ........................ 10-2020-0079614

(51) Int. Cl.
*H01H 9/44* (2006.01)
*H01H 50/36* (2006.01)
(Continued)

(52) U.S. Cl.
CPC ............ *H01H 50/36* (2013.01); *H01H 9/443* (2013.01); *H01H 50/38* (2013.01); *H01H 50/54* (2013.01)

(58) Field of Classification Search
CPC ................................ H01H 9/44; H01H 9/443
(Continued)

(56) References Cited

U.S. PATENT DOCUMENTS 5,546,061 A * 8/1996 Okabayashi ........... H01H 9/443 335/126
7,821,366 B2 * 10/2010 Ohashi .................. H01F 7/0205 428/827

(Continued)

FOREIGN PATENT DOCUMENTS

JP 2012146634 A 8/2012
JP 2014086206 A 5/2014

(Continued)

OTHER PUBLICATIONS

International Search Report for related International Application No. PCT/KR2021/006517; action dated Jan. 6, 2022; (5 pages).

(Continued)

*Primary Examiner* — Alexander Talpalatski
(74) *Attorney, Agent, or Firm* — K&L Gates LLP

(57) ABSTRACT

An arc path formation unit and a direct current relay including same are disclosed. The arc path formation unit according to various embodiments of the present disclosure comprises a Halbach array and a magnet unit, which form a magnetic field in a space part in which fixed contacts are accommodated. The formed magnetic field forms an electromagnetic force together with the current applied to the direct current relay. The formed electromagnetic force can induce generated arcs here, the electromagnetic force formed in proximity to the respective fixed contacts is formed in the direction of moving away from the respective fixed contacts. Therefore, the generated arcs do not meet each other, and thus can be effectively extinguished and discharged.

4 Claims, 36 Drawing Sheets

(51) Int. Cl.
*H01H 50/38* (2006.01)
*H01H 50/54* (2006.01)

(58) Field of Classification Search
USPC .......................................................... 335/201
See application file for complete search history.

(56) References Cited

U.S. PATENT DOCUMENTS

| | | | | | |
|---|---|---|---|---|---|
| 8,853,585 | B2 * | 10/2014 | Tachikawa | ............. | H01H 9/443<br>335/201 |
| 8,946,580 | B2 * | 2/2015 | Hoffmann | .............. | H01H 9/443<br>218/26 |
| 9,412,545 | B2 * | 8/2016 | Kubono | ................. | H01H 50/60 |
| 2008/0180203 | A1 * | 7/2008 | Schultz | ................ | G11B 5/0245<br>335/284 |
| 2011/0120844 | A1 * | 5/2011 | Hoffmann | .............. | H01H 50/02<br>200/275 |
| 2012/0175345 | A1 | 7/2012 | Tachikawa et al. | | |
| 2015/0042424 | A1 | 2/2015 | Maruyama et al. | | |

FOREIGN PATENT DOCUMENTS

| | | | | | |
|---|---|---|---|---|---|
| JP | 2019036431 | A | 3/2019 | | |
| KR | 102009875 | B1 | 8/2019 | | |
| WO | WO-2011117696 | A1 * | 9/2011 | ............. | H01H 50/38 |
| WO | WO-2019031228 | A1 * | 2/2019 | ............. | H01H 50/38 |

OTHER PUBLICATIONS

Written Opinion for related International Application No. PCT/KR2021/007738; action dated Jan. 6, 2022; (14 pages).

* cited by examiner (a) 400

(b) 400

ARC PATH FORMATION UNIT AND DIRECT CURRENT RELAY INCLUDING SAME

CROSS-REFERENCE TO RELATED APPLICATION

This application is a National Stage of International Application No. PCT/KR2021/006517 filed on May 25, 2021 claims priority to and the benefit of Korean Patent Application No. 10-2020-0079614, filed on Jun. 29, 2020, the disclosures of which are incorporated herein by reference in their entirety.

FIELD

The present disclosure relates to an arc path formation unit and a direct current relay including the same, and more particularly, to an arc path formation unit having a structure capable of effectively inducing a generated arc toward the outside and a direct current relay including the same.

BACKGROUND

A direct current relay is a device that transmits a mechanical driving signal or a current signal using the principle of an electromagnet. The direct current relay is also called a magnetic switch and is generally classified as an electrical circuit switching device.

The direct current relay includes a fixed contact and a movable contact. The fixed contact is electrically connected to an external power supply and a load. The fixed contact and the movable contact may be brought into contact with or separated from each other.

By the contact and separation between the fixed contact and the movable contact, a current flow through the direct current relay is allowed or blocked. Such a movement is made by a driving unit that applies a driving force to the movable contact.

When the fixed contact and the movable contact are separated from each other, an arc is generated between the fixed contact and the movable contact. The arc is a flow of high-pressure and high-temperature current. Accordingly, the generated arc must be quickly discharged from the direct current relay through a predetermined path.

An arc discharge path is formed by magnets provided in the direct current relay. The magnets form magnetic fields in a space in which the fixed contact and the movable contact are in contact with each other. The arc discharge path may be formed by the formed magnetic field and an electromagnetic force generated by a flow of current.

Referring to FIG. 1, a space in which fixed contacts 1100 and a movable contact 1200 provided in a direct current relay 1000 according to the related art are in contact with each other is illustrated. As described above, permanent magnets 1300 are provided in the space.

The permanent magnets 1300 include a first permanent magnet 1310 disposed at an upper side and a second permanent magnet 1320 disposed at a lower side.

The first permanent magnet 1310 is provided in plural, and each surface facing the second permanent magnet 1320 is magnetized to a different polarity. A lower side of the first permanent magnet 1310 located on a left side of FIG. 1 is magnetized to an N pole, and a lower side of the first permanent magnet 1310 located on a right side of FIG. 1 is magnetized to an S pole.

In addition, the second permanent magnet 1320 is also provided in plural, and each surface facing the first permanent magnet 1310 is magnetized to a different polarity. An upper side of the second permanent magnet 1320 located on the left side of FIG. 1 is magnetized to an S pole, and an upper side of the second permanent magnet 1320 located on the right side of FIG. 1 is magnetized to an N pole.

FIG. 1A illustrates a state in which current flows in through the left fixed contact 1100 and flows out through the right fixed contact 1100. According to the Fleming's left-hand rule, an electromagnetic force is formed as indicated by hatched arrows.

Specifically, in the case of the fixed contact 1100 located on the left side, the electromagnetic force is formed toward the outside. Accordingly, the arc generated at the corresponding location can be discharged to the outside.

However, in the case of the fixed contact 1100 located on the right side, the electromagnetic force is formed to the inside, that is, toward a central portion of the movable contact 1200. Accordingly, the arc generated at the corresponding location cannot be immediately discharged to the outside.

In addition, FIG. 1B illustrates a state in which current flows in through the right fixed contact 1100 and flows out through the left fixed contact 1100. According to the Fleming's left-hand rule, an electromagnetic force is formed as indicated by hatched arrows.

Specifically, in the case of the fixed contact 1100 located on the right side, the electromagnetic force is formed toward the outside. Accordingly, the arc generated at the corresponding location can be discharged to the outside.

However, in the case of the fixed contact 1100 located on the left side, the electromagnetic force is formed to the inside, that is, toward the central portion of the movable contact 1200. Accordingly, the arc generated at the corresponding location cannot be immediately discharged to the outside.

Several members for driving the movable contact 1200 to be moved in a vertical direction are provided in a central portion of the direct current relay 1000, that is, in a space between the fixed contacts 1100. As an example, a shaft, a spring member inserted through the shaft, and the like are provided at the location.

Accordingly, when the arc generated as illustrated in FIG. 1 is moved toward the central portion, and the arc moved to the central portion cannot be immediately moved to the outside, there is a risk that the several members provided at the location may be damaged by energy of the arc.

In addition, as illustrated in FIG. 1, a direction of the electromagnetic force formed inside the direct current relay 1000 according to the related art depends on a direction of current flowing through the fixed contacts 1100. That is, the location of the electromagnetic force, which is formed in a direction toward the inside, among the electromagnetic forces generated in each fixed contact 1100 is different depending on the direction of the current.

That is, a user must consider the direction of the current whenever using the direct current relay. This may cause inconvenience to the use of the direct current relay. In addition, regardless of the user's intention, a situation in which a direction of current applied to the direct current relay is changed due to an inexperienced operation or the like cannot be excluded.

In this case, the members provided in the central portion of the direct current relay may be damaged by the generated arc. Accordingly, there is a concern of reducing the durable lifetime of the direct current relay and also generating safety accidents.

Korean Registration Application No. 10-1696952 discloses a direct current relay. Specifically, a direct current relay having a structure capable of preventing movement of a movable contact by using a plurality of permanent magnets is disclosed.

However, the direct current relay having the above structure can prevent the movement of the movable contact by using the plurality of permanent magnets, but there is a limitation in that any method for controlling a direction of an arc discharge path is not considered.

Korean Registration Application No. 10-1216824 discloses a direct current relay. Specifically, a direct current relay having a structure capable of preventing arbitrary separation between a movable contact and a fixed contact using a damping magnet is disclosed.

However, the direct current relay having the above structure merely proposes a method for maintaining a contact state between the movable contact and the fixed contact. That is, there is a limitation in that a method for forming a discharge path for an arc generated when the movable contact and the fixed contact are separated from each other is not introduced.

(Patent Document 1) Korean Registration Application No. 10-1696952 (Jan. 16, 2017)

(Patent Document 2) Korean Registration Application No. 10-1216824 (Dec. 28, 2012)

SUMMARY

The present disclosure is directed to providing an arc path formation unit having a structure capable of solving the above-described problems and a direct current relay including the same.

First, the present disclosure is directed to providing an arc path formation unit having a structure capable of quickly extinguishing and discharging an arc generated as flowing current is interrupted, and a direct current relay including the same.

In addition, the present disclosure is directed to providing an arc path formation unit having a structure capable of increasing the magnitude of force for inducing a generated arc, and a direct current relay including the same.

In addition, the present disclosure is directed to providing an arc path formation unit having a structure capable of preventing damage to a component for electric connection due to a generated arc, and a direct current relay including the same.

In addition, the present disclosure is directed to providing an arc path formation unit having a structure capable of allowing arcs generated at a plurality of locations to propagate without meeting each other, and a direct current relay including the same.

In addition, the present disclosure is directed to providing an arc path formation unit having a structure capable of achieving the above-described objects without an excessive design change, and a direct current relay including the same.

In order to achieve those objects, one embodiment of the present disclosure provides an arc path formation unit including a magnet frame having a space part, in which a fixed contactor and a movable contactor are accommodated, formed therein, and a Halbach array located in the space part of the magnet frame and configured to form a magnetic field in the space part, wherein a length of the space part in one direction is formed to be greater than a length thereof in the other direction, the magnet frame includes a first surface and a second surface which extend in the one direction, are disposed to face each other, and are configured to surround a portion of the space part, and a third surface and a fourth surface which extend in the other direction, are continuous with the first surface and the second surface, respectively, are disposed to face each other, and are configured to surround a remaining portion of the space part, the fixed contactor includes a first fixed contactor located to be biased to one side in the one direction, and a second fixed contactor located to be biased to the other side in the one direction, and the Halbach array includes a first Halbach array located adjacent to any one surface of the first surface and the second surface, located to be biased to any one surface of the third surface and the fourth surface, and disposed to overlap any one contactor of the first fixed contactor and the second fixed contactor in the other direction.

In addition, the Halbach array of the arc path formation unit may include a second Halbach array located adjacent to the other surface of the first surface and the second surface, located to be biased to the any one surface of the third surface and the fourth surface, and disposed to face the first Halbach array with the space part therebetween, wherein the first Halbach array and the second Halbach array may be disposed to overlap the any one contactor of the first fixed contactor and the second fixed contactor in the other direction.

In addition, surfaces of the first Halbach array and the second Halbach array of the arc path formation unit facing each other may be magnetized to the same polarity.

In addition, the Halbach array of the arc path formation unit may include a third Halbach array located adjacent to the other surface of the third surface and the fourth surface and disposed to overlap the fixed contactor in the one direction.

In addition, surfaces of the first Halbach array and the second Halbach array of the arc path formation unit facing each other may be magnetized to the same polarity, and among surfaces of the third Halbach array, a surface facing the space part may be magnetized to a polarity the same as the polarity.

In addition, the arc path formation unit may include a magnet unit provided separately from the Halbach array, located in the space part of the magnet frame to form a magnetic field in the space part, located adjacent to the any one surface of the third surface and the fourth surface, and disposed to overlap the fixed contactor and the third Halbach array in the one direction.

In addition, surfaces of the first Halbach array and the second Halbach array of the arc path formation unit facing each other may be magnetized to the same polarity, among surfaces of the third Halbach array, a surface facing the space part may be magnetized to a polarity the same as the polarity, and among surfaces of the magnet unit, a surface facing the space part may be magnetized to a polarity different from the polarity.

In addition, the arc path formation unit may include a magnet unit provided separately from the Halbach array, located in the space part of the magnet frame to form a magnetic field in the space part, located adjacent to the other surface of the third surface and the fourth surface, and disposed to overlap the fixed contactor in the one direction.

In addition, surfaces of the first Halbach array and the second Halbach array of the arc path formation unit facing each other may be magnetized to the same polarity, and among surfaces of the magnet unit, a surface facing the space part may be magnetized to a polarity the same as the polarity.

In addition, the arc path formation unit may include a magnet unit provided separately from the Halbach array and located in the space part of the magnet frame to form a magnetic field in the space part, wherein the magnet unit may include a first magnet unit located adjacent to the other surface of the first surface and the second surface, located to be biased to the any one surface of the third surface and the fourth surface, and disposed to face the first Halbach array with the space part therebetween.

In addition, surfaces of the first Halbach array and the first magnet unit of the arc path formation unit facing each other may be magnetized to the same polarity.

In addition, the magnet unit of the arc path formation unit may include a second magnet unit located adjacent to the other surface of the third surface and the fourth surface and disposed to overlap the fixed contactor in the one direction.

In addition, surfaces of the first Halbach array and the first magnet unit of the arc path formation unit facing each other may be magnetized to the same polarity, and among surfaces of the second magnet unit, a surface facing the space part may be magnetized to a polarity the same as the polarity.

In addition, the Halbach array of the arc path formation unit may include a second Halbach array located adjacent to the other surface of the third surface and the fourth surface and disposed to overlap the fixed contactor in the one direction, and the magnet unit may include a second magnet unit located adjacent to the any one surface of the third surface and the fourth surface and disposed to overlap the fixed contactor in the one direction.

In addition, surfaces of the first Halbach array and the first magnet unit of the arc path formation unit facing each other may be magnetized to the same polarity, among surfaces of the second Halbach array, a surface facing the space part may be magnetized to a polarity the same as the polarity, and among surfaces of the second magnet unit, a surface facing the space part may be magnetized to a polarity different from the polarity.

In addition, another embodiment of the present disclosure provides an arc path formation unit including a magnet frame having a space part, in which a fixed contactor and a movable contactor are accommodated, formed therein, and a Halbach array and a magnet unit, which are located in the space part of the magnet frame and configured to form a magnetic field in the space part, the magnet unit being provided separately from the Halbach array, wherein a length of the space part in one direction is formed to be greater than a length thereof in the other direction, the magnet frame includes a first surface and a second surface which extend in the one direction, are disposed to face each other, and are configured to surround a portion of the space part, and a third surface and a fourth surface which extend in the other direction, are continuous with the first surface and the second surface, respectively, are disposed to face each other, and are configured to surround a remaining portion of the space part, the fixed contactor includes a first fixed contactor located to be biased to one side in the one direction, and a second fixed contactor located to be biased to the other side in the one direction, the Halbach array includes a first Halbach array located adjacent to any one surface of the first surface and the second surface, located to be biased to any one surface of the third surface and the fourth surface, and disposed to overlap any one contactor of the first fixed contactor and the second fixed contactor in the other direction, and the magnet unit includes a first magnet unit located adjacent to the any one surface of the first surface and the second surface, located to be biased to the any one surface of the third surface and the fourth surface, and disposed to overlap the first Halbach array and the any one contactor of the first fixed contactor and the second fixed contactor in the other direction.

In addition, the Halbach array of the arc path formation unit may include a second Halbach array located adjacent to the other surface of the third surface and the fourth surface and disposed to overlap the fixed contactor in the one direction, and the magnet unit may include a second magnet unit located adjacent to the any one surface of the third surface and the fourth surface and disposed to overlap the fixed contactor in the one direction.

In addition, surfaces of the first Halbach array and the first magnet unit of the arc path formation unit facing each other may be magnetized to the same polarity, among surfaces of the second Halbach array, a surface facing the space part may be magnetized to a polarity the same as the polarity, and among surfaces of the second magnet unit, a surface facing the space part may be magnetized to a polarity different from the polarity.

In addition, still another embodiment of the present disclosure provides a direct current relay including a plurality of fixed contactors located to be spaced apart from each other in one direction, a movable contactor configured to be brought into contact with or separated from the fixed contactors, a magnet frame having a space part, in which the fixed contactors and the movable contactor are accommodated, formed therein, and a Halbach array located in the space part of the magnet frame and configured to form a magnetic field in the space part, wherein a length of the space part in one direction is formed to be greater than a length thereof in the other direction, the magnet frame includes a first surface and a second surface which extend in the one direction, are disposed to face each other, and are configured to surround a portion of the space part, and a third surface and a fourth surface which extend in the other direction, are continuous with the first surface and the second surface, respectively, are disposed to face each other, and are configured to surround a remaining portion of the space part, the fixed contactor includes a first fixed contactor located to be biased to one side in the one direction, and a second fixed contactor located to be biased to the other side in the one direction, and the Halbach array includes a first Halbach array located adjacent to any one surface of the first surface and the second surface, located to be biased to any one surface of the third surface and the fourth surface, and disposed to overlap any one contactor of the first fixed contactor and the second fixed contactor in the other direction.

In addition, the Halbach array of the direct current relay may include a second Halbach array located adjacent to the other surface of the first surface and the second surface, located to be biased to the any one surface of the third surface and the fourth surface, and disposed to face the first Halbach array with the space part therebetween, wherein the first Halbach array and the second Halbach array may be disposed to overlap the any one contactor of the first fixed contactor and the second fixed contactor in the other direction, and surfaces of the first Halbach array and the second Halbach array facing each other may be magnetized to the same polarity.

In addition, the direct current relay may include a magnet unit provided separately from the Halbach array, and located in the space part of the magnet frame to form a magnetic field in the space part, wherein the magnet unit may include a first magnet unit located adjacent to the other surface of the first surface and the second surface, located to be biased to the any one surface of the third surface and the fourth surface, and disposed to face the first Halbach array with the space part therebetween, and surfaces of the first Halbach array and the first magnet unit facing each other may be magnetized to the same polarity.

In addition, yet another embodiment of the present disclosure provides a direct current relay including a plurality of fixed contactors located to be spaced apart from each other in one direction, a movable contactor configured to be brought into contact with or separated from the fixed contactors, a magnet frame having a space part, in which the fixed contactors and the movable contactor are accommodated, formed therein, and a Halbach array and a magnet unit, which are located in the space part of the magnet frame and configured to form a magnetic field in the space part, the magnet unit being provided separately from the Halbach array, wherein a length of the space part in one direction is formed to be greater than a length thereof in the other direction, the magnet frame includes a first surface and a second surface which extend in the one direction, are disposed to face each other, and are configured to surround a portion of the space part, and a third surface and a fourth surface which extend in the other direction, are continuous with the first surface and the second surface, respectively, are disposed to face each other, and are configured to surround a remaining portion of the space part, the fixed contactor includes a first fixed contactor located to be biased to one side in the one direction, and a second fixed contactor located to be biased to the other side in the one direction, the Halbach array includes a first Halbach array located adjacent to any one surface of the first surface and the second surface, located to be biased to any one surface of the third surface and the fourth surface, and disposed to overlap any one contactor of the first fixed contactor and the second fixed contactor in the other direction, and the magnet unit includes a first magnet unit located adjacent to the any one surface of the first surface and the second surface, located to be biased to the any one surface of the third surface and the fourth surface, and disposed to overlap the first Halbach array and the any one contactor of the first fixed contactor and the second fixed contactor in the other direction.

In addition, the Halbach array of the direct current relay may include a second Halbach array located adjacent to the other surface of the third surface and the fourth surface and disposed to overlap the fixed contactor in the one direction, and the magnet unit may include a second magnet unit located adjacent to the any one surface of the third surface and the fourth surface and disposed to overlap the fixed contactor in the one direction, wherein surfaces of the first Halbach array and the first magnet unit facing each other may be magnetized to the same polarity, among surfaces of the second Halbach array, a surface facing the space part may be magnetized to a polarity the same as the polarity, and among surfaces of the second magnet unit, a surface facing the space part may be magnetized to a polarity different from the polarity.

According to embodiments of the present disclosure, the following effects can be achieved.

First, an arc path formation unit includes a Halbach array and a magnet unit. Each of the Halbach array and the magnet unit forms a magnetic field inside the arc path formation unit. The formed magnetic field forms an electromagnetic force together with current flowing through a fixed contactor and a movable contactor accommodated in the arc path formation unit.

At this point, a generated arc is formed in a direction away from each fixed contactor. An arc generated as the fixed contactor and the movable contactor are separated from each other can be induced by the electromagnetic force.

Accordingly, the generated arc can be quickly extinguished and discharged to the outside of the arc path formation unit and the direct current relay.

In addition, the arc path formation unit includes a Halbach array. The Halbach array includes a plurality of magnetic materials disposed in parallel to each other in one direction. Each of the plurality of magnetic materials can enhance the strength of a magnetic field on any one side of both sides thereof in the other direction different from the one direction.

At this point, the Halbach array is disposed such that the any one side, that is, the side in the direction in which the strength of the magnetic field is enhanced, faces a space part of the arc path formation unit. That is, due to the Halbach array, the strength of the magnetic field formed in the space part can be enhanced.

Accordingly, the strength of the electromagnetic force, which depends on the strength of the magnetic field, can also be enhanced. As a result, the strength of the electromagnetic force inducing the generated arc can be enhanced so that the generated arc can be effectively extinguished and discharged.

In addition, directions of the magnetic fields formed by the Halbach array and the magnet unit and a direction of the electromagnetic force formed by the current flowing through the fixed contactor and the movable contactor are formed to be away from a central part.

Furthermore, as described above, since the strength of each of the magnetic field and the electromagnetic force is enhanced by the Halbach array and the magnet unit, the generated arc can be extinguished and moved quickly in a direction away from the central part.

Accordingly, it is possible to prevent damage to various components that are provided in the vicinity of the central part for the operation of the direct current relay.

In addition, in various embodiments, a plurality of fixed contactors can be provided. The Halbach array or the magnet units provided in the arc path formation unit forms magnetic fields in different directions in the vicinity of each fixed contactor. Thus, paths of the arc generated in the vicinity of each fixed contactor proceed in different directions.

Accordingly, the arcs generated in the vicinity of each fixed contactor do not meet each other. Thus, a malfunction or a safety accident that may occur due to a collision of arcs generated at different locations can be prevented.

In addition, in order to achieve the above-described objects and effects, the arc path formation unit includes a Halbach array and a magnet unit provided in a space part. Each of the Halbach array and the magnet unit is located on an inner side of each surface of a magnet frame surrounding the space part. That is, a separate design change for arranging the Halbach array and the magnet unit outside the space part is not required.

Accordingly, without an excessive design change, the arc path formation unit according to various embodiments of the present disclosure can be provided in the direct current relay. Accordingly, time and costs for applying the arc path formation unit according to various embodiments of the present disclosure can be reduced.

DETAILED DESCRIPTION

Figure 1:
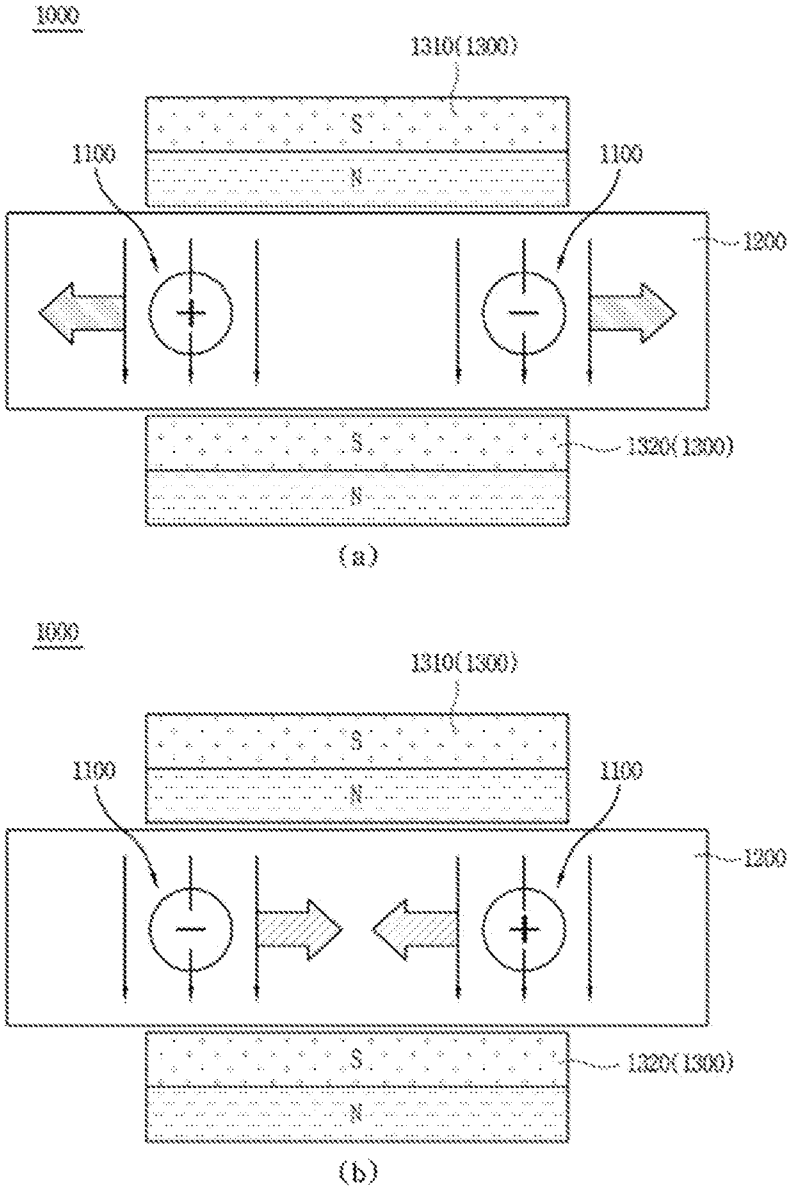
FIG. 1 is a conceptual view illustrating a direct current relay according to the related art.

Hereinafter, a direct current relay 1 and arc path formation units 100, 200, 300, 400, 500, and 600 according to embodiments of the present disclosure will be described with reference to the accompanying drawings.

In the following description, descriptions of some components may be omitted to clarify the features of the present disclosure.

1. Definition of Terms

It will be understood that when a component is referred to as being "connected" or "coupled" to another component, it can be directly connected or coupled to the another component or intervening components may be present.

In contrast, when a component is referred to as being "directly connected" or "directly coupled" to another component, there are no intervening components present.

A singular representation used herein includes a plural representation unless it represents a definitely different meaning from the context.

The term "magnetize" used in the following description means a phenomenon in which an object exhibits magnetism in a magnetic field.

The term "polarities" used in the following description means different properties belonging to an anode and a cathode. In one embodiment, the polarities may be classified into an N pole or an S pole.

The term "electric connection" used in the following description means a state in which two or more members are electrically connected.

The term "arc path A.P" used in the following description means a path through which a generated arc is moved or extinguished.

The symbol "⊙" shown in the following drawings means that current flows in a direction from a movable contactor 43 toward a fixed contactor 22 (i.e., in an upward direction), that is, in a direction in which the current flows from the ground.

The symbol "⊗" shown in the following drawings means that current flows in a direction from the fixed contactor 22 toward the movable contactor 43 (i.e., in a downward direction), that is, a direction in which the current flows into the ground.

The term "Halbach array" used in the following description means an assembly of a plurality of magnetic materials that are disposed in parallel to form columns or rows.

The plurality of magnetic materials constituting the Halbach array may be disposed according to a predetermined rule. A magnetic field may be formed by the magnetic material itself, or magnetic fields may also be formed by between the plurality of magnetic materials.

The Halbach array includes two relatively long surfaces and two relatively short surfaces. Among the magnetic fields formed by the magnetic materials constituting the Halbach array, the magnetic field on an outer side of any one surface of the two long surfaces may be formed with a higher strength.

In the following description, description will be made on the assumption that, among the magnetic fields formed by the Halbach array, the magnetic field in a direction toward a space part 115, 215, 315, 415, 515, or 615 is formed with a higher strength.

The term "magnet unit" used in the following description means any type of object that is formed of a magnetic material and capable of forming a magnetic field. In one embodiment, the magnet unit may be provided as a permanent magnet, an electromagnet, or the like. It will be understood that the magnet unit is different from the magnetic material forming the Halbach array, that is, a magnetic material provided separately from the Halbach array.

The magnet unit may form a magnetic field by itself or together with another magnetic material.

The magnet unit may extend in one direction. Both end portions of the magnet unit in the one direction may be magnetized to different polarities (i.e., the magnet unit has different polarities in a longitudinal direction). In addition, both side surfaces of the magnet unit in the other direction different from the one direction may be magnetized to different polarities (i.e., the magnet unit has different polarities in a width direction).

The magnetic field formed by each of the arc path formation units 100, 200, 300, 400, 500, and 600 according to the embodiments of the present disclosure is illustrated as a one-dot chain line in each drawing.

Figure 2:
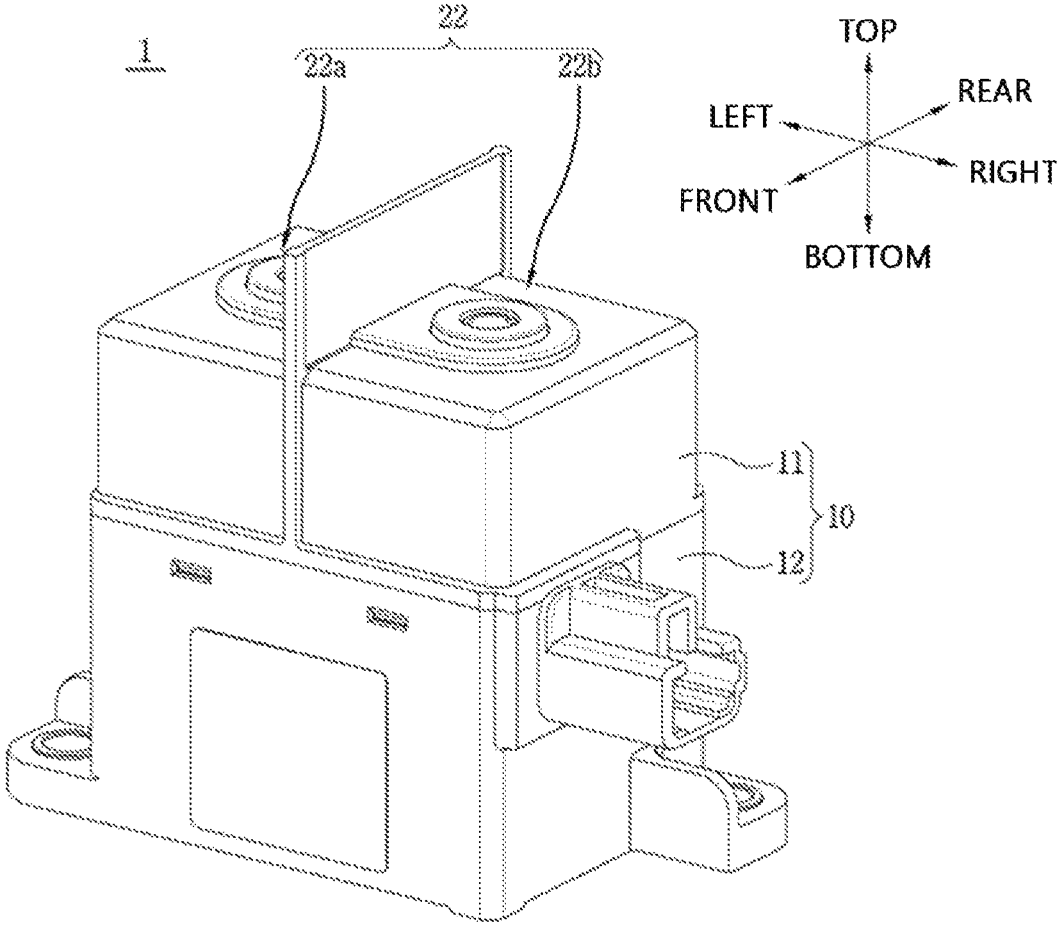
FIG. 2 is a perspective view illustrating a direct current relay according to an embodiment of the present disclosure.

The terms "left side," "right side," "upper side," "lower side," "front side," and "rear side" used in the following description will be understood based on a coordinate system illustrated in FIG. 2.

Figure 3:
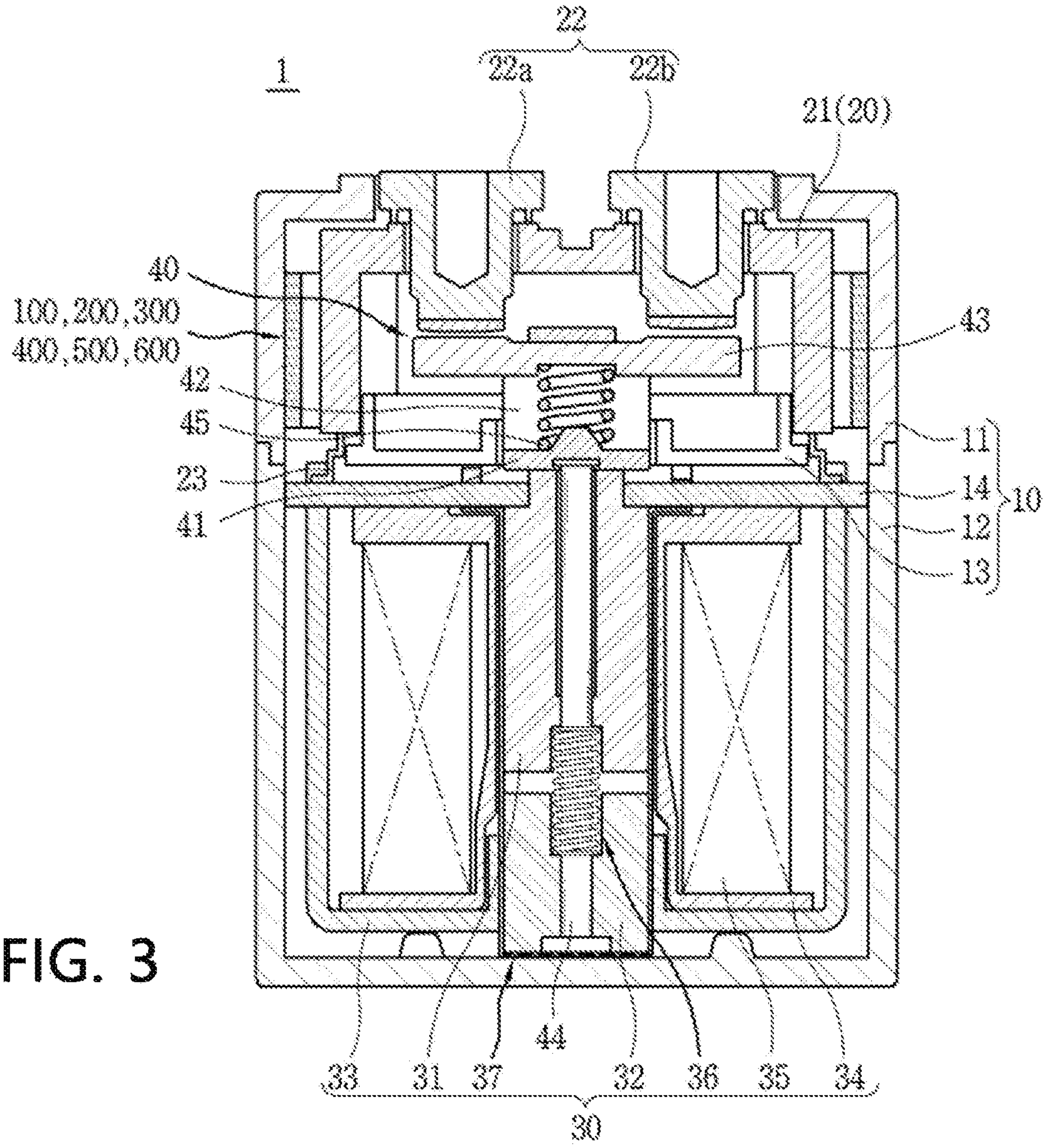
FIG. 3 is a cross-sectional view illustrating a configuration of the direct current relay of FIG. 2.
Figure 4:
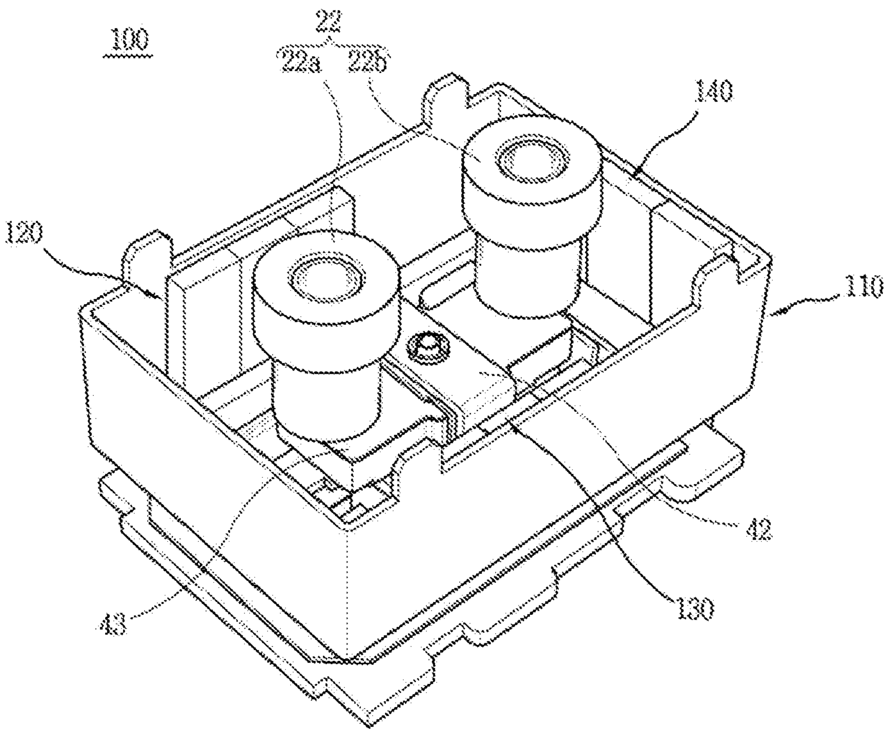
FIG. 4 is an opened perspective view illustrating an arc path formation unit provided in the direct current relay of FIG. 2.

2. Description of Configuration of Direct Current Relay 1 According to Embodiment of Present Disclosure Referring to FIGS. 2 to 4, a direct current relay 1 according to the embodiment of the present disclosure includes a frame part 10, an opening/closing part 20, a core part 30, and a movable contactor part 40.

In addition, referring to FIGS. 5 to 36, the direct current relay 1 according to the embodiment of the present disclosure includes an arc path formation unit 100, 200, 300, 400, 500, or 600.

The arc path formation unit 100, 200, 300, 400, 500, or 600 may form a discharge path of a generated arc.

Hereinafter, each configuration of the direct current relay 1 according to the embodiment of the present disclosure will be described with reference to the accompanying drawings, and the arc path formation units 100, 200, 300, 400, 500, and 600 will be described as separate clauses.

The description is made on the assumption that the arc path formation units 100, 200, 300, 400, 500, and 600 according to various embodiments described below are each provided in the direct current relay 1.

However, it will be understood that the arc path formation units 100, 200, 300, 400, 500, and 600 are applicable to a device in a form that can be electrically connected to and disconnected from the outside by the contact and separation between a fixed contact and a movable contact, such as a magnetic contactor, a magnetic switch, or the like.

(1) Description of Frame Part 10

The frame part 10 forms an outer side of the direct current relay 1. A predetermined space is formed in the frame part 10. Various devices for the direct current relay 1 to perform functions for applying or cutting off current transmitted from the outside may be accommodated in the space.

That is, the frame part 10 serves as a kind of housing.

The frame part 10 may be formed of an insulating material such as synthetic resin. This is for preventing an arbitrary electrical connection between the inside and outside of the frame part 10.

The frame part 10 includes an upper frame 11, a lower frame 12, an insulating plate 13, and a supporting plate 14.

The upper frame 11 forms an upper side of the frame part 10. A predetermined space is formed inside the upper frame 11.

The opening/closing part 20 and the movable contactor part 40 may be accommodated in the inner space of the upper frame 11. The arc path formation unit 100, 200, 300, 400, 500, or 600 may also be accommodated in the inner space of the upper frame 11.

The upper frame 11 may be coupled to the lower frame 12. The insulating plate 13 and the supporting plate 14 may be provided in a space between the upper frame 11 and the lower frame 12.

The fixed contactor 22 of the opening/closing part 20 is located on one side of the upper frame 11, e.g., on an upper side of the upper frame 11 in the illustrated embodiment. The fixed contactor 22 may be partially exposed to the upper side of the upper frame 11 to be electrically connected to an external power supply or a load.

To this end, a through hole through which the fixed contactor 22 is coupled may be formed at the upper side of the upper frame 11.

The lower frame 12 forms a lower side of the frame part 10. A predetermined space is formed inside the lower frame 12. The core part 30 may be accommodated in the inner space of the lower frame 12.

The lower frame 12 may be coupled to the upper frame 11. The insulating plate 13 and the supporting plate 14 may be provided in the space between the lower frame 12 and the upper frame 11.

The insulating plate 13 and the supporting plate 14 electrically and physically isolate the inner space of the upper frame 11 and the inner space of the lower frame 12 from each other.

The insulating plate 13 is located between the upper frame 11 and the lower frame 12. The insulating plate 13 allows the upper frame 11 and the lower frame 12 to be electrically separated from each other. To this end, the insulating plate 13 may be formed of an insulating material such as synthetic resin.

Arbitrary electrical connection between the opening/closing part 20, the movable contactor part 40, and the arc path formation unit 100, 200, 300, 400, 500, or 600 that are accommodated in the upper frame 11 and the core part 30 accommodated in the lower frame 12 can be prevented by the insulating plate 13.

A through hole (not shown) is formed in a central part of the insulating plate 13. A shaft 44 of the movable contactor part 40 is coupled through the through hole (not shown) to be movable in a vertical direction.

The supporting plate 14 is located on a lower side of the insulating plate 13. The insulating plate 13 may be supported by the supporting plate 14.

The supporting plate 14 is located between the upper frame 11 and the lower frame 12.

The supporting plate 14 may allow the upper frame 11 and the lower frame 12 to be physically separated from each other. In addition, the supporting plate 14 supports the insulating plate 13.

The supporting plate 14 may be formed of a magnetic material. Accordingly, the supporting plate 14 may form a magnetic circuit together with a yoke 33 of the core part 30. A driving force allowing a movable core 32 of the core part 30 to move toward a fixed core 31 may be formed by the magnetic circuit.

A through hole (not shown) is formed in a central part of the supporting plate 14. The shaft 44 is coupled through the through hole (not shown) to be movable in the vertical direction.

Accordingly, when the movable core 32 is moved in a direction toward or away from the fixed core 31, the shaft 44 and the movable contactor 43 connected to the shaft 44 may also be moved in the same direction.

(2) Description of Opening/Closing Part 20

The opening/closing part 20 may allow or block the flow of current according to an operation of the core part 30. Specifically, the opening/closing part 20 may allow or block the flow of current as the fixed contactor 22 and the movable contactor 43 are brought into contact with or separated from each other.

The opening/closing part 20 is accommodated in the inner space of the upper frame 11. The opening/closing part 20 may be electrically and physically separated from the core part 30 by the insulating plate 13 and the supporting plate 14.

The opening/closing part 20 includes an arc chamber 21, the fixed contactor 22, and a sealing member 23.

In addition, the arc path formation unit 100, 200, 300, 400, 500, or 600 may be provided outside the arc chamber 21. The arc path formation unit 100, 200, 300, 400, 500, or 600 may form a magnetic field for forming an arc path A.P of an arc generated inside the arc chamber 21. A detailed description thereof will be given below.

The arc chamber 21 extinguishes an arc at an inner space thereof, wherein the arc is generated as the fixed contactor 22 and the movable contactor 43 are separated from each other. Accordingly, the arc chamber 21 may also be referred to as an "arc extinguishing part."

The arc chamber 21 sealingly accommodates the fixed contactor 22 and the movable contactor 43. That is, the fixed contactor 22 and the movable contactor 43 are accommodated in the arc chamber 21. Accordingly, the arc generated as the fixed contactor 22 and the movable contactor 43 are separated from each other does not arbitrarily leak to the outside.

An extinguishing gas may be filled in the arc chamber 21. The extinguishing gas may extinguish the generated arc and the extinguished arc may be discharged to the outside of the direct current relay 1 through a predetermined path. To this end, a communication hole (not shown) may be formed in a wall surrounding the inner space of the arc chamber 21.

The arc chamber 21 may be formed of an insulating material. In addition, the arc chamber 21 may be formed of a material having high pressure resistance and high heat resistance. This is because the generated arc is a flow of high-temperature and high-pressure electrons. In one embodiment, the arc chamber 21 may be formed of a ceramic material.

A plurality of through holes may be formed in an upper side of the arc chamber 21. The fixed contactor 22 is coupled through each of the through holes.

In the illustrated embodiment, two fixed contactors 22 including a first fixed contactor 22*a* and a second fixed contactor 22*b* are provided. Accordingly, two through hole formed in the upper side of the arc chamber 21 may also be provided.

When the fixed contactors 22 are coupled through the through holes, the through holes are sealed. That is, the fixed contactor 22 is sealingly coupled to the through hole. Accordingly, the generated arc cannot be discharged to the outside through the through hole.

A lower side of the arc chamber 21 may be open. The lower side of the arc chamber 21 may be in contact with the insulating plate 13 and the sealing member 23. That is, the lower side of the arc chamber 21 is sealed by the insulating plate 13 and the sealing member 23.

Accordingly, the arc chamber 21 can be electrically and physically separated from an outer space of the upper frame 11.

The arc extinguished in the arc chamber 21 is discharged to the outside of the direct current relay 1 through a predetermined path. In one embodiment, the extinguished arc may be discharged to the outside of the arc chamber 21 through the communication hole (not shown).

The fixed contactor 22 may be brought into contact with or separated from the movable contactor 43, so that the inside and outside of the direct current relay 1 are electrically connected or disconnected.

Specifically, when the fixed contactor 22 is brought into contact with the movable contactor 43, the inside and outside of the direct current relay 1 may be electrically connected. On the other hand, when the fixed contactor 22 is separated from the movable contactor 43, the inside and outside of the direct current relay 1 may be electrically disconnected.

As the name implies, the fixed contactor 22 does not move. That is, the fixed contactor 22 may be fixedly coupled to the upper frame 11 and the arc chamber 21. Accordingly, the contact and separation between the fixed contactor 22 and the movable contactor 43 can be achieved by the movement of the movable contactor 43.

One end portion of the fixed contactor 22, for example, an upper end portion of the fixed contactor 22 in the illustrated embodiment, is exposed to the outside of the upper frame 11. A power supply or a load may each be electrically connected to the one end portion.

The fixed contactor 22 may be provided in plural. In the illustrated embodiment, a total of two fixed contactors 22 are provided, including the first fixed contactor 22*a* on a left side and the second fixed contactor 22*b* on a right side.

The first fixed contactor 22*a* is located to be biased to one side from a center of the movable contactor 43 in the longitudinal direction, i.e., to a left side in the illustrated embodiment. In addition, the second fixed contactor 22*b* is located to be biased to another side from the center of the movable contactor 43 in the longitudinal direction, i.e., to a right side in the illustrated embodiment.

A power supply may be electrically connected to any one of the first fixed contactor 22*a* and the second fixed contactor 22*b*. In addition, a load may be electrically connected to the other one of the first fixed contactor 22*a* and the second fixed contactor 22*b*.

The direct current relay 1 according to the embodiment of the present disclosure may form the arc path A.P regardless of a direction of the power supply or load connected to the fixed contactor 22. This can be achieved by the arc path formation unit 100, 200, 300, 400, 500, or 600, and a detailed description thereof will be described below.

The other end portion of the fixed contactor 22, i.e., a lower end portion of the fixed contactor 22 in the illustrated embodiment extends toward the movable contactor 43.

When the movable contactor 43 is moved in a direction toward the fixed contactor 22, i.e., upward in the illustrated embodiment, the lower end portion of the fixed contactor 22 is brought into contact with the movable contactor 43. Accordingly, the outside and inside of the direct current relay 1 can be electrically connected.

The lower end portion of the fixed contactor 22 may be located inside the arc chamber 21.

When control power is cut off, the movable contactor 43 is separated from the fixed contactor 22 by an elastic force of a return spring 36.

At this time, as the fixed contactor 22 and the movable contactor 43 are separated from each other, an arc is generated between the fixed contactor 22 and the movable contactor 43. The generated arc may be extinguished by the extinguishing gas inside the arc chamber 21, and may be discharged to the outside along a path formed by the arc path formation unit 100, 200, 300, 400, 500, or 600.

The sealing member 23 may block the inner space of the arc chamber 21 from arbitrarily communicating with the inner space of the upper frame 11. The sealing member 23 seals the lower side of the arc chamber 21 together with the insulating plate 13 and the supporting plate 14.

Specifically, an upper side of the sealing member 23 is coupled to the lower side of the arc chamber 21. In addition, a radially inner side of the sealing member 23 is coupled to an outer circumference of the insulating plate 13, and a lower side of the sealing member 23 is coupled to the supporting plate 14.

Accordingly, the arc generated in the arc chamber 21 and the arc extinguished by the extinguishing gas do not arbitrarily flow out to the inner space of the upper frame 11.

In addition, the sealing member 23 may be configured to block an inner space of a cylinder 37 from arbitrarily communicating with the inner space of the frame part 10.

(3) Description of Core Part 30

The core part 30 moves the movable contactor part 40 upward as control power is applied. In addition, when the application of the control power is released, the core part 30 moves the movable contactor part 40 downward again.

The core part 30 may be electrically connected to an external control power supply (not shown) to receive the control power.

The core part 30 is located below the opening/closing part 20. In addition, the core part 30 is accommodated in the lower frame 12. The core part 30 and the opening/closing part 20 may be electrically and physically separated from each other by the insulating plate 13 and the supporting plate 14.

The movable contactor part 40 is located between the core part 30 and the opening/closing part 20. The movable contactor part 40 may be moved by a driving force applied by the core part 30. Accordingly, the movable contactor 43 and the fixed contactor 22 can be brought into contact with each other so that current can flow through the direct current relay 1.

The core part 30 includes the fixed core 31, the movable core 32, the yoke 33, a bobbin 34, coils 35, the return spring 36, and the cylinder 37.

The fixed core 31 is magnetized by a magnetic field generated in the coils 35 to generate an electromagnetic attractive force. The movable core 32 is moved toward the fixed core 31 (in an upward direction in FIG. 3) by the electromagnetic attractive force.

The fixed core 31 is not moved. That is, the fixed core 31 is fixedly coupled to the supporting plate 14 and the cylinder 37.

The fixed core 31 may be provided in any form capable of being magnetized by the magnetic field so as to generate an electromagnetic force. In one embodiment, the fixed core 31 may be provided as a permanent magnet, an electromagnet, or the like.

The fixed core 31 is partially accommodated in an upper space inside the cylinder 37. In addition, an outer circumference of the fixed core 31 may come into contact with an inner circumference of the cylinder 37.

The fixed core 31 is located between the supporting plate 14 and the movable core 32.

A through hole (not shown) is formed in a central portion of the fixed core 31. The shaft 44 is coupled through the through hole (not shown) to be movable up and down.

The fixed core 31 is located to be spaced apart from the movable core 32 by a predetermined distance. Accordingly, a distance by which the movable core 32 can move toward the fixed core 31 may be limited to the predetermined distance. Accordingly, the predetermined distance may be defined as a "moving distance of the movable core 32."

One end portion of the return spring 36, i.e., an upper end portion of the return spring 36 in the illustrated embodiment may be brought into contact with a lower side of the fixed core 31. When the movable core 32 is moved upward as the fixed core 31 is magnetized, the return spring 36 is compressed and stores a restoring force.

Accordingly, when the application of the control power is released and the magnetization of the fixed core 31 is terminated, the movable core 32 may be returned to the lower side by the restoring force.

When the control power is applied, the movable core 32 is moved toward the fixed core 31 by the electromagnetic attractive force generated by the fixed core 31.

As the movable core 32 is moved, the shaft 44 coupled to the movable core 32 is moved toward the fixed core 31, i.e., upward in the illustrated embodiment. In addition, as the shaft 44 is moved, the movable contactor part 40 coupled to the shaft 44 is moved upward.

Accordingly, the fixed contactor 22 and the movable contactor 43 may be brought into contact with each other so that the direct current relay 1 can be electrically connected to the external power supply or the load.

The movable core 32 may be provided in any form capable of receiving an attractive force by an electromagnetic force. In one embodiment, the movable core 32 may be formed of a magnetic material or provided as a permanent magnet, an electromagnet, or the like.

The movable core 32 is accommodated in the cylinder 37. In addition, the movable core 32 may be moved in the cylinder 37 in the longitudinal direction of the cylinder 37, for example, in the vertical direction in the illustrated embodiment.

Specifically, the movable core 32 may be moved in a direction toward the fixed core 31 and away from the fixed core 31.

The movable core 32 is coupled to the shaft 44. The movable core 32 may be moved integrally with the shaft 44. When the movable core 32 is moved upward or downward, the shaft 44 is also moved upward or downward. Accordingly, the movable contactor 43 is also moved upward or downward.

The movable core 32 is located below the fixed core 31. The movable core 32 is spaced apart from the fixed core 31 by the predetermined distance. As described above, the predetermined distance is a distance by which the movable core 32 can be moved in the vertical direction.

The movable core 32 is formed to extend in the longitudinal direction. A hollow part extending in the longitudinal direction is formed to be recessed in the movable core 32 by a predetermined distance. The return spring 36 and the lower side of the shaft 44 coupled through the return spring 36 are partially accommodated in the hollow part.

A through hole may be formed through a lower side of the hollow part in the longitudinal direction. The hollow part and the through hole communicate with each other. A lower end portion of the shaft 44 inserted into the hollow part may proceed toward the through hole.

A space part is formed to be recessed in a lower end portion of the movable core 32 by a predetermined distance. The space part communicates with the through hole. A lower head portion of the shaft 44 is located in the space part.

The yoke 33 forms a magnetic circuit as the control power is applied. The magnetic circuit formed by the yoke 33 may be configured to control a direction of a magnetic field formed by the coils 35.

Accordingly, when the control power is applied, the coils 35 may form a magnetic field in a direction in which the movable core 32 is moved toward the fixed core 31. The yoke 33 may be formed of a conductive material capable of allowing electrical connection.

The yoke 33 is accommodated in the lower frame 12. The yoke 33 surrounds the coils 35. The coils 35 may be accommodated in the yoke 33 so as to be spaced apart from an inner circumferential surface of the yoke 33 by a predetermined distance.

The bobbin 34 is accommodated in the yoke 33. That is, the yoke 33, the coils 35, and the bobbin 34 on which the coils 35 are wound may be sequentially disposed in a direction from an outer circumference of the lower frame 12 toward a radially inner side of the lower frame 12.

An upper side of the yoke 33 may come into contact with the supporting plate 14. In addition, the outer circumference of the yoke 33 may come into contact with an inner circumference of the lower frame 12 or may be located to be spaced apart from the inner circumference of the lower frame 12 by a predetermined distance.

The coils 35 are wound around the bobbin 34. The bobbin 34 is accommodated in the yoke 33.

The bobbin 34 may include upper and lower portions formed in a flat plate shape, and a cylindrical column part formed to extend in the longitudinal direction to connect the upper and lower portions. That is, the bobbin 34 has a bobbin shape.

The upper portion of the bobbin 34 comes into contact with a lower side of the supporting plate 14. The coils 35 are wound around the column part of the bobbin 34. A wound thickness of the coils 35 may be configured to be equal to or smaller than a diameter of each of the upper and lower portions of the bobbin 34.

A hollow part is formed through the column portion of the bobbin 34 extending in the longitudinal direction. The cylinder 37 may be accommodated in the hollow part. The column part of the bobbin 34 may be disposed to have the same central axis as the fixed core 31, the movable core 32, and the shaft 44.

The coils 35 generate a magnetic field due to the applied control power. The fixed core 31 may be magnetized by the magnetic field generated by the coils 35 and thus an electromagnetic attractive force may be applied to the movable core 32.

The coils 35 are wound around the bobbin 34. Specifically, the coils 35 are wound around the column part of the bobbin 34 and stacked on a radial outer side of the column part. The coils 35 are accommodated in the yoke 33.

When control power is applied, the coils 35 generate a magnetic field. At this point, a strength or direction of the magnetic field generated by the coils 35 may be controlled by the yoke 33. The fixed core 31 is magnetized by the magnetic field generated by the coils 35.

When the fixed core 31 is magnetized, the movable core 32 receives an electromagnetic force, i.e., an attractive force in a direction toward the fixed core 31.

Accordingly, the movable core 32 is moved in a direction toward the fixed core 31, i.e., upward in the illustrated embodiment.

The return spring 36 provides a restoring force for the movable core 32 to return to its original location when the application of the control power is released after the movable core 32 is moved toward the fixed core 31.

As the movable core 32 is moved toward the fixed core 31, the return spring 36 stores the restoring force while being compressed. At this point, the stored restoring force may preferably be smaller than the electromagnetic attractive force, which is exerted on the movable core 32 as the fixed core 31 is magnetized. This is to prevent the movable core 32 from being arbitrarily returned to its original location by the return spring 36 while the control power is applied.

When the application of the control power is released, the movable core 32 receives only the restoring force by the return spring 36. Of course, gravity due to an empty weight of the movable core 32 may also be applied to the movable core 32. Accordingly, the movable core 32 can be moved in a direction away from the fixed core 31 to be returned to the original location.

The return spring 36 may be provided in any form that is deformed to store the restoring force and returned to its original state to transmit the restoring force to the outside. In one embodiment, the return spring 36 may be provided as a coil spring.

The shaft 44 is coupled through the return spring 36. The shaft 44 may move in the vertical direction regardless of the deformation of the return spring 36 in the coupled state with the return spring 36.

The return spring 36 is accommodated in the hollow part formed to be recessed in an upper side of the movable core 32. In addition, one end portion of the return spring 36 facing the fixed core 31, i.e., an upper end portion of the return spring 36 in the illustrated embodiment is accommodated in a hollow part formed to be recessed in the lower side of the fixed core 31.

The cylinder 37 accommodates the fixed core 31, the movable core 32, the return spring 36, and the shaft 44. The movable core 32 and the shaft 44 may be moved in the upward and downward directions in the cylinder 37.

The cylinder 37 is located in the hollow part formed in the column part of the bobbin 34. An upper end portion of the cylinder 37 comes into contact with a lower side surface of the supporting plate 14.

A side surface of the cylinder 37 comes into contact with an inner circumferential surface of the column part of the bobbin 34. An upper opening of the cylinder 37 may be sealed by the fixed core 31. A lower side surface of the cylinder 37 may come into contact with an inner surface of the lower frame 12.

(4) Description of Movable Contactor Part 40

The movable contactor part 40 includes the movable contactor 43 and components for moving the movable contactor 43. The direct current relay 1 may be electrically connected to an external power supply or a load by the movable contactor part 40.

The movable contactor part 40 is accommodated in the inner space of the upper frame 11. In addition, the movable contactor part 40 is accommodated in the arc chamber 21 to be movable up and down.

The fixed contactor 22 is located above the movable contactor part 40. The movable contactor part 40 is accommodated in the arc chamber 21 to be movable in a direction toward the fixed contactor 22 and a direction away from the fixed contactor 22.

The core part 30 is located below the movable contactor part 40. The movement of the movable contactor part 40 can be achieved by the movement of the movable core 32.

The movable contactor part 40 includes a housing 41, a cover 42, the movable contactor 43, the shaft 44, and an elastic part 45.

The housing 41 accommodates the movable contactor 43 and the elastic part 45 elastically supporting the movable contactor 43.

In the illustrated embodiment, the housing 41 is formed such that one side and another side opposite to the one side are open. The movable contactor 43 may be inserted through the open portions.

Unopened side surfaces of the housing 41 may be configured to surround the accommodated movable contactor 43.

The cover 42 is provided on an upper side of the housing 41. The cover 42 covers an upper surface of the movable contactor 43 accommodated in the housing 41.

The housing 41 and the cover 42 may preferably be formed of an insulating material to prevent unexpected electrical connection. In one embodiment, the housing 41 and the cover 42 may be formed of synthetic resin or the like.

A lower side of the housing 41 is connected to the shaft 44. When the movable core 32 connected to the shaft 44 is moved upward or downward, the housing 41 and the movable contactor 43 accommodated in the housing 41 may also be moved upward or downward.

The housing 41 and the cover 42 may be coupled by arbitrary members. In one embodiment, the housing 41 and the cover 42 may be coupled by coupling members (not shown) such as a bolt and a nut.

The movable contactor 43 comes into contact with the fixed contactor 22 as control power is applied, so that the direct current relay 1 can be electrically connected to an external power supply and a load. In addition, when the application of the control power is released, the movable contactor 43 is separated from the fixed contactor 22, and thus the direct current relay 1 is electrically disconnected from the external power supply and the load.

The movable contactor 43 is located adjacent to the fixed contactor 22.

An upper side of the movable contactor 43 is partially covered by the cover 42. In one embodiment, a portion of the upper surface of the movable contactor 43 may be brought into contact with a lower side surface of the cover 42.

A lower side of the movable contactor 43 is elastically supported by the elastic part 45. In order to prevent the movable contactor 43 from being arbitrarily moved downward, the elastic part 45 may elastically support the movable contactor 43 in a compressed state by a predetermined distance.

The movable contactor 43 is formed to extend in the longitudinal direction, i.e., in a left-right direction in the illustrated embodiment. That is, a length of the movable contactor 43 is formed to be longer than a width thereof. Accordingly, both end portions of the movable contactor 43 in the longitudinal direction, which are accommodated in the housing 41, are exposed to the outside of the housing 41.

Contact protrusions may be formed to protrude upward from the both end portions by predetermined distances. The fixed contactor 22 is in contact with the contact protrusions.

The contact protrusions may be formed at locations corresponding to the fixed contactors 22*a* and 22*b*, respectively. Accordingly, the moving distance of the movable contactor 43 can be reduced and contact reliability between the fixed contactor 22 and the movable contactor 43 can be improved.

The width of the movable contactor 43 may be the same as a spaced distance between the side surfaces of the housing 41. That is, when the movable contactor 43 is accommodated in the housing 41, both side surfaces of the movable contactor 43 in a width direction may be brought into contact with inner surfaces of the side surfaces of the housing 41.

Accordingly, the state in which the movable contactor 43 is accommodated in the housing 41 can be stably maintained.

The shaft 44 transmits a driving force, which is generated in response to the operation of the core part 30, to the movable contactor part 40. Specifically, the shaft 44 is connected to the movable core 32 and the movable contactor 43. When the movable core 32 is moved upward or downward, the movable contactor 43 may also be moved upward or downward by the shaft 44.

The shaft 44 is formed to extend in the longitudinal direction, i.e., in the vertical direction in the illustrated embodiment.

The lower end portion of the shaft 44 is inserted into and coupled to the movable core 32. When the movable core 32 is moved in the vertical direction, the shaft 44 may also be moved in the vertical direction together with the movable core 32.

A body part of the shaft 44 is coupled through the fixed core 31 to be movable up and down. The return spring 36 is coupled through the body part of the shaft 44.

An upper end portion of the shaft 44 is coupled to the housing 41. When the movable core 32 is moved, the shaft 44 and the housing 41 may also be moved together with the movable core 32.

The upper and lower end portions of the shaft 44 may be formed to have a larger diameter than the body part of the shaft. Accordingly, the coupled state of the shaft 44 to the housing 41 and the movable core 32 can be stably maintained.

The elastic part 45 elastically supports the movable contactor 43. When the movable contactor 43 is brought into contact with the fixed contactor 22, the movable contactor 43 may tend to be separated from the fixed contactor 22 due to an electromagnetic repulsive force.

At this point, the elastic part 45 elastically supports the movable contactor 43 to prevent the movable contactor 43 from being arbitrarily separated from the fixed contactor 22.

The elastic part 45 may be provided in any form capable of storing a restoring force by being deformed and providing the stored restoring force to another member. In one embodiment, the elastic part 45 may be provided as a coil spring.

One end portion of the elastic part 45 facing the movable contactor 43 comes into contact with the lower side of the movable contactor 43. In addition, the other end portion opposite to the one end portion comes into contact with the upper side of the housing 41.

The elastic part 45 may elastically support the movable contactor 43 in a state of storing the restoring force by being compressed by a predetermined distance. Accordingly, even when the electromagnetic repulsive force is generated between the movable contactor 43 and the fixed contactor 22, the movable contactor 43 is not arbitrarily moved.

A protrusion (not shown) inserted into the elastic part 45 may be formed to protrude from the lower side of the movable contactor 43 to enable stable coupling of the elastic part 45. Similarly, a protrusion (not shown) inserted into the elastic part 45 may also be formed to protrude from the upper side of the housing 41.

3. Description of Arc Path Formation Units 100, 200, 300, 400, 500, and 600 According to Embodiments of Present Disclosure Referring to FIGS. 5 to 36, the arc path formation units 100, 200, 300, 400, 500, and 600 according to various embodiments of the present disclosure are illustrated. Each of the arc path formation units 100, 200, 300, 400, 500, and 600 forms magnetic fields inside the arc chamber 21. Due to current flowing through the direct current relay 1 and the formed magnetic field, an electromagnetic force is formed in the arc chamber 21.

An arc generated as the fixed contactor 22 and the movable contactor 43 are separated from each other is moved to the outside of the arc chamber 21 by the formed electromagnetic force. Specifically, the generated arc is moved in a direction of the formed electromagnetic force. Accordingly, it can be said that each of the arc path formation units 100, 200, 300, 400, 500, and 600 forms an arc path A.P, which is a path through which the generated arc flows.

Each of the arc path formation units 100, 200, 300, 400, 500, and 600 is located in a space formed in the upper frame 11. The arc path formation unit 100, 200, 300, 400, 500, or 600 is disposed to surround the arc chamber 21. In other words, the arc chamber 21 is located inside the arc path formation unit 100, 200, 300, 400, 500, or 600.

The fixed contactor 22 and the movable contactor 43 are located inside the arc path formation unit 100, 200, 300, 400, 500, or 600. The arc generated as the fixed contactor 22 and the movable contactor 43 are separated from each other may be induced by the electromagnetic force formed by the arc path formation unit 100, 200, 300, 400, 500, or 600.

Each of the arc path formation units 100, 200, 300, 400, 500, and 600 according to various embodiments of the present disclosure includes Halbach arrays or magnet units. The Halbach arrays or the magnet units form magnetic fields inside the arc path formation unit 100 in which the fixed contactor 22 and the movable contactor 43 are accommodated. At this point, the Halbach array or the magnet part may form a magnetic field by itself and between each other.

The magnetic fields formed by the Halbach array and the magnet unit form an electromagnetic force together with current flowing through the fixed contactor 22 and the movable contactor 43. The formed electromagnetic force induces an arc that is generated when the fixed contactor 22 and the movable contactor 43 are separated from each other.

At this point, each of the arc path formation units 100, 200, 300, 400, 500, and 600 forms the electromagnetic force in a direction away from a central part C of each of space parts 115, 215, 315, 415, 515, and 615. Accordingly, an arc path A.P is also formed in the direction away from a central part C of the space part.

As a result, each component provided in the direct current relay 1 is not damaged by the generated arc. Furthermore, the generated arc may be quickly discharged to the outside of the arc chamber 21.

Hereinafter, the configuration of each of the arc path formation units 100, 200, 300, 400, 500, and 600 and the arc path A.P formed by each of the arc path formation units 100, 200, 300, 400, 500, and 600 will be described in detail with reference to the accompanying drawings.

Each of the arc path formation units 100, 200, 300, 400, 500, and 600 according to various embodiments described below may include the Halbach array located on one or more of front and rear sides to be biased to any one side of left and right sides.

That is, the Halbach array may be disposed adjacent to any one of the first fixed contactor 22*a* located on the left side and the second fixed contactor 22*b* located on the right side.

As will be described below, the rear side may be defined as a direction adjacent to a first surface 111, 211, 311, 411, 511, or 611 and the front side may be defined as a direction adjacent to a second surface 112, 212, 312, 412, 512, or 612.

In addition, the left side may be defined as a direction adjacent to a third surface 113, 213, 313, 413, 513, or 613, and the right side may be defined as a direction adjacent to a fourth surface 114, 214, 314, 414, 514, or 614.

(1) Description of Arc Path Formation Unit 100 According to One Embodiment of Present Disclosure Hereinafter, an arc path formation unit 100 according to one embodiment of the present disclosure will be described in detail with reference to FIGS. 5 to 8.

Figure 5:
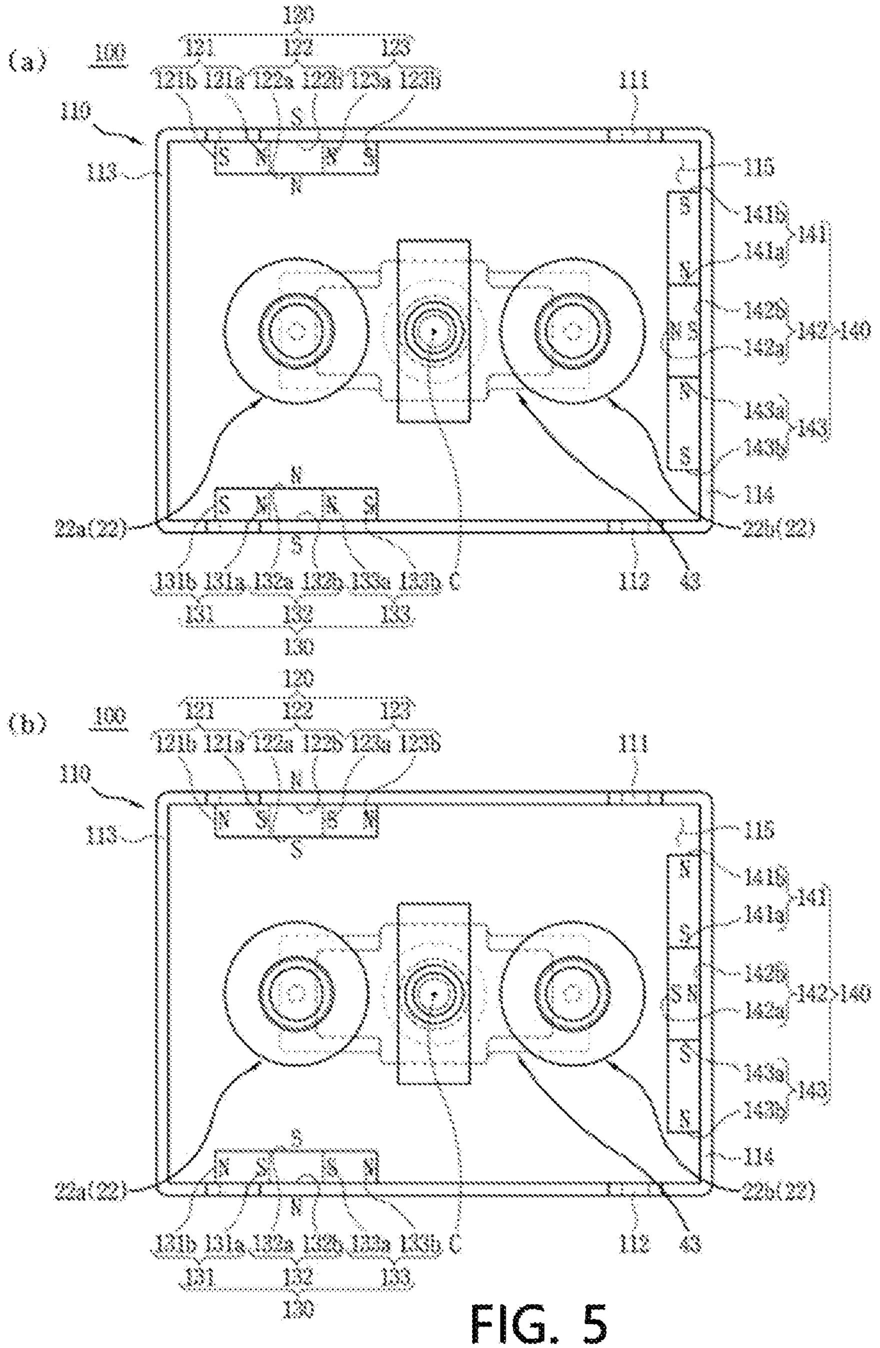
FIGS. 5 and 6 are conceptual views illustrating the arc path formation unit according to one embodiment of the present disclosure.
Figure 6:
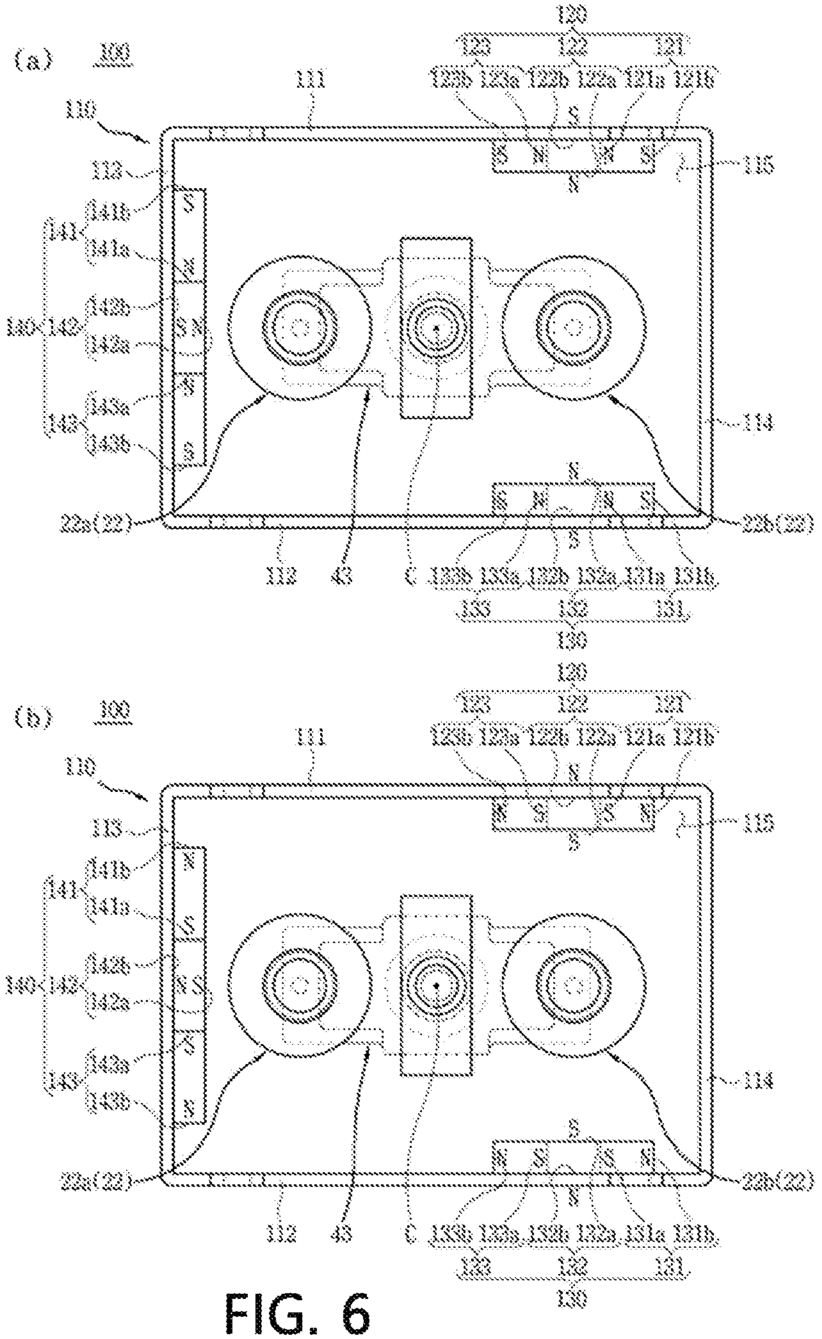

Referring to FIGS. 5 and 6, the arc path formation unit 100 according to the illustrated embodiment includes a magnet frame 110, a first Halbach array 120, a second Halbach array 130, and a third Halbach array 140.

The magnet frame 110 forms a frame of the arc path formation unit 100. The first Halbach array 120, the second Halbach array 130, and the third Halbach array 140 are disposed in the magnet frame 110. In one embodiment, the first Halbach array 120, the second Halbach array 130, and the third Halbach array 140 may be coupled to the magnet frame 110.

The magnet frame 110 has a rectangular cross section formed to extend in the longitudinal direction, i.e., in the left-right direction in the illustrated embodiment. The shape of the magnet frame 110 may be changed depending on shapes of the upper frame 11 and the arc chamber 21.

The magnet frame 110 includes a first surface 111, a second surface 112, a third surface 113, a fourth surface 114, and a space part 115.

The first surface 111, the second surface 112, the third surface 113, and the fourth surface 114 form an outer circumferential surface of the magnet frame 110. That is, the first surface 111, the second surface 112, the third surface 113, and the fourth surface 114 may serve as walls of the magnet frame 110.

An outer side of each of the first surface 111, the second surface 112, the third surface 113, and the fourth surface 114 may be in contact with or fixedly coupled to an inner surface of the upper frame 11. In addition, the first Halbach array 120, the second Halbach array 130, and the third Halbach array 140 may be located on inner sides of the first surface 111, the second surface 112, the third surface 113, and the fourth surface 114.

In the illustrated embodiment, the first surface 111 forms a rear side surface. The second surface 112 forms a front side surface and faces the first surface 111. In addition, the third surface 113 forms a left side surface. The fourth surface 114 forms a right side surface and faces the third surface 113.

That is, the first surface 111 and the second surface 112 face each other with the space part 115 therebetween. In addition, the third surface 113 and the fourth surface 114 face each other with the space part 115 therebetween.

The first surface 111 is continuous with the third surface 113 and the fourth surface 114. The first surface 111 may be coupled to the third surface 113 and the fourth surface 114 at predetermined angles. In one embodiment, the predetermined angle may be a right angle.

The second surface 112 is continuous with the third surface 113 and the fourth surface 114. The second surface 112 may be coupled to the third surface 113 and the fourth surface 114 at predetermined angles. In one embodiment, the predetermined angle may be a right angle.

Each of corners at which the first to fourth surfaces 111 to 114 are connected to each other may be chamfered.

Coupling members (not shown) may be provided to couple the first to third Halbach arrays 120, 130, and 140 to the respective surfaces 111, 112, 113, and 114.

Although not illustrated in the drawings, an arc discharge hole (not shown) may be formed through one or more of the first surface 111, the second surface 112, the third surface 113, and the fourth surface 114. The arc discharge hole (not shown) may serve as a path through which an arc generated in the space part 115 is discharged.

A space surrounded by the first to fourth surfaces 111 to 114 may be defined as the space part 115.

The fixed contactor 22 and the movable contactor 43 are accommodated in the space part 115. In addition, the arc chamber 21 is accommodated in the space part 115.

In the space part 115, the movable contactor 43 may be moved in a direction toward the fixed contactor 22 (i.e., the downward direction) or a direction away from the fixed contactor 22 (i.e., the upward direction).

In addition, an arc path A.P of an arc generated in the arc chamber 21 is formed in the space part 115. This is achieved by the magnetic field formed by the first to third Halbach arrays 120, 130, and 140.

A central portion of the space part 115 may be defined as the central part C. A straight line distance from each of corners at which the first to fourth surfaces 111 to 114 are connected to each other to the central part C may be formed to be equal to each other.

The central part C may be located between the first fixed contactor 22*a* and the second fixed contactor 22*b*. In addition, a central portion of the movable contactor part 40 is located vertically below the central part C. That is, a central portion of each of the housing 41, the cover 42, the movable contactor 43, the shaft 44, the elastic part 45, and the like is located vertically below the central part C.

Accordingly, when the generated arc is moved toward the central part C, the above components may be damaged. In order to prevent this, the arc path formation unit 100 according to the present embodiment includes the first Halbach array 120, the second Halbach array 130, and the third Halbach array 140.

In the illustrated embodiment, the plurality of magnetic materials constituting the first Halbach array 120 are continuously disposed side by side from the left side to the right side. That is, in the illustrated embodiment, the first Halbach array 120 is formed to extend in the left-right direction.

The first Halbach array 120 may form a magnetic field together with another magnetic material. In the illustrated embodiment, the first Halbach array 120 may form magnetic fields together with the second and third Halbach arrays 130 and 140.

The first Halbach array 120 may be located adjacent to any one surface of the first and second surfaces 111 and 112. In one embodiment, the first Halbach array 120 may be coupled to an inner side (i.e., the side in a direction toward the space part 115) of the any one surface.

In the illustrated embodiment, the first Halbach array 120 is disposed on the inner side of the first surface 111 and adjacent to the first surface 111 and faces the second Halbach array 130 located on the inner side of the second surface 112.

The space part 115, and the fixed contactor 22 and the movable contactor 43 accommodated in the space part 115 are located between the first Halbach array 120 and the second Halbach array 130.

In addition, the space part 115, and the fixed contactor 22 and the movable contactor 43 accommodated in the space part 115 are located between the first Halbach array 120 and the third Halbach array 140.

The first Halbach array 120 may be located to be biased to any one surface of the third surface 113 and the fourth surface 114. In the embodiment illustrated in FIG. 5, the first Halbach array 120 is located to be biased to the third surface 113. In the embodiment illustrated in FIG. 6, the first Halbach array 120 is located to be biased to the fourth surface 114.

The first Halbach array 120 can enhance the strength of the magnetic field formed by itself and the strength of the magnetic fields formed together with the second Halbach array 130 and the third Halbach array 140. Since the process of enhancing the direction and magnetic field of the magnetic field formed by the first Halbach array 120 is a well-known technique, a detailed description thereof will be omitted.

In the illustrated embodiment, the first Halbach array 120 includes a first block 121, a second block 122, and a third block 123. It will be understood that the plurality of magnetic materials constituting the first Halbach array 120 are named as the blocks 121, 122, and 123, respectively.

The first to third blocks 121, 122, and 123 may each be formed of a magnetic material. In one embodiment, the first to third blocks 121, 122, and 123 may each be provided as a permanent magnet, an electromagnet, or the like.

The first to third blocks 121, 122, and 123 may be disposed in parallel in one direction. In the illustrated embodiment, the first to third blocks 121, 122, and 123 are disposed in parallel in a direction in which the first surface 111 extends, that is, in the left-right direction.

The first block 121 is located adjacent to the any one surface of the third surface 113 and the fourth surface 114. In addition, the third block 123 is located adjacent to the other surface of the third surface 113 and the fourth surface 114. The second block 122 is located between the first block 121 and the third block 123.

In one embodiment, the blocks 121, 122, and 123 adjacent to each other may be in contact with each other.

The second block 122 may be disposed to overlap a second block 132 of the second Halbach array 130 and any one of the fixed contactors 22*a* and 22*b* in a direction toward the second Halbach array 130 or the space part 115, i.e., in the front-rear direction in the illustrated embodiment.

Each of the blocks 121, 122, and 123 includes a plurality of surfaces.

Specifically, the first block 121 includes a first inner surface 121*a* facing the second block 122 and a first outer surface 121*b* opposite to the second block 122.

The second block 122 includes a second inner surface 122*a* facing the space part 115 or the second Halbach array 130 and a second outer surface 122*b* opposite to the space part 115 or the second Halbach array 130.

The third block 123 includes a third inner surface 123*a* facing the second block 122 and a third outer surface 123*b* opposite to the second block 122.

The plurality of surfaces of each of the blocks 121, 122, and 123 may be magnetized according to a predetermined rule to configure a Halbach array.

Specifically, the first to third inner surfaces 121*a*, 122*a*, and 123*a* may be magnetized to the same polarity. Similarly, the first to third outer surfaces 121*b*, 122*b*, and 123*b* may be magnetized to a polarity different from the polarity of the first to third inner surfaces 121*a*, 122*a*, and 123*a*.

At this point, the first to third inner surfaces 121*a*, 122*a*, and 123*a* may be magnetized to the same polarity as first to third inner surfaces 131*a*, 132*a*, and 133*a* of the second Halbach array 130 and first to third inner surfaces 141*a*, 142*a*, and 143*a* of the third Halbach array 140.

Similarly, the first to third outer surfaces 121*b*, 122*b*, and 123*b* may be magnetized to the same polarity as first to third outer surfaces 131*b*, 132*b*, and 133*b* of the second Halbach array 130 and first to third outer surfaces 141*b*, 142*b*, and 143*b* of the third Halbach array 140.

In the illustrated embodiment, the plurality of magnetic materials constituting the second Halbach array 130 are continuously disposed side by side from the left side to the right side. That is, in the illustrated embodiment, the second Halbach array 130 is formed to extend in the left-right direction.

The second Halbach array 130 may form a magnetic field together with another magnetic material. In the illustrated embodiment, the second Halbach array 130 may form magnetic fields together with the first and third Halbach arrays 120 and 140.

The second Halbach array 130 may be located adjacent to the other surface of the first and second surfaces 111 and 112. In one embodiment, the second Halbach array 130 may be coupled to the inner side (i.e., the side in a direction toward the space part 115) of the any one surface.

In the illustrated embodiment, the second Halbach array 130 is disposed on the inner side of the second surface 112 and adjacent to the second surface 112 and faces the first Halbach array 120 located on the inner side of the first surface 111.

The space part 115, and the fixed contactor 22 and the movable contactor 43 accommodated in the space part 115 are located between the second Halbach array 130 and the first Halbach array 120.

In addition, the space part 115, and the fixed contactor 22 and the movable contactor 43 accommodated in the space part 115 are located between the second Halbach array 130 and the third Halbach array 140.

The second Halbach array 130 may be located to be biased to the any one surface of the third surface 113 and the fourth surface 114. In the embodiment illustrated in FIG. 5, the second Halbach array 130 is located to be biased to the third surface 113. In the embodiment illustrated in FIG. 6, the second Halbach array 130 is located to be biased to the fourth surface 114.

The second Halbach array 130 can enhance the strength of the magnetic field formed by itself and the strength of the magnetic fields formed together with the first Halbach array 120 and the third Halbach array 140. Since the process of enhancing the direction and magnetic field of the magnetic field formed by the second Halbach array 130 is a well-known technique, a detailed description thereof will be omitted.

In the illustrated embodiment, the second Halbach array 130 includes a first block 131, the second block 132, and a third block 133. It will be understood that the plurality of magnetic materials constituting the second Halbach array 130 are named as the blocks 131, 132, and 133, respectively.

The first to third blocks 131, 132, and 133 may each be formed of a magnetic material. In one embodiment, the first to third blocks 131, 132, and 133 may each be provided as a permanent magnet, an electromagnet, or the like.

The first to third blocks 131, 132, and 133 may be disposed in parallel in one direction. In the illustrated embodiment, the first to third blocks 131, 132, and 133 are disposed in parallel in a direction in which the second surface 112 extends, that is, in the left-right direction.

The first block 131 is located adjacent to the any one surface of the third surface 113 and the fourth surface 114. In addition, the third block 133 is located adjacent to the other surface of the third surface 113 and the fourth surface 114. The second block 132 is located between the first block 131 and the third block 133.

In one embodiment, the blocks 131, 132, and 133 adjacent to each other may be in contact with each other.

The second block 132 may be disposed to overlap the second block 122 of the first Halbach array 120 and any one of the fixed contactors 22*a* and 22*b* in a direction toward the first Halbach array 120 or the space part 115, i.e., in the front-rear direction in the illustrated embodiment.

Each of the blocks 131, 132, and 133 includes a plurality of surfaces.

Specifically, the first block 131 includes the first inner surface 131*a* facing the second block 132 and the first outer surface 131*b* opposite to the second block 132.

The second block 132 includes the second inner surface 132*a* facing the space part 115 or the first Halbach array 120, and the second outer surface 132*b* opposite to the space part 115 or the first Halbach array 120.

The third block 133 includes the third inner surface 133*a* facing the second block 132 and the third outer surface 133*b* opposite to the second block 132.

The plurality of surfaces of each of the blocks 131, 132, and 133 may be magnetized according to a predetermined rule to configure a Halbach array.

Specifically, the first to third inner surfaces 131*a*, 132*a*, and 133*a* may be magnetized to the same polarity. Similarly, the first to third outer surfaces 131*b*, 132*b*, and 133*b* may be magnetized to a polarity different from the polarity of the first to third inner surfaces 131*a*, 132*a*, and 133*a*.

At this point, the first to third inner surfaces 131*a*, 132*a*, and 133*a* may be magnetized to the same polarity as the first to third inner surfaces 121*a*, 122*a*, and 123*a* of the first Halbach array 120 and the first to third inner surfaces 141*a*, 142*a*, and 143*a* of the third Halbach array 140.

Similarly, the first to third outer surfaces 131*b*, 132*b*, and 133*b* may be magnetized to the same polarity as the first to third outer surfaces 121*b*, 122*b*, and 123*b* of the first Halbach array 120 and the first to third outer surfaces 141*b*, 142*b*, and 143*b* of the third Halbach array 140.

In the illustrated embodiment, the plurality of magnetic materials constituting the third Halbach array 140 are continuously disposed side by side from the left side to the right side. That is, in the illustrated embodiment, the third Halbach array 140 is formed to extend in the left-right direction.

The third Halbach array 140 may form a magnetic field together with another magnetic material. In the illustrated embodiment, the third Halbach array 140 may form magnetic fields together with the first and second Halbach arrays 120 and 130.

The third Halbach array 140 may be located adjacent to the other surface of the third and fourth surfaces 113 and 114. In one embodiment, the first third Halbach array 140 may be coupled to the inner side (i.e., the side in a direction toward the space part 115) of the any one surface.

At this point, the third Halbach array 140 is located on a surface opposite to any one surface of the third and fourth surfaces 113 and 114, to which the first and second Halbach arrays 120 and 130 are located to be biased.

In the embodiment illustrated in FIG. 5, the third Halbach array 140 is located adjacent to the fourth surface 114. At this point, the first and second Halbach arrays 120 and 130 are located to be biased to the third surface 113.

In the embodiment illustrated in FIG. 6, the third Halbach array 140 is located adjacent to the third surface 113. At this point, the first and second Halbach arrays 120 and 130 are located to be biased to the fourth surface 114.

The third Halbach array 140 is disposed to face the other surface of the third and fourth surfaces 113 and 114, to which the third Halbach array 140 is not adjacent. The space part 115, and the fixed contactor 22 and the movable contactor 43 accommodated in the space part 115 are located between the third Halbach array 140 and the other surface.

The third Halbach array 140 is located between the first surface 111 and the second surface 112. In one embodiment, the third Halbach array 140 may be located at a central portion of the other surface of the third and fourth surfaces 113 and 114.

In other words, the shortest distance between the third Halbach array 140 and the first surface 111 and the shortest distance between the third Halbach array 140 and the second surface 112 may be the same.

The third Halbach array 140 can enhance the strength of the magnetic field formed by itself and the strength of the magnetic fields formed together with the first Halbach array 120 and the second Halbach array 130. Since the process of enhancing the direction and magnetic field of the magnetic field formed by the third Halbach array 140 is a well-known technique, a detailed description thereof will be omitted.

In the illustrated embodiment, the third Halbach array 140 includes a first block 141, a second block 142, and a third block 143. It will be understood that the plurality of magnetic materials constituting the third Halbach array 140 are named as the blocks 141, 142, and 143, respectively.

The first to third blocks 141, 142, and 143 may each be formed of a magnetic material. In one embodiment, the first to third blocks 141, 142, and 143 may each be provided as a permanent magnet, an electromagnet, or the like.

The first to third blocks 141, 142, and 143 may be disposed in parallel in one direction. In the illustrated embodiment, the first to third blocks 141, 142, and 143 are disposed in parallel in a direction in which the third surface 113 or the fourth surface 114 extends, that is, in the front-rear direction.

The first block 141 is located at the most rear side. That is, the first block 141 is located adjacent to the first surface 111. In addition, the third block 143 is located at the most front side. That is, the third block 143 is located adjacent to the second surface 112. The second block 142 is located between the first block 141 and the third block 143.

In one embodiment, the blocks 141, 142, and 143 adjacent to each other may be in contact with each other.

The second block 142 may be disposed to overlap the fixed contactors 22*a* and 22*b* in a direction toward the space part 115, i.e., in the left-right direction in the illustrated embodiment.

Each of the blocks 141, 142, and 143 includes a plurality of surfaces.

Specifically, the first block 141 includes the first inner surface 141*a* facing the second block 142 and the first outer surface 141*b* opposite to the second block 142.

The second block 142 includes the second inner surface 142*a* facing the space part 115 and the second outer surface 142*b* opposite to the space part 115.

The third block 143 includes the third inner surface 143*a* facing the second block 142 and the third outer surface 143*b* opposite to the second block 142.

The plurality of surfaces of each of the blocks 141, 142, and 143 may be magnetized according to a predetermined rule to configure a Halbach array.

Specifically, the first to third inner surfaces 141*a*, 142*a*, and 143*a* may be magnetized to the same polarity. Similarly, the first to third outer surfaces 141*b*, 142*b*, and 143*b* may be magnetized to a polarity different from the polarity of the first to third inner surfaces 141*a*, 142*a*, and 143*a*.

At this point, the first to third inner surfaces 141*a*, 142*a*, and 143*a* may be magnetized to the same polarity as the first to third inner surfaces 121*a*, 122*a*, and 123*a* of the first Halbach array 120 and the first to third inner surfaces 131*a*, 132*a*, and 133*a* of the second Halbach array 130.

Similarly, the first to third outer surfaces 141*b*, 142*b*, and 143*b* may be magnetized to the same polarity as the first to third outer surfaces 121*b*, 122*b*, and 123*b* of the first Halbach array 120 and the first to third outer surfaces 131*b*, 132*b*, and 133*b* of the second Halbach array 130.

Hereinafter, the arc path A.P formed by the arc path formation unit 100 according to the present embodiment will be described in detail with reference to FIGS. 7 and 8.

Figure 7:
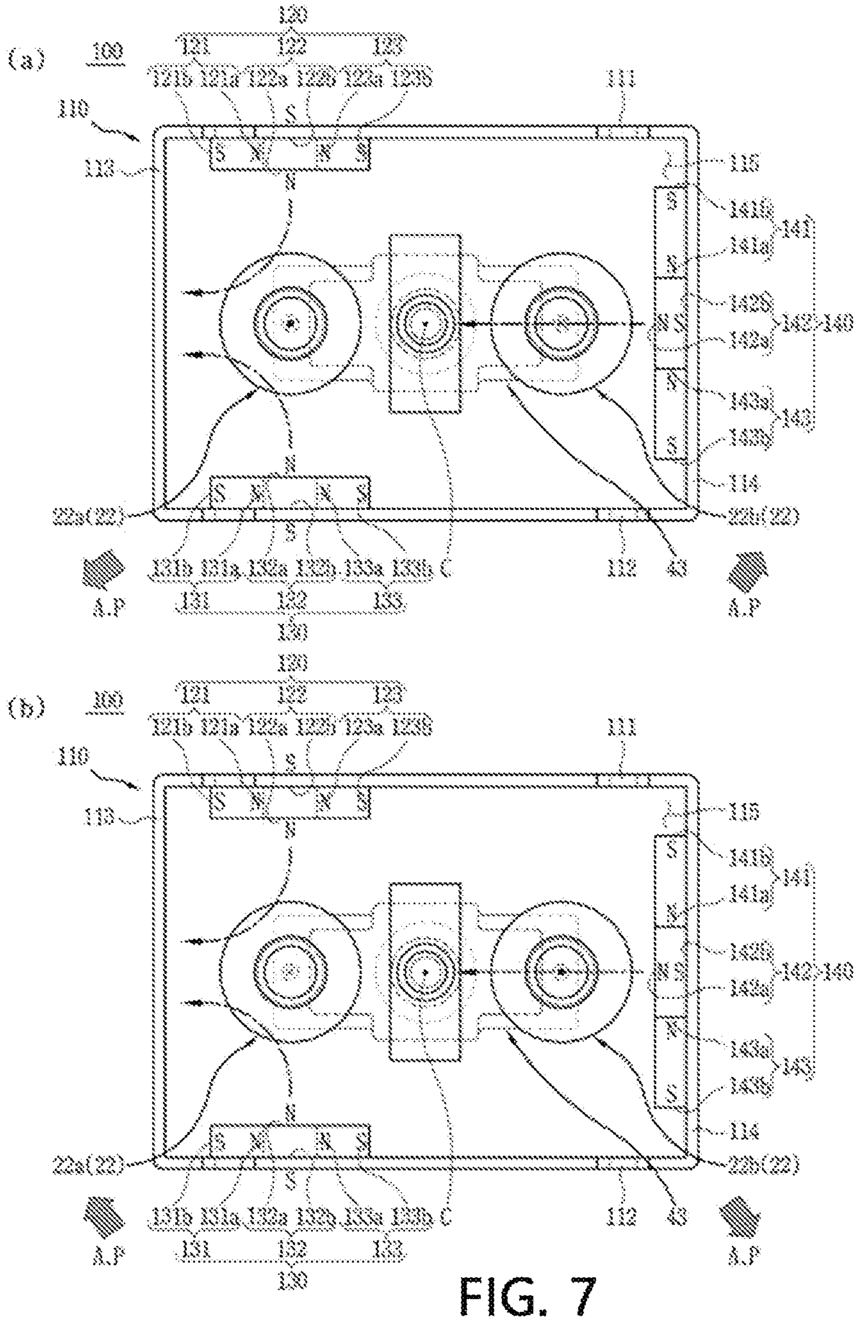
FIGS. 7 and 8 are conceptual views illustrating magnetic fields and arc paths formed by the arc path formation unit according to the embodiment of FIGS. 5 and 6.
Figure 8:
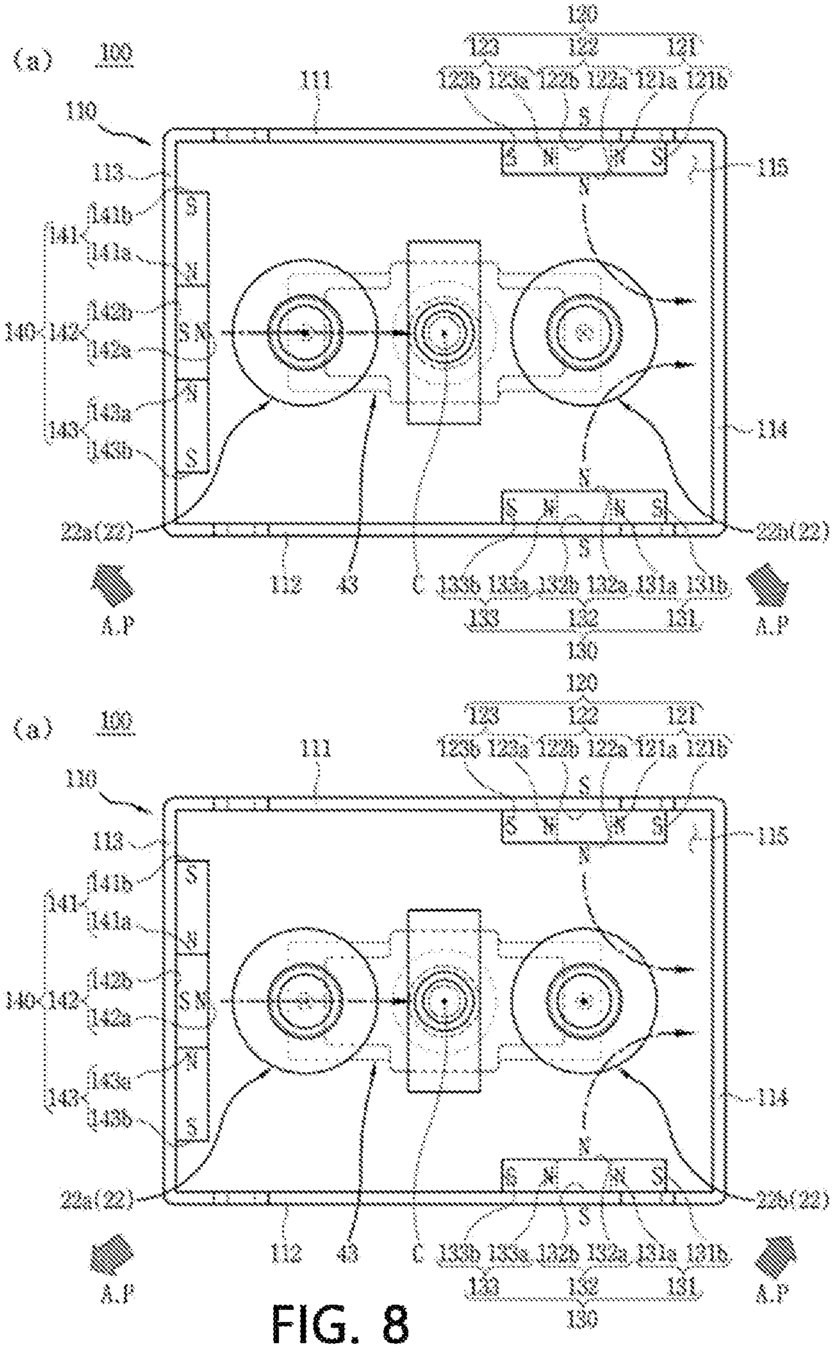

Referring to FIGS. 7 and 8, the first to third inner surfaces 121*a*, 122*a*, and 123*a* of the first Halbach array 120 are magnetized to N poles. According to the above-described rule, the first to third inner surfaces 131*a*, 132*a*, and 133*a* of the second Halbach array 130 and the first to third inner surfaces 141*a*, 142*a*, and 143*a* of the third Halbach array 140 are also magnetized to N poles.

Accordingly, magnetic fields that repel each other are formed between the first Halbach array 120 and the second Halbach array 130. In addition, in the third Halbach array 140, a magnetic field diverging in a direction from the second inner surface 142*a* toward the space part 115 is formed.

Accordingly, in the embodiment illustrated in FIG. 7, the magnetic fields formed by the first to third Halbach arrays 120, 130, and 140 are formed toward the third surface 113, i.e., toward the left side in the illustrated embodiment.

In addition, in the embodiment illustrated in FIG. 8, the magnetic fields formed by the first to third Halbach arrays 120, 130, and 140 are formed toward the fourth surface 114, i.e., toward the right side in the illustrated embodiment.

In the embodiment illustrated in FIG. 7A, a direction of current is a direction from the second fixed contactor 22*b* to the first fixed contactor 22*a* via the movable contactor 43.

When the Fleming's left-hand rule is applied to the first fixed contactor 22*a*, an electromagnetic force generated in the vicinity of the first fixed contactor 22*a* is formed toward a front left side.

Accordingly, an arc path A.P generated in the vicinity of the first fixed contactor 22*a* is also formed toward the front left side.

Similarly, when the Fleming's left-hand rule is applied to the second fixed contactor 22*b*, an electromagnetic force generated in the vicinity of the second fixed contactor 22*b* is formed toward a rear right side.

Accordingly, an arc path A.P generated in the vicinity of the second fixed contactor 22*b* is also formed toward the rear right side.

In the embodiment illustrated in FIG. 7B, a direction of current is a direction from the first fixed contactor 22*a* to the second fixed contactor 22*b* via the movable contactor 43.

When the Fleming's left-hand rule is applied to the first fixed contactor 22*a*, an electromagnetic force generated in the vicinity of the first fixed contactor 22*a* is formed toward a rear left side.

Accordingly, the arc path A.P generated in the vicinity of the first fixed contactor 22*a* is also formed toward the rear left side.

Similarly, when the Fleming's left-hand rule is applied to the second fixed contactor 22*b*, an electromagnetic force generated in the vicinity of the second fixed contactor 22*b* is formed toward a front right side.

Accordingly, the arc path A.P generated in the vicinity of the second fixed contactor 22*b* is also formed toward the front right side.

In the embodiment illustrated in FIG. 8A, a direction of current is a direction from the second fixed contactor 22*b* to the first fixed contactor 22*a* via the movable contactor 43.

When the Fleming's left-hand rule is applied to the first fixed contactor 22*a*, an electromagnetic force generated in the vicinity of the first fixed contactor 22*a* is formed toward the rear left side.

Accordingly, the arc path A.P generated in the vicinity of the first fixed contactor 22*a* is also formed toward the rear left side.

Similarly, when the Fleming's left-hand rule is applied to the second fixed contactor 22*b*, an electromagnetic force generated in the vicinity of the second fixed contactor 22*b* is formed toward the front right side.

Accordingly, the arc path A.P generated in the vicinity of the second fixed contactor 22*b* is also formed toward the front right side.

In the embodiment illustrated in FIG. 8B, a direction of current is a direction from the first fixed contactor 22*a* to the second fixed contactor 22*b* via the movable contactor 43.

When the Fleming's left-hand rule is applied to the first fixed contactor 22*a*, an electromagnetic force generated in the vicinity of the first fixed contactor 22*a* is formed toward the front left side.

Accordingly, the arc path A.P generated in the vicinity of the first fixed contactor 22*a* is also formed toward the front left side.

Similarly, when the Fleming's left-hand rule is applied to the second fixed contactor 22*b*, an electromagnetic force generated in the vicinity of the second fixed contactor 22*b* is formed toward the rear right side.

Accordingly, the arc path A.P generated in the vicinity of the second fixed contactor 22*b* is also formed toward the rear right side.

Although not illustrated in the drawing, when the polarity of each surface of the first to third Halbach arrays 120, 130, and 140 is changed, the direction of the magnetic field formed in each of first to third Halbach arrays 120, 130, and 140 is reversed. Accordingly, the generated electromagnetic force and the arc path A.P are also formed so that the front-rear direction thereof is reversed.

That is, in the electric connection situation shown in FIG. 7A, the electromagnetic force and the arc path A.P in the vicinity of the first fixed contactor 22*a* are formed toward the rear left side. In addition, the electromagnetic force and the arc path A.P in the vicinity of the second fixed contactor 22*b* are formed toward the front right side.

Similarly, in the electric connection situation shown in FIG. 7B, the electromagnetic force and the arc path A.P in the vicinity of the first fixed contactor 22*a* are formed toward the front left side. In addition, the electromagnetic force and the arc path A.P in the vicinity of the second fixed contactor 22*b* are formed toward the rear right side.

In addition, in the electric connection situation shown in FIG. 8A, the electromagnetic force and the arc path A.P in the vicinity of the first fixed contactor 22*a* are formed toward the front left side. In addition, the electromagnetic force and the arc path A.P in the vicinity of the second fixed contactor 22*b* are formed toward the rear right side.

Similarly, in the electric connection situation shown in FIG. 8B, the electromagnetic force and the arc path A.P in the vicinity of the first fixed contactor 22*a* are formed toward the rear left side. In addition, the electromagnetic force and the arc path A.P in the vicinity of the second fixed contactor 22*b* are formed toward the front right side.

Accordingly, in the arc path formation unit 100 according to the present embodiment, the electromagnetic force and the arc path A.P may be formed in a direction away from the central part C regardless of the polarity of each of the first to third Halbach arrays 120, 130, and 140 or the direction of the current flowing through the direct current relay 1.

Accordingly, damage to each component of the direct current relay 1 disposed adjacent to the central part C can be prevented. Furthermore, since the generated arc can be quickly discharged to the outside, operational reliability of the direct current relay 1 can be improved.

(2) Description of Arc Path Formation Unit 200 According to Another Embodiment of Present Disclosure Hereinafter, an arc path formation unit 200 according to another embodiment of the present disclosure will be described in detail with reference to FIGS. 9 to 12.

Figure 9:
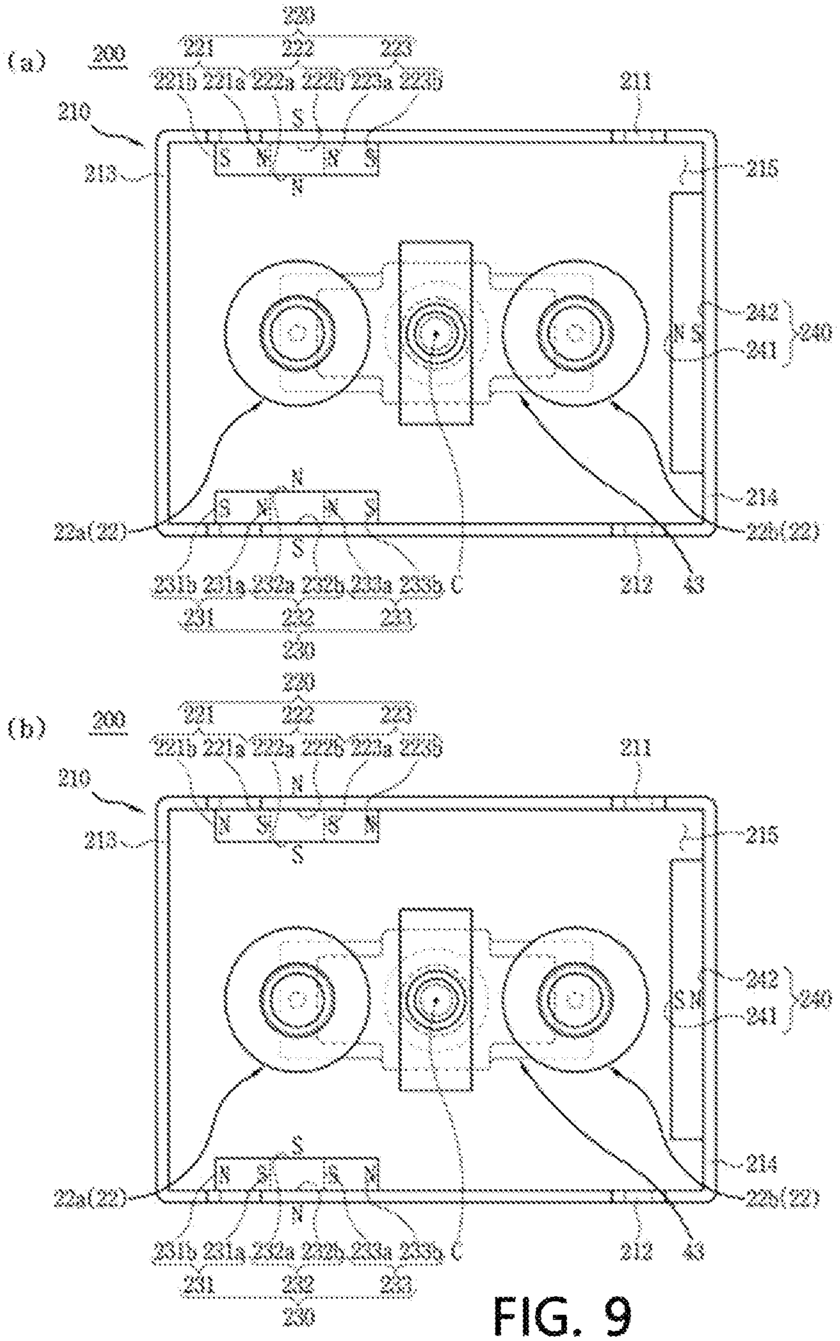
FIGS. 9 and 10 are conceptual views illustrating an arc path formation unit according to another embodiment of the present disclosure.
Figure 10:
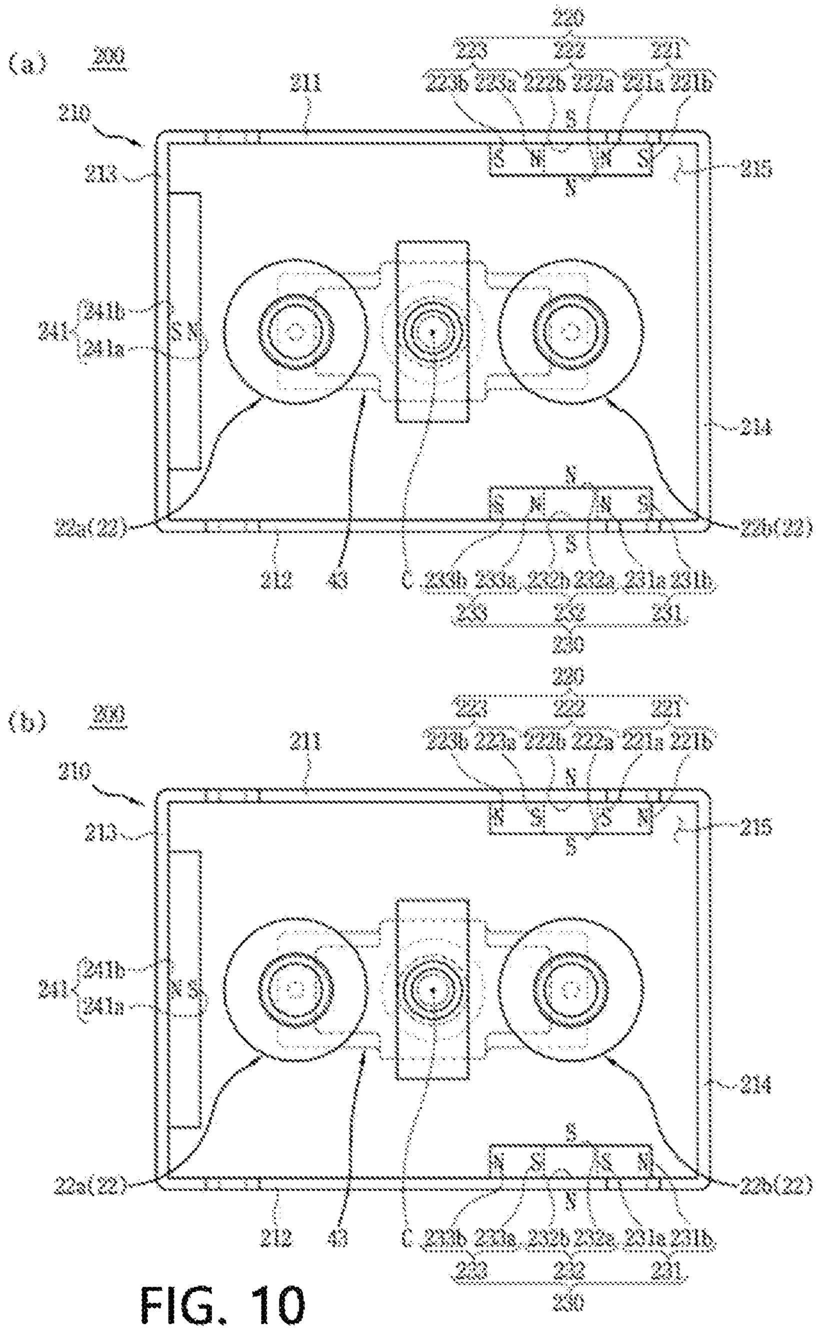

Referring to FIGS. 9 and 10, the arc path formation unit 200 according to the illustrated embodiment includes a magnet frame 210, a first Halbach array 220, a second Halbach array 230, and a magnet unit 240.

The magnet frame 210 according to the present embodiment has the same structure and function as the magnet frame 110 according to the above-described embodiment. However, there is a difference in the arrangement method of the first and second Halbach arrays 220 and 230 and the magnet unit 240 disposed in the magnet frame 210 according to the present embodiment.

Accordingly, a description of the magnet frame 210 will be replaced with the description of the magnet frame 110 according to the above-described embodiment.

In the illustrated embodiment, the plurality of magnetic materials constituting the first Halbach array 220 are continuously disposed side by side from the left side to the right side. That is, in the illustrated embodiment, the first Halbach array 220 is formed to extend in the left-right direction.

The first Halbach array 220 may form a magnetic field together with another magnetic material. In the illustrated embodiment, the first Halbach array 220 may form magnetic fields together with the second Halbach array 230 and the magnet unit 240.

The first Halbach array 220 may be located adjacent to any one surface of first and second surfaces 211 and 212. In one embodiment, the first Halbach array 220 may be coupled to an inner side (i.e., the side in a direction toward a space part 215) of the any one surface.

In the illustrated embodiment, the first Halbach array 220 is disposed on an inner side of the first surface 211 and adjacent to the first surface 211 and faces the second Halbach array 230 located on an inner side of the second surface 212.

The space part 215, and the fixed contactor 22 and the movable contactor 43 accommodated in the space part 215 are located between the first Halbach array 220 and the second Halbach array 230.

In addition, the space part 215, and the fixed contactor 22 and the movable contactor 43 accommodated in the space part 215 are located between the first Halbach array 220 and the magnet unit 240.

The first Halbach array 220 may be located to be biased to any one surface of a third surface 213 and a fourth surface 214. In the embodiment illustrated in FIG. 9, the first Halbach array 220 is located to be biased to the third surface 213. In the embodiment illustrated in FIG. 10, the first Halbach array 220 is located to be biased to the fourth surface 214.

The first Halbach array 220 can enhance the strength of the magnetic field formed by itself and the strength of the magnetic fields formed together with the second Halbach array 230 and the magnet unit 240. Since the process of enhancing the direction and magnetic field of the magnetic field formed by the first Halbach array 220 is a well-known technique, a detailed description thereof will be omitted.

In the illustrated embodiment, the first Halbach array 220 includes a first block 221, a second block 222, and a third block 223. It will be understood that the plurality of magnetic materials constituting the first Halbach array 220 are named as the blocks 221, 222, and 223, respectively.

The first to third blocks 221, 222, and 223 may each be formed of a magnetic material. In one embodiment, the first to third blocks 221, 222, and 223 may each be provided as a permanent magnet, an electromagnet, or the like.

The first to third blocks 221, 222, and 223 may be disposed in parallel in one direction. In the illustrated embodiment, the first to third blocks 221, 222, and 223 are disposed in parallel in a direction in which the first surface 211 extends, that is, in the left-right direction.

The first block 221 is located adjacent to the any one surface of the third surface 213 and the fourth surface 214. In addition, the third block 223 is located adjacent to the other surface of the third surface 213 and the fourth surface 214. The second block 222 is located between the first block 221 and the third block 223.

In one embodiment, the blocks 221, 222, and 223 adjacent to each other may be in contact with each other.

The second block 222 may be disposed to overlap a second block 232 of the second Halbach array 230 and any one of the fixed contactors 22*a* and 22*b* in a direction toward the second Halbach array 230 or the space part 215, i.e., in the front-rear direction in the illustrated embodiment.

Each of the blocks 221, 222, and 223 includes a plurality of surfaces.

Specifically, the first block 221 includes a first inner surface 221*a* facing the second block 222 and a first outer surface 221*b* opposite to the second block 222.

The second block 222 includes a second inner surface 222*a* facing the space part 215 or the second Halbach array 230 and a second outer surface 222*b* opposite to the space part 215 or the second Halbach array 230.

The third block 223 includes a third inner surface 223*a* facing the second block 222 and a third outer surface 223*b* opposite to the second block 222.

The plurality of surfaces of each of the blocks 221, 222, and 223 may be magnetized according to a predetermined rule to configure a Halbach array.

Specifically, the first to third inner surfaces 221*a*, 222*a*, and 223*a* may be magnetized to the same polarity. Similarly, the first to third outer surfaces 221*b*, 222*b*, and 223*b* may be magnetized to a polarity different from the polarity of the first to third inner surfaces 221*a*, 222*a*, and 223*a*.

At this point, the first to third inner surfaces 221*a*, 222*a*, and 223*a* may be magnetized to the same polarity as first to third inner surfaces 231*a*, 232*a*, and 233*a* of the second Halbach array 230 and a facing surface 241 of the magnet unit 240.

Similarly, the first to third outer surfaces 221*b*, 222*b*, and 223*b* may be magnetized to the same polarity as first to third outer surfaces 231*b*, 232*b*, and 233*b* of the second Halbach array 230 and an opposing surface 242 of the magnet unit 240.

In the illustrated embodiment, the plurality of magnetic materials constituting the second Halbach array 230 are continuously disposed side by side from the left side to the right side. That is, in the illustrated embodiment, the second Halbach array 230 is formed to extend in the left-right direction.

The second Halbach array 230 may form a magnetic field together with another magnetic material. In the illustrated embodiment, the second Halbach array 230 may form magnetic fields together with the first Halbach array 220 and the magnet unit 240.

The second Halbach array 230 may be located adjacent to the other surface of the first and second surfaces 211 and 212. In one embodiment, the second Halbach array 230 may be coupled to an inner side (i.e., the side in a direction toward the space part 215) of the any one surface.

In the illustrated embodiment, the second Halbach array 230 is disposed on the inner side of the second surface 212 and adjacent to the second surface 212 and faces the first Halbach array 220 located on the inner side of the first surface 211.

□j ixed contactor 22 and the movable contactor 43 accommodated in the space part 215 are located between the second Halbach array 230 and the first Halbach array 220.

In addition, the space part 215, and the fixed contactor 22 and the movable contactor 43 accommodated in the space part 215 are located between the second Halbach array 230 and the magnet unit 240.

The second Halbach array 230 may be located to be biased to the any one surface of the third surface 213 and the fourth surface 214. In the embodiment illustrated in FIG. 9, the second Halbach array 230 is located to be biased to the third surface 213. In the embodiment illustrated in FIG. 10, the second Halbach array 230 is located to be biased to the fourth surface 214.

The second Halbach array 230 can enhance the strength of the magnetic field formed by itself and the strength of the magnetic fields formed together with the first Halbach array 220 and the magnet unit 240. Since the process of enhancing the direction and magnetic field of the magnetic field formed by the second Halbach array 230 is a well-known technique, a detailed description thereof will be omitted.

In the illustrated embodiment, the second Halbach array 230 includes a first block 231, the second block 232, and a third block 233. It will be understood that the plurality of magnetic materials constituting the second Halbach array 230 are named as the blocks 231, 232, and 233, respectively.

The first to third blocks 231, 232, and 233 may each be formed of a magnetic material. In one embodiment, the first to third blocks 231, 232, and 233 may each be provided as a permanent magnet, an electromagnet, or the like.

The first to third blocks 231, 232, and 233 may be disposed in parallel in one direction. In the illustrated embodiment, the first to third blocks 231, 232, and 233 are disposed in parallel in a direction in which the second surface 212 extends, that is, in the left-right direction.

The first block 231 is located adjacent to the any one surface of the third surface 213 and the fourth surface 214. In addition, the third block 233 is located adjacent to the other surface of the third surface 213 and the fourth surface 214. The second block 232 is located between the first block 231 and the third block 233.

In one embodiment, the blocks 231, 232, and 233 adjacent to each other may be in contact with each other.

The second block 232 may be disposed to overlap the second block 222 of the first Halbach array 220 and any one of the fixed contactors 22*a* and 22*b* in a direction toward the first Halbach array 220 or the space part 215, i.e., in the front-rear direction in the illustrated embodiment.

Each of the blocks 231, 232, and 233 includes a plurality of surfaces.

Specifically, the first block 231 includes the first inner surface 231*a* facing the second block 232 and the first outer surface 231*b* opposite to the second block 232.

The second block 232 includes the second inner surface 232*a* facing the space part 215 or the first Halbach array 220, and the second outer surface 232*b* opposite to the space part 215 or the first Halbach array 220.

The third block 233 includes the third inner surface 233*a* facing the second block 232 and the third outer surface 233*b* opposite to the second block 232.

The plurality of surfaces of each of the blocks 231, 232, and 233 may be magnetized according to a predetermined rule to configure a Halbach array.

Specifically, the first to third inner surfaces 231*a*, 232*a*, and 233*a* may be magnetized to the same polarity. Similarly, the first to third outer surfaces 231*b*, 232*b*, and 233*b* may be magnetized to a polarity different from the polarity of the first to third inner surfaces 231*a*, 232*a*, and 233*a*.

At this point, the first to third inner surfaces 231*a*, 232*a*, and 233*a* may be magnetized to the same polarity as the first to third inner surfaces 221*a*, 222*a*, and 223*a* of the first Halbach array 220 and the facing surface 241 of the magnet unit 240.

Similarly, the first to third outer surfaces 231*b*, 232*b*, and 233*b* may be magnetized to the same polarity as the first to third outer surfaces 221*b*, 222*b*, and 223*b* of the first Halbach array 220 and the opposing surface 242 of the magnet unit 240.

The magnet unit 240 forms a magnetic field by itself, or forms magnetic fields together with the first and second Halbach arrays 220 and 230. An arc path A.P may be formed inside the arc chamber 21 by the magnetic field formed by the magnet unit 240.

The magnet unit 240 may be provided in any form capable of being magnetized to form a magnetic field. In one embodiment, the magnet unit 240 may be provided as a permanent magnet, an electromagnet, or the like.

The magnet unit 240 may be located adjacent to the other surface of the third and fourth surfaces 213 and 214. In one embodiment, the magnet unit 240 may be coupled to an inner side (i.e., the side in a direction toward the space part 215) of the other surface.

At this point, the magnet unit 240 is located on a surface opposite to any one surface of the third and fourth surfaces 213 and 214, to which the first and second Halbach arrays 220 and 230 are located to be biased.

The magnet unit 240 is disposed to face the other surface of the third and fourth surfaces 213 and 214 with the space part 215 therebetween.

In the embodiment illustrated in FIG. 9, the magnet unit 240 is located adjacent to the fourth surface 214. At this point, the first and second Halbach arrays 220 and 230 are located to be biased to the third surface 213.

In the embodiment illustrated in FIG. 10, the magnet unit 240 is located adjacent to the third surface 213. At this point, the first and second Halbach arrays 220 and 230 are located to be biased to the fourth surface 214.

The magnet unit 240 is disposed to face the any one surface of the third and fourth surfaces 213 and 214. The space part 215, and the fixed contactor 22 and the movable contactor 43 accommodated in the space part 215 are located between the magnet unit 240 and the any one surface.

The magnet unit 240 is located between the first surface 211 and the second surface 212. In one embodiment, the magnet unit 240 may be located at a central portion of the other surface of the third and fourth surfaces 213 and 214.

In other words, the shortest distance between the magnet unit 240 and the first surface 211 and the shortest distance between the magnet unit 240 and the second surface 212 may be the same.

The magnet unit 240 can enhance the strength of the magnetic field formed by itself and the strength of the magnetic fields formed together with the first and second Halbach arrays 220 and 230. Since the process of enhancing the direction and magnetic field of the magnetic field formed by the magnet unit 240 is well known in the art, a detailed description thereof will be omitted.

The magnet unit 240 is formed to extend in one direction. In the illustrated embodiment, the magnet unit 240 is formed to extend in a direction in which the third surface 213 or the fourth surface 214 extends, that is, in the front-rear direction.

The magnet unit 240 includes a plurality of surfaces.

Specifically, the magnet unit 240 includes the facing surface 241 facing the space part 215 or the fixed contactor 22 and the opposing surface 242 opposite to the space part 215 or the fixed contactor 22.

Each surface of the magnet unit 240 may be magnetized according to a predetermined rule.

Specifically, the facing surface 241 may be magnetized to the same polarity as the first to third inner surfaces 221*a*, 222*a*, and 223*a* of the first Halbach array 220. In addition, the facing surface 241 may be magnetized to the same polarity as the first to third inner surfaces 231*a*, 232*a*, and 233*a* of the second Halbach array 230.

Similarly, the opposing surface 242 may be magnetized to the same polarity as the first to third outer surfaces 221*b*, 222*b*, and 223*b* of the first Halbach array 220. In addition, the opposing surface 242 may be magnetized to the same polarity as the first to third outer surfaces 231*b*, 232*b*, and 233*b* of the second Halbach array 230.

At this point, it will be understood that the polarity of the facing surface 241 and the polarity of the opposing surface 242 are formed to be different from each other.

Hereinafter, the arc path A.P formed by the arc path formation unit 200 according to the present embodiment will be described in detail with reference to FIGS. 11 and 12.

Figure 11:
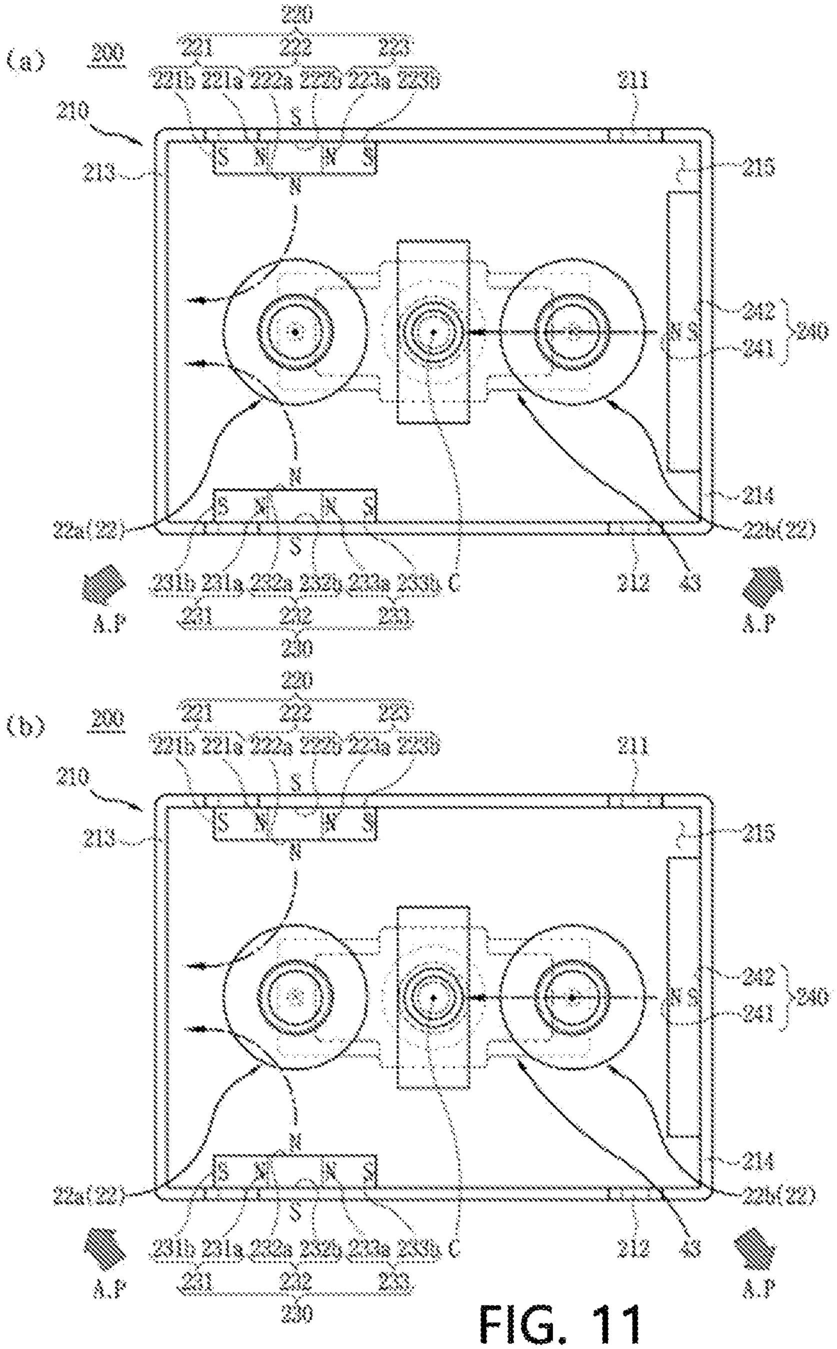
FIGS. 11 and 12 are conceptual views illustrating magnetic fields and arc paths formed by the arc path formation unit according to the embodiment of FIGS. 9 and 10.
Figure 12:
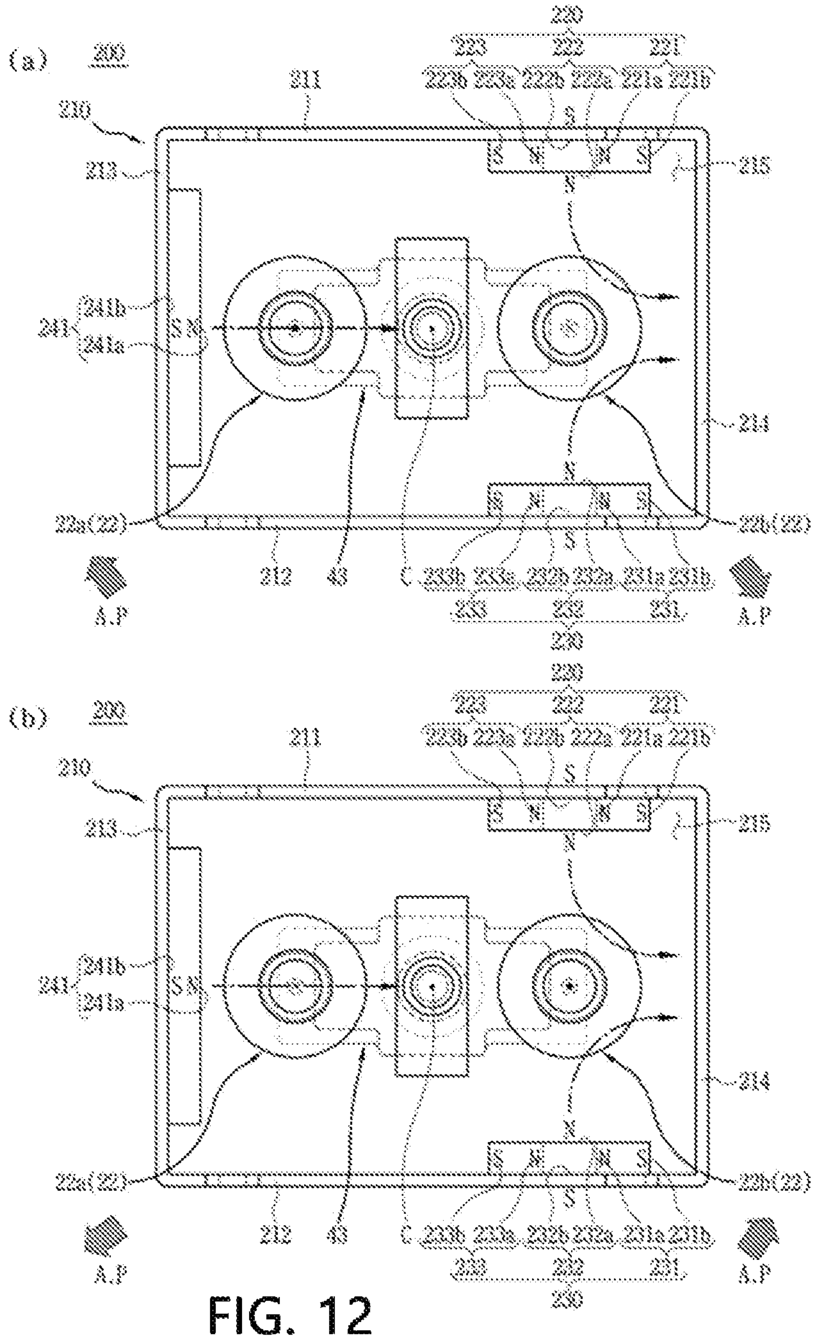

Referring to FIGS. 11 and 12, the first to third inner surfaces 221*a*, 222*a*, and 223*a* of the first Halbach array 220 are magnetized to N poles. According to the above-described rule, the first to third inner surfaces 231*a*, 232*a*, and 233*a* of the second Halbach array 230 and the facing surface 241 of the magnet unit 240 are also magnetized to N poles.

Accordingly, magnetic fields that repel each other are formed between the first Halbach array 220 and the second Halbach array 230. In addition, in the magnet unit 240, a magnetic field diverging in a direction from the facing surface 241 toward the space part 215 is formed.

Accordingly, in the embodiment illustrated in FIG. 11, the magnetic fields formed by the first Halbach array 220, the second Halbach array 230, and the magnet unit 240 are formed toward the third surface 213, i.e., toward the left side in the illustrated embodiment.

In addition, in the embodiment illustrated in FIG. 12, the magnetic fields formed by the first Halbach array 220, the second Halbach array 230, and the magnet unit 240 are formed toward the fourth surface 214, i.e., toward the right side in the illustrated embodiment.

In the embodiment illustrated in FIG. 11A, a direction of current is a direction from the second fixed contactor 22*b* to the first fixed contactor 22*a* via the movable contactor 43.

When the Fleming's left-hand rule is applied to the first fixed contactor 22*a*, an electromagnetic force generated in the vicinity of the first fixed contactor 22*a* is formed toward the front left side.

Accordingly, an arc path A.P generated in the vicinity of the first fixed contactor 22*a* is also formed toward the front left side.

Similarly, when the Fleming's left-hand rule is applied to the second fixed contactor 22*b*, an electromagnetic force generated in the vicinity of the second fixed contactor 22*b* is formed toward the rear right side.

Accordingly, an arc path A.P generated in the vicinity of the second fixed contactor 22*b* is also formed toward the rear right side.

In the embodiment illustrated in FIG. 11B, a direction of current is a direction from the first fixed contactor 22*a* to the second fixed contactor 22*b* via the movable contactor 43.

When the Fleming's left-hand rule is applied to the first fixed contactor 22*a*, an electromagnetic force generated in the vicinity of the first fixed contactor 22*a* is formed toward the rear left side.

Accordingly, the arc path A.P generated in the vicinity of the first fixed contactor 22*a* is also formed toward the rear left side.

Similarly, when the Fleming's left-hand rule is applied to the second fixed contactor 22*b*, an electromagnetic force generated in the vicinity of the second fixed contactor 22*b* is formed toward the front right side.

Accordingly, the arc path A.P generated in the vicinity of the second fixed contactor 22*b* is also formed toward the front right side.

In the embodiment illustrated in FIG. 12A, a direction of current is a direction from the second fixed contactor 22*b* to the first fixed contactor 22*a* via the movable contactor 43.

When the Fleming's left-hand rule is applied to the first fixed contactor 22*a*, an electromagnetic force generated in the vicinity of the first fixed contactor 22*a* is formed toward the rear left side.

Accordingly, the arc path A.P generated in the vicinity of the first fixed contactor 22*a* is also formed toward the rear left side.

Similarly, when the Fleming's left-hand rule is applied to the second fixed contactor 22*b*, an electromagnetic force generated in the vicinity of the second fixed contactor 22*b* is formed toward the front right side.

Accordingly, the arc path A.P generated in the vicinity of the second fixed contactor 22*b* is also formed toward the front right side.

In the embodiment illustrated in FIG. 12B, a direction of current is a direction from the first fixed contactor 22*a* to the second fixed contactor 22*b* via the movable contactor 43.

When the Fleming's left-hand rule is applied to the first fixed contactor 22*a*, an electromagnetic force generated in the vicinity of the first fixed contactor 22*a* is formed toward the front left side.

Accordingly, the arc path A.P generated in the vicinity of the first fixed contactor 22*a* is also formed toward the front left side.

Similarly, when the Fleming's left-hand rule is applied to the second fixed contactor 22*b*, an electromagnetic force generated in the vicinity of the second fixed contactor 22*b* is formed toward the rear right side.

Accordingly, the arc path A.P generated in the vicinity of the second fixed contactor 22*b* is also formed toward the rear right side.

Although not illustrated in the drawing, when the polarity of each surface of the first Halbach array 220, the second Halbach array 230, and the magnet unit 240 is changed, the direction of the magnetic field formed in each of the first Halbach array 220, the second Halbach array 230, and the magnet unit 240 is reversed. Accordingly, the generated electromagnetic force and the arc path A.P are also formed so that the front-rear direction thereof is reversed.

That is, in the electric connection situation shown in FIG. 11A, the electromagnetic force and the arc path A.P in the vicinity of the first fixed contactor 22*a* are formed toward the rear left side. In addition, the electromagnetic force and the arc path A.P in the vicinity of the second fixed contactor 22*b* are formed toward the front right side.

Similarly, in the electric connection situation shown in FIG. 111B, the electromagnetic force and the arc path A.P in the vicinity of the first fixed contactor 22*a* are formed toward the front left side. In addition, the electromagnetic force and the arc path A.P in the vicinity of the second fixed contactor 22*b* are formed toward the rear right side.

In addition, in the electric connection situation shown in FIG. 12A, the electromagnetic force and the arc path A.P in the vicinity of the first fixed contactor 22*a* are formed toward the front left side. In addition, the electromagnetic force and the arc path A.P in the vicinity of the second fixed contactor 22*b* are formed toward the rear right side.

Similarly, in the electric connection situation shown in FIG. 12B, the electromagnetic force and the arc path A.P in the vicinity of the first fixed contactor 22*a* are formed toward the rear left side. In addition, the electromagnetic force and the arc path A.P in the vicinity of the second fixed contactor 22*b* are formed toward the front right side.

Accordingly, in the arc path formation unit 200 according to the present embodiment, the electromagnetic force and the arc path A.P may be formed in a direction away from the central part C regardless of the polarity of each of the first Halbach array 220, the second Halbach array 230, and the magnet unit 240 or the direction of the current flowing through the direct current relay 1.

Accordingly, damage to each component of the direct current relay 1 disposed adjacent to the central part C can be prevented. Furthermore, since the generated arc can be quickly discharged to the outside, operational reliability of the direct current relay 1 can be improved.

(3) Description of Arc Path Formation Unit 300 According Still Another Embodiment of Present Disclosure Hereinafter, an arc path formation unit 300 according to still another embodiment of the present disclosure will be described in detail with reference to FIGS. 13 to 20.

Referring to FIGS. 13 to 16, the arc path formation unit 300 according to the illustrated embodiment includes a magnet frame 310, a Halbach array 320, a first magnet unit 330, and a second magnet unit 340.

The magnet frame 310 according to the present embodiment has the same structure and function as the magnet frame 110 according to the above-described embodiment. However, there is a difference in the arrangement method of the Halbach array 320, the first magnet unit 330, and the second magnet unit 340 disposed in the magnet frame 310 according to the present embodiment.

Accordingly, a description of the magnet frame 310 will be replaced with the description of the magnet frame 110 according to the above-described embodiment.

In the illustrated embodiment, the plurality of magnetic materials constituting the Halbach array 320 are continuously disposed side by side from the left side to the right side. That is, in the illustrated embodiment, the Halbach array 320 is formed to extend in the left-right direction.

The Halbach array 320 may form a magnetic field together with another magnetic material. In the illustrated embodiment, the Halbach array 320 may form a magnetic field together with the first and second magnet units 330 and 340.

The Halbach array 320 may be located adjacent to any one surface of first and second surfaces 311 and 312. In one embodiment, the Halbach array 320 may be coupled to an inner side (i.e., the side in a direction toward a space part 315) of the any one surface.

Figure 13:
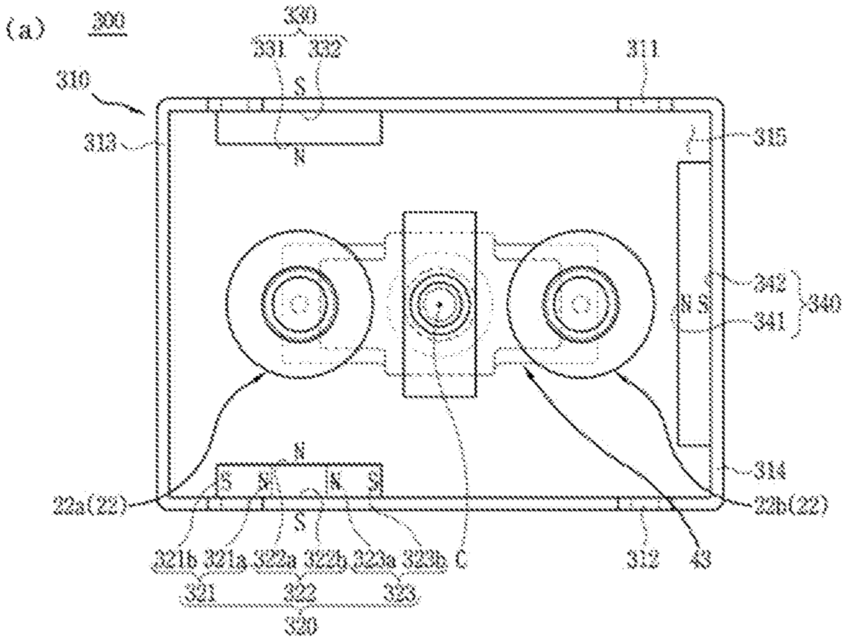
FIGS. 13 to 16 are conceptual views illustrating an arc path formation unit according to still another embodiment of the present disclosure.
Figure 13:
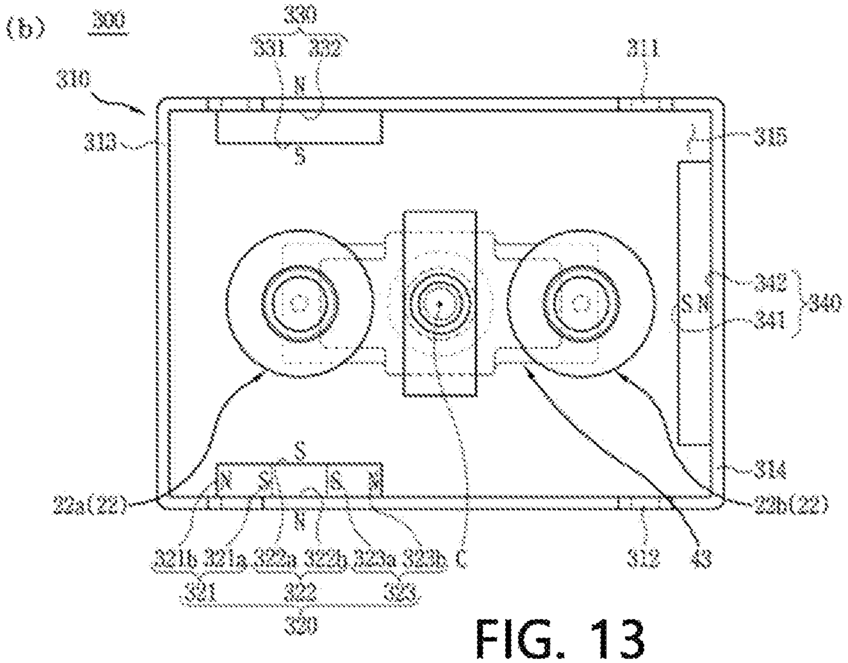
Figure 15:
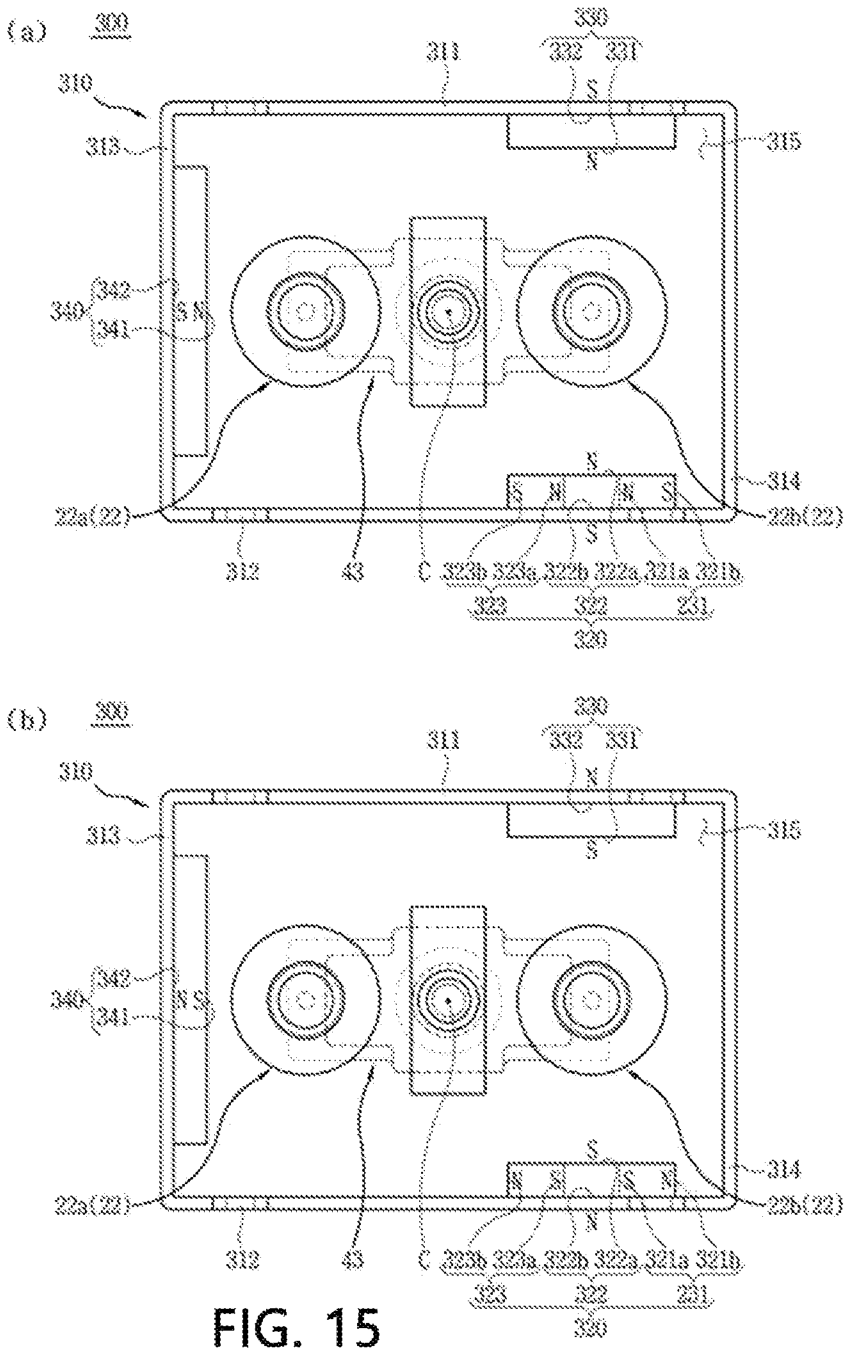

In the embodiment illustrated in FIGS. 13 and 15, the Halbach array 320 is disposed on an inner side of the second surface 312 and adjacent to the second surface 312 and faces the first magnet unit 330 located on an inner side of the first surface 311.

Figure 14:
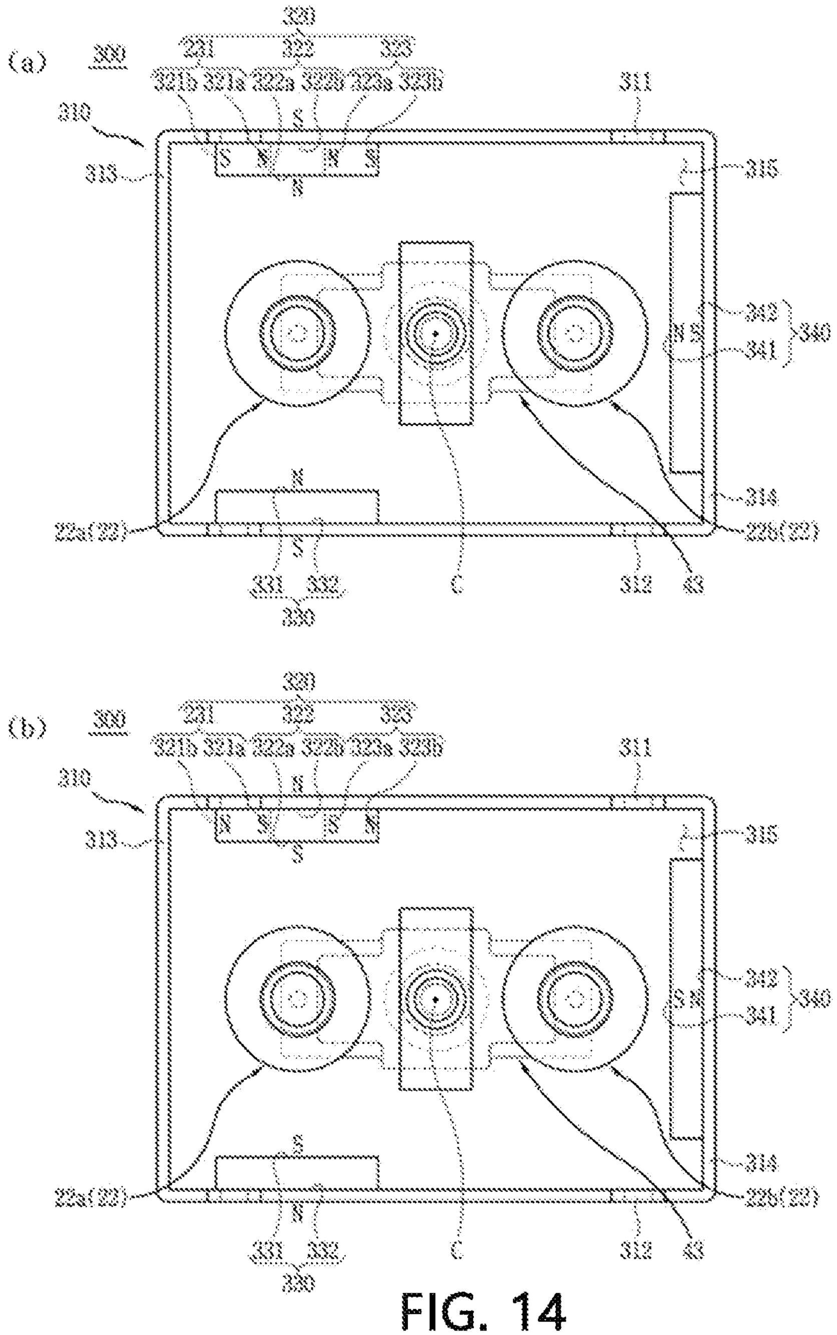
Figure 16:
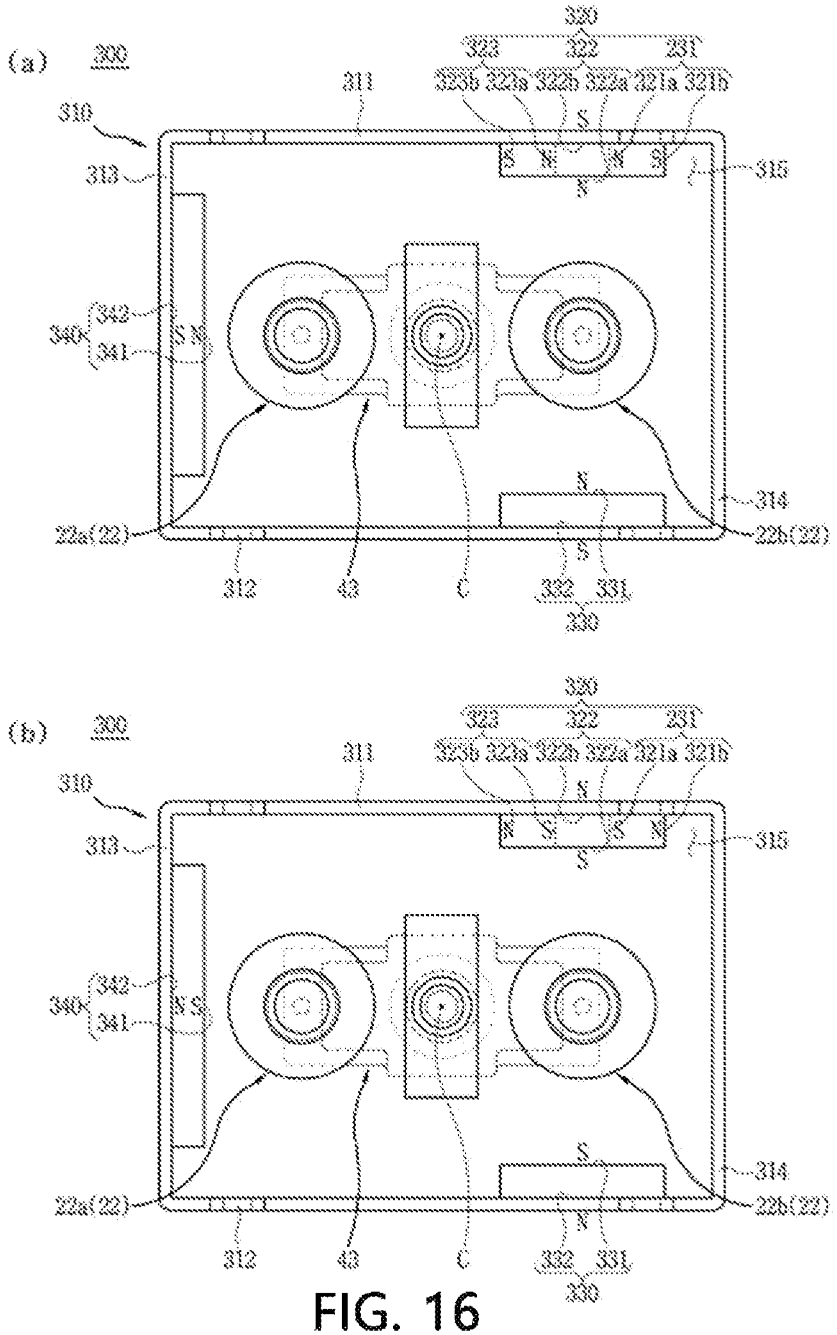

In the embodiment illustrated in FIGS. 14 and 16, the Halbach array 320 is disposed on the inner side of the first surface 311 and adjacent to the first surface 311 and faces the first magnet unit 330 located on the inner side of the second surface 312.

The space part 315, and the fixed contactor 22 and the movable contactor 43 accommodated in the space part 315 are located between the Halbach array 320 and the first magnet unit 330.

In addition, the space part 315, and the fixed contactor 22 and the movable contactor 43 accommodated in the space part 315 are located between the Halbach array 320 and the second magnet unit 340.

The Halbach array 320 may be located to be biased to any one surface of a third surface 313 and a fourth surface 314. In the embodiment illustrated in FIGS. 13 and 14, the Halbach array 320 is located to be biased to the third surface 313. In the embodiment illustrated in FIGS. 15 and 16, the Halbach array 320 is located to be biased to the fourth surface 314.

The Halbach array 320 can enhance the strength of the magnetic field formed by itself and the strength of the magnetic fields formed together with the first and second magnet units 330 and 340. Since the process of enhancing the direction and magnetic field of the magnetic field formed by the Halbach array 320 is a well-known technique, a detailed description thereof will be omitted.

In the illustrated embodiment, the first Halbach array 320 includes a first block 321, a second block 322, and a third block 323. It will be understood that the plurality of magnetic materials constituting the Halbach array 320 are named as the blocks 321, 322, and 323, respectively.

The first to third blocks as the blocks 321, 322, and 323 may each be formed of a magnetic material. In one embodiment, the first to third blocks as the blocks 321, 322, and 323 may each be provided as a permanent magnet, an electromagnet, or the like.

The first to third blocks as the blocks 321, 322, and 323 may be disposed in parallel in one direction. In the illustrated embodiment, the first to third blocks as the blocks 321, 322, and 323 are disposed in parallel in a direction in which the first surface 311 or the second surface 312 extends, that is, in the left-right direction.

The first block 321 is located adjacent to the any one surface of the third surface 313 and the fourth surface 314. In addition, the third block 323 is located adjacent to the other surface of the third surface 313 and the fourth surface 314. The second block 322 is located between the first block 321 and the third block 323.

In one embodiment, the blocks 321, 322, and 323 adjacent to each other may be in contact with each other.

The second block 322 may be disposed to overlap the first magnet unit 330 and any one of the fixed contactors **22*a* and 22*b* in a direction toward the first magnet unit 330 or the space part 315**, i.e., in the front-rear direction in the illustrated embodiment.

Each of the blocks 321, 322, and 323 includes a plurality of surfaces.

Specifically, the first block 321 includes a first inner surface **321*a* facing the second block 322 and a first outer surface 321*b* opposite to the second block 322**.

The second block 322 includes a second inner surface **322*a* facing the space part 315 or the first magnet unit 330 and a second outer surface 322*b* opposite to the space part 315 or the first magnet unit 330**.

The third block 323 includes a third inner surface **323*a* facing the second block 322 and a third outer surface 323*b* opposite to the second block 322**.

The plurality of surfaces of each of the blocks 321, 322, and 323 may be magnetized according to a predetermined rule to configure a Halbach array.

Specifically, the first to third inner surfaces **321*a*, 322*a*, and 323*a* may be magnetized to the same polarity. Similarly, the first to third outer surfaces 321*b*, 322*b*, and 323*b* may be magnetized to a polarity different from the polarity of the first to third inner surfaces 321*a*, 322*a*, and 323*a***.

At this point, the first to third inner surfaces **321*a*, 322*a*, and 323*a* may be magnetized to the same polarity as a first facing surface 331 of the first magnet unit 330 and a second facing surface 341 of the second magnet unit 340**.

Similarly, the first to third outer surfaces **321*b*, 322*b*, and 323*b* may be magnetized to the same polarity as a first opposing surface 332 of the first magnet unit 330 and a second opposing surface 342 of the second magnet unit 340**.

The first magnet unit 330 forms a magnetic field by itself, or forms magnetic fields together with the Halbach array 320 and the second magnet unit 340. An arc path A.P may be formed inside the arc chamber 21 by the magnetic field formed by the first magnet unit 330.

The first magnet unit 330 may be provided in any form capable of being magnetized to form a magnetic field. In one embodiment, the first magnet unit 330 may be provided as a permanent magnet, an electromagnet, or the like.

The first magnet unit 330 may be located adjacent to the other surface of the first and second surfaces 311 and 312. In one embodiment, the first magnet unit 330 may be coupled to an inner side (i.e., the side in a direction toward the space part 315) of the other surface.

At this point, the first magnet unit 330 is located on a surface opposite to any one surface of the first and second surfaces 311 and 312, to which the Halbach array 320 is located adjacent.

In the embodiment illustrated in FIGS. 13 and 15, the first magnet unit 330 is located adjacent to the first surface 311 and is disposed to face the Halbach array 320 located adjacent to the second surface 312.

In the embodiment illustrated in FIGS. 14 and 16, the first magnet unit 330 is located adjacent to the second surface 312 and is disposed to face the Halbach array 320 located adjacent to the first surface 311.

The space part 315, and the fixed contactor 22 and the movable contactor 43 accommodated in the space part 315 are located between the first magnet unit 330 and the Halbach array 320.

In addition, the space part 315, and the fixed contactor 22 and the movable contactor 43 accommodated in the space part 315 are located between the first magnet unit 330 and the second magnet unit 340.

The first magnet unit 330 may be located to be biased to the any one surface of the third surface 313 and the fourth surface 314. In the embodiment illustrated in FIGS. 13 and 14, the first magnet unit 330 is located to be biased to the third surface 313. In the embodiment illustrated in FIGS. 15 and 16, the first magnet unit 330 is located to be biased to the fourth surface 314.

The first magnet unit 330 can enhance the strength of the magnetic field formed by itself and the strength of the magnetic fields formed together with the Halbach array 320 and the second magnet unit 340. Since the process of enhancing the direction and magnetic field of the magnetic field formed by the first magnet unit 330 is well known in the art, a detailed description thereof will be omitted.

The first magnet unit 330 is formed to extend in one direction. In the illustrated embodiment, the first magnet unit 330 is formed to extend in a direction in which the first surface 311 or the second surface 312 extends, that is, in the left-right direction.

The first magnet unit 330 includes a plurality of surfaces.

Specifically, the first magnet unit 330 includes the first facing surface 331 facing the space part 315 or the fixed contactor 22 and the first opposing surface 332 opposite to the space part 315 or the fixed contactor 22.

Each surface of the first magnet unit 330 may be magnetized according to a predetermined rule.

Specifically, the first facing surface 331 may be magnetized to the same polarity as the first to third inner surfaces 321*a*, 322*a*, and 323*a* of the Halbach array 320. In addition, the first facing surface 331 may be magnetized to the same polarity as the second facing surface 341 of the second magnet unit 340.

Similarly, the first opposing surface 332 may be magnetized to the same polarity as the first to third outer surfaces 321*b*, 322*b*, and 323*b* of the Halbach array 320. In addition, the first opposing surface 332 may be magnetized to the same polarity as the second opposing surface 342 of the second magnet unit 340.

At this point, it will be understood that the polarity of the second facing surface 341 and the polarity of the second opposing surface 342 are formed to be different from each other.

The second magnet unit 340 forms a magnetic field by itself, or forms magnetic fields together with the Halbach array 320 and the first magnet unit 330. An arc path A.P may be formed inside the arc chamber 21 by the magnetic field formed by the second magnet unit 340.

The second magnet unit 340 may be provided in any form capable of being magnetized to form a magnetic field. In one embodiment, the second magnet unit 340 may be provided as a permanent magnet, an electromagnet, or the like.

The second magnet unit 340 may be located adjacent to the other surface of the third and fourth surfaces 313 and 314. In one embodiment, the second magnet unit 340 may be coupled to an inner side (i.e., the side in a direction toward the space part 315) of the other surface.

At this point, the second magnet unit 340 is located on a surface opposite to the any one surface of the third and fourth surfaces 313 and 314, to which the Halbach array 320 and the first magnet unit 330 are located to be biased.

The second magnet unit 340 is disposed to face the other surface of the third and fourth surfaces 313 and 314 with the space part 315 therebetween.

In the embodiment illustrated in FIGS. 13 and 14, the second magnet unit 340 is located adjacent to the fourth surface 314. At this point, the Halbach array 320 and the first magnet unit 330 are located to be biased to the third surface 313.

In the embodiment illustrated in FIGS. 15 and 16, the second magnet unit 340 is located adjacent to the third surface 313. At this point, the Halbach array 320 and the first magnet unit 330 are located to be biased to the fourth surface 314.

The second magnet unit 340 is disposed to face the other surface of the third and fourth surfaces 313 and 314. The space part 315, and the fixed contactor 22 and the movable contactor 43 accommodated in the space part 315 are located between the second magnet unit 340 and the other surface.

The second magnet unit 340 is located between the first surface 311 and the second surface 312. In one embodiment, the second magnet unit 340 may be located at a central portion of the other surface of the third and fourth surfaces 313 and 314.

In other words, the shortest distance between the second magnet unit 340 and the first surface 311 and the shortest distance between the second magnet unit 340 and the second surface 312 may be the same.

The second magnet unit 340 can enhance the strength of the magnetic field formed by itself and the strength of the magnetic fields formed together with the Halbach array 320 and the first magnet unit 330. Since the process of enhancing the direction and magnetic field of the magnetic field formed by the second magnet unit 340 is well known in the art, a detailed description thereof will be omitted.

The second magnet unit 340 is formed to extend in the other direction. In the illustrated embodiment, the second magnet unit 340 is formed to extend in a direction in which the third surface 313 or the fourth surface 314 extends, that is, in the front-rear direction.

The second magnet unit 340 includes a plurality of surfaces.

Specifically, the second magnet unit 340 includes the second facing surface 341 facing the space part 315 or the fixed contactor 22 and the second opposing surface 342 opposite to the space part 315 or the fixed contactor 22.

Each surface of the second magnet unit 340 may be magnetized according to a predetermined rule.

Specifically, the second facing surface 341 may be magnetized to the same polarity as the first to third inner surfaces 321*a*, 322*a*, and 323*a* of the Halbach array 320. In addition, the second facing surface 341 may be magnetized to the same polarity as the first facing surface 331 of the first magnet unit 330.

Similarly, the second opposing surface 342 may be magnetized to the same polarity as the first to third outer surfaces 321*b*, 322*b*, and 323*b* of the Halbach array 320. In addition, the second opposing surface 342 may be magnetized to the same polarity as the first opposing surface 332 of the first magnet unit 330.

At this point, it will be understood that the polarity of the second facing surface 341 and the polarity of the second opposing surface 342 are formed to be different from each other.

Hereinafter, an arc path A.P formed by the arc path formation unit 300 according to the present embodiment will be described in detail with reference to FIGS. 17 to 20.

Referring to FIGS. 17 to 20, the first to third inner surfaces 321*a*, 322*a*, and 323*a* of the Halbach array 320 are magnetized to N poles. According to the above-described rule, the first facing surface 331 of the first magnet unit 330 and the second facing surface 341 of the second magnet unit 340 are also magnetized to N poles.

Accordingly, magnetic fields that repel each other are formed between the Halbach array 320 and the first magnet unit 330. In addition, in the second magnet unit 340, a magnetic field diverging in a direction from the second facing surface 341 toward the space part 315 is formed.

Figure 17:
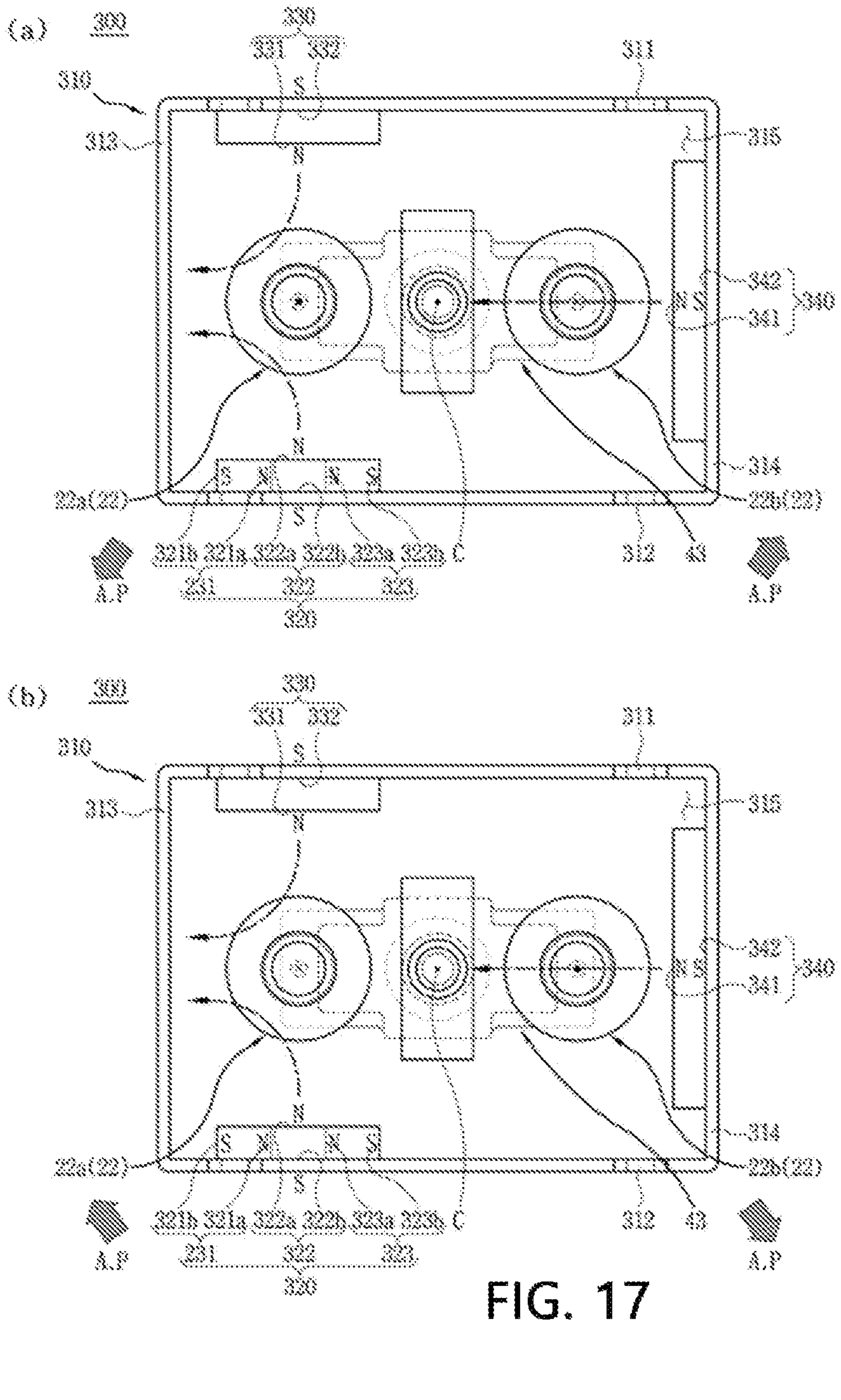
FIGS. 17 to 20 are conceptual views illustrating magnetic fields and arc paths formed by the arc path formation unit according to the embodiment of FIGS. 13 to 16.
Figure 18:
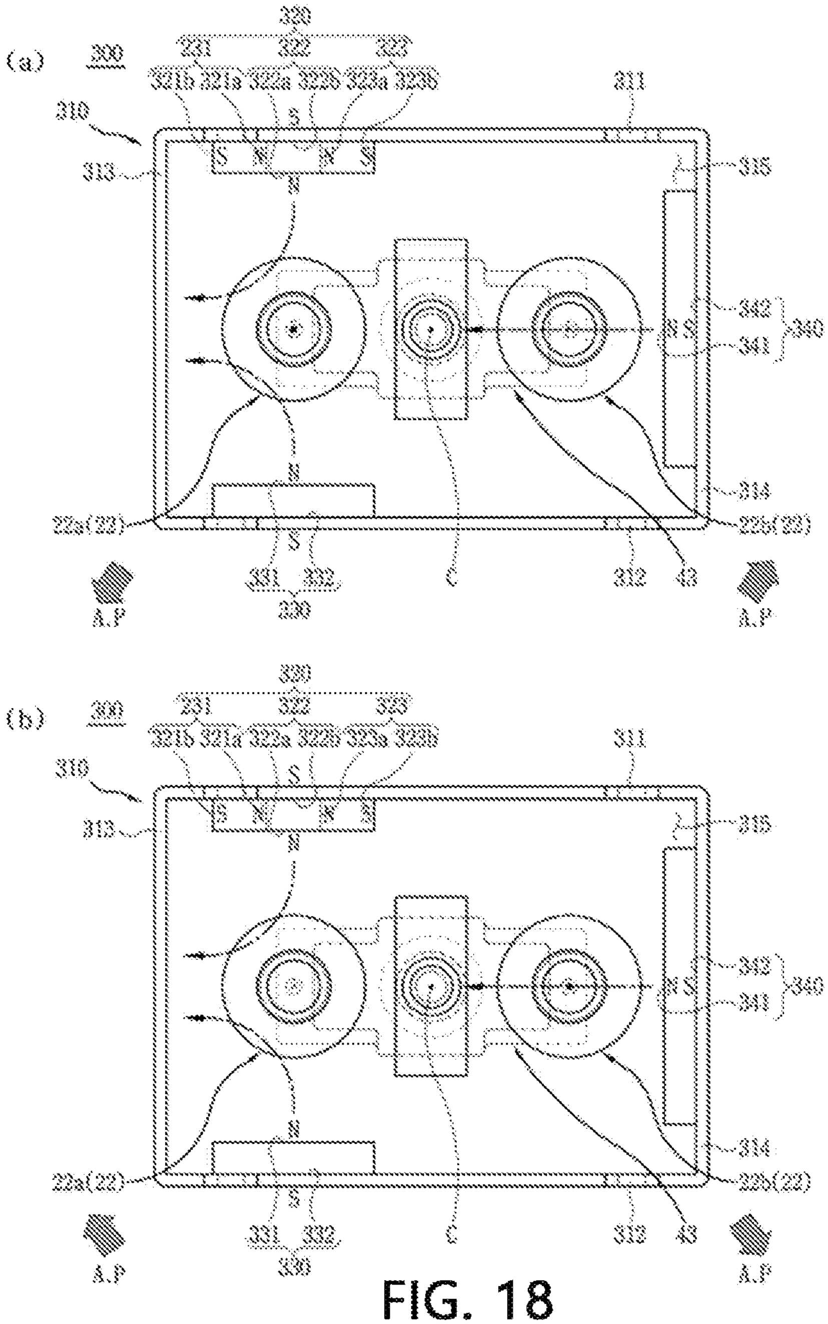

Accordingly, in the embodiment illustrated in FIGS. 17 and 18, the magnetic fields formed by the Halbach array 320 and the first and second magnet units 330 and 340 are formed toward the third surface 313, i.e., toward the left side in the illustrated embodiment.

Figure 19:
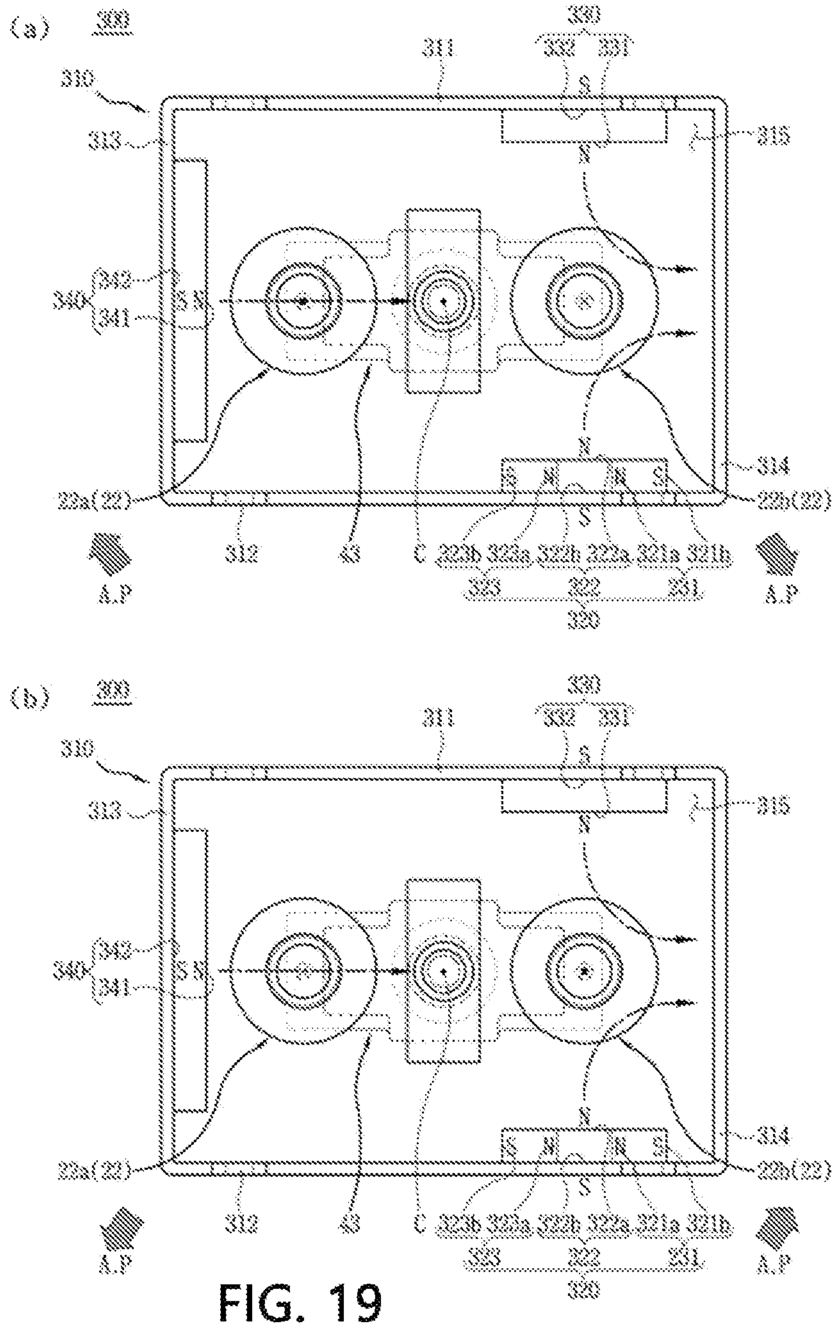
Figure 20:
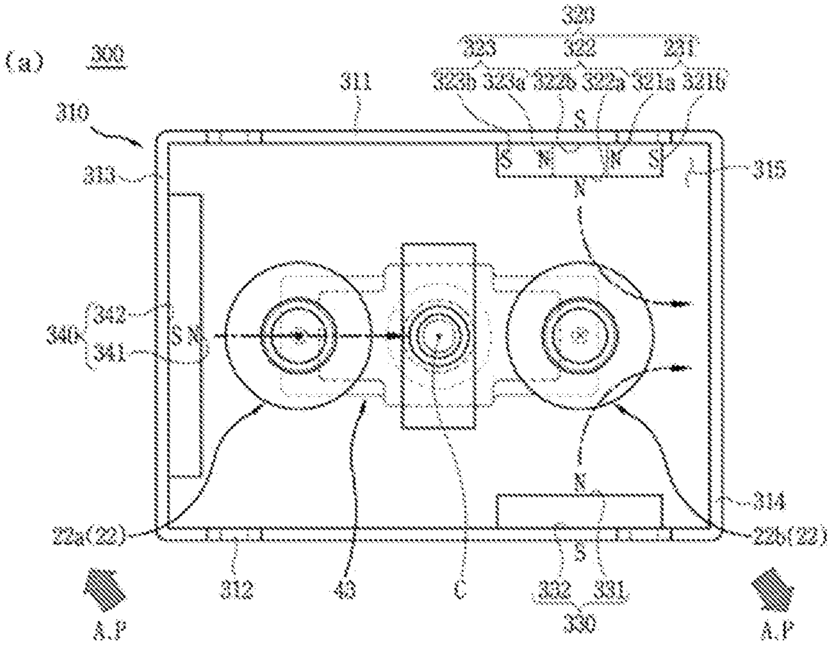
Figure 20:
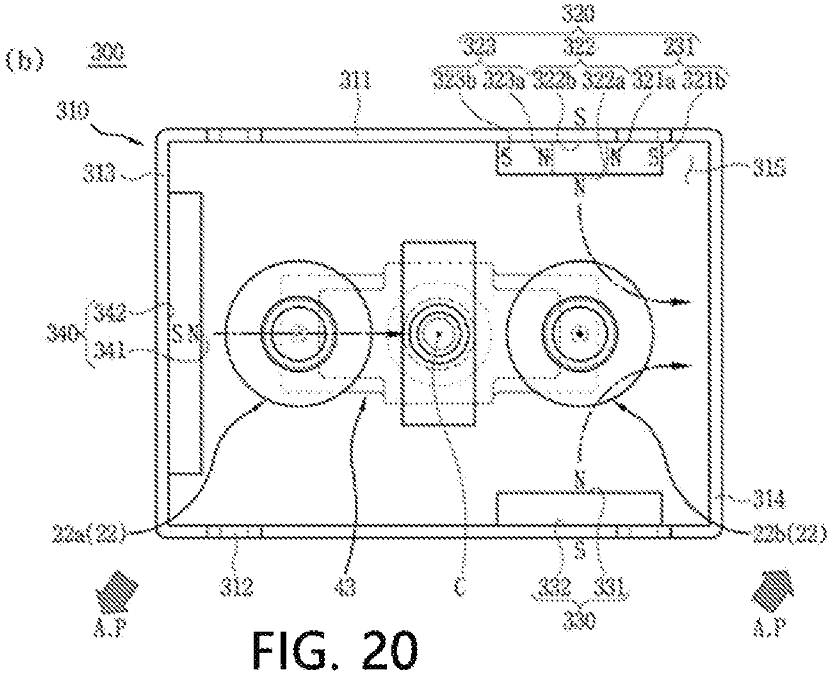

In addition, in the embodiment illustrated in FIGS. 19 and 20, the magnetic fields formed by the Halbach array 320 and the first and second magnet units 330 and 340 are formed toward the fourth surface 314, i.e., toward the right side in the illustrated embodiment.

In the embodiment illustrated in FIGS. 17A and 18A, a direction of current is a direction from the second fixed contactor **22*b* to the first fixed contactor 22*a* via the movable contactor 43**.

When the Fleming's left-hand rule is applied to the first fixed contactor **22*a*, an electromagnetic force generated in the vicinity of the first fixed contactor 22*a*** is formed toward the front left side.

Accordingly, the arc path A.P generated in the vicinity of the first fixed contactor **22*a*** is also formed toward the front left side.

Similarly, when the Fleming's left-hand rule is applied to the second fixed contactor **22*b*, an electromagnetic force generated in the vicinity of the second fixed contactor 22*b*** is formed toward the rear right side.

Accordingly, the arc path A.P generated in the vicinity of the second fixed contactor **22*b*** is also formed toward the rear right side.

In addition, in the embodiment illustrated in FIGS. 19A and 20A, a direction of current is a direction from the second fixed contactor **22*b* to the first fixed contactor 22*a* via the movable contactor 43**.

When the Fleming's left-hand rule is applied to the first fixed contactor **22*a*, an electromagnetic force generated in the vicinity of the first fixed contactor 22*a*** is formed toward the rear left side.

Accordingly, the arc path A.P generated in the vicinity of the first fixed contactor **22*a*** is also formed toward the rear left side.

Similarly, when the Fleming's left-hand rule is applied to the second fixed contactor **22*b*, an electromagnetic force generated in the vicinity of the second fixed contactor 22*b*** is formed toward the front right side.

Accordingly, the arc path A.P generated in the vicinity of the second fixed contactor **22*b*** is also formed toward the front right side.

In the embodiment illustrated in FIGS. 17B and 18B, a direction of current is a direction from the first fixed contactor **22*a* to the second fixed contactor 22*b* via the movable contactor 43**.

When the Fleming's left-hand rule is applied to the first fixed contactor **22*a*, an electromagnetic force generated in the vicinity of the first fixed contactor 22*a*** is formed toward the rear left side.

Accordingly, the arc path A.P generated in the vicinity of the first fixed contactor **22*a*** is also formed toward the rear left side.

Similarly, when the Fleming's left-hand rule is applied to the second fixed contactor **22*b*, an electromagnetic force generated in the vicinity of the second fixed contactor 22*b*** is formed toward the front right side.

Accordingly, the arc path A.P generated in the vicinity of the second fixed contactor **22*b*** is also formed toward the front right side.

In the embodiment illustrated in FIGS. 19B and 20B, a direction of current is a direction from the first fixed contactor **22*a* to the second fixed contactor 22*b* via the movable contactor 43**.

When the Fleming's left-hand rule is applied to the first fixed contactor **22*a*, an electromagnetic force generated in the vicinity of the first fixed contactor 22*a*** is formed toward the front left side.

Accordingly, the arc path A.P generated in the vicinity of the first fixed contactor **22*a*** is also formed toward the front left side.

Similarly, when the Fleming's left-hand rule is applied to the second fixed contactor **22*b*, an electromagnetic force generated in the vicinity of the second fixed contactor 22*b*** is formed toward the rear right side.

Accordingly, the arc path A.P generated in the vicinity of the second fixed contactor **22*b*** is also formed toward the rear right side.

Although not illustrated in the drawing, when the polarity of each surface of the Halbach array 320 and the first and second magnet units 330 and 340 is changed, the direction of the magnetic field formed in each of the Halbach array 320 and the first and second magnet units 330 and 340 is reversed. Accordingly, the generated electromagnetic force and the arc path A.P are also formed so that the front-rear direction thereof is reversed.

That is, in the electric connection situation shown in FIGS. 17A and 18A, the electromagnetic force and the arc path A.P in the vicinity of the first fixed contactor **22*a* are formed toward the rear left side. In addition, the electromagnetic force and the arc path A.P in the vicinity of the second fixed contactor 22*b*** are formed toward the front right side.

Similarly, in the electric connection situation shown in FIGS. 17B and 18B, the electromagnetic force and the arc path A.P in the vicinity of the first fixed contactor **22*a* are formed toward the front left side. In addition, the electromagnetic force and the arc path A.P in the vicinity of the second fixed contactor 22*b*** are formed toward the rear right side.

In addition, in the electric connection situation shown in FIGS. 19A and 20A, the electromagnetic force and the arc path A.P in the vicinity of the first fixed contactor **22*a* are formed toward the front left side. In addition, the electromagnetic force and the arc path A.P in the vicinity of the second fixed contactor 22*b*** are formed toward the rear right side.

Similarly, in the electric connection situation shown in FIGS. 19B and 20B, the electromagnetic force and the arc path A.P in the vicinity of the first fixed contactor **22*a* are formed toward the rear left side. In addition, the electromagnetic force and the arc path A.P in the vicinity of the second fixed contactor 22*b*** are formed toward the front right side.

Accordingly, in the arc path formation unit 300 according to the present embodiment, the electromagnetic force and the arc path A.P may be formed in a direction away from the central part C regardless of the polarity of each of the Halbach array 320 and the first and second magnet units 330 and 340 or the direction of the current flowing through the direct current relay 1.

Accordingly, damage to each component of the direct current relay 1 disposed adjacent to the central part C can be prevented. Furthermore, since the generated arc can be quickly discharged to the outside, operational reliability of the direct current relay 1 can be improved.

(4) Description of Arc Path Formation Unit 400 According to Yet Another Embodiment of Present Disclosure Hereinafter, an arc path formation unit 400 according to yet another embodiment of the present disclosure will be described in detail with reference to FIGS. 21 to 24.

Figure 21:
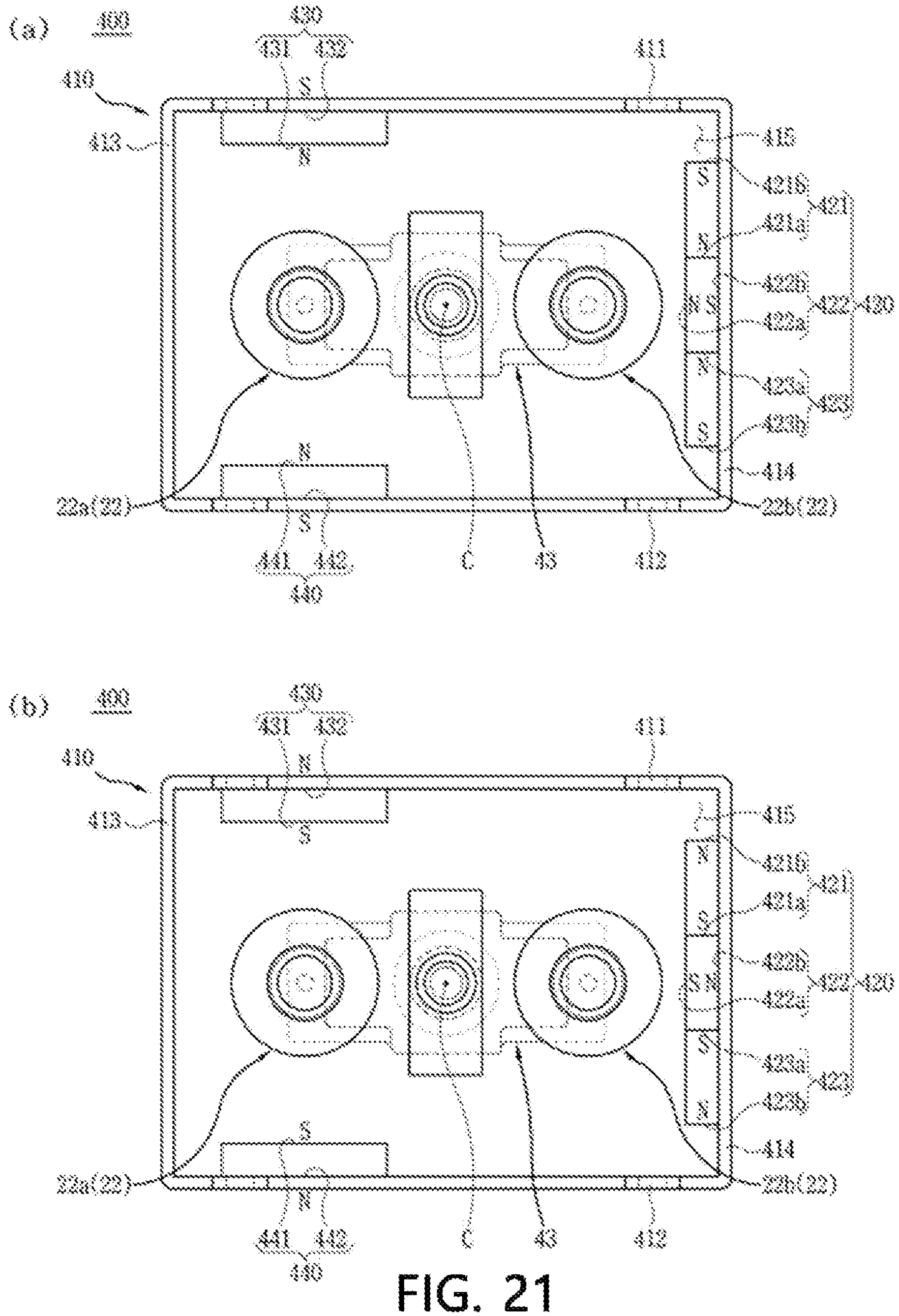
FIGS. 21 and 22 are conceptual views illustrating an arc path formation unit according to yet another embodiment of the present disclosure.
Figure 22:
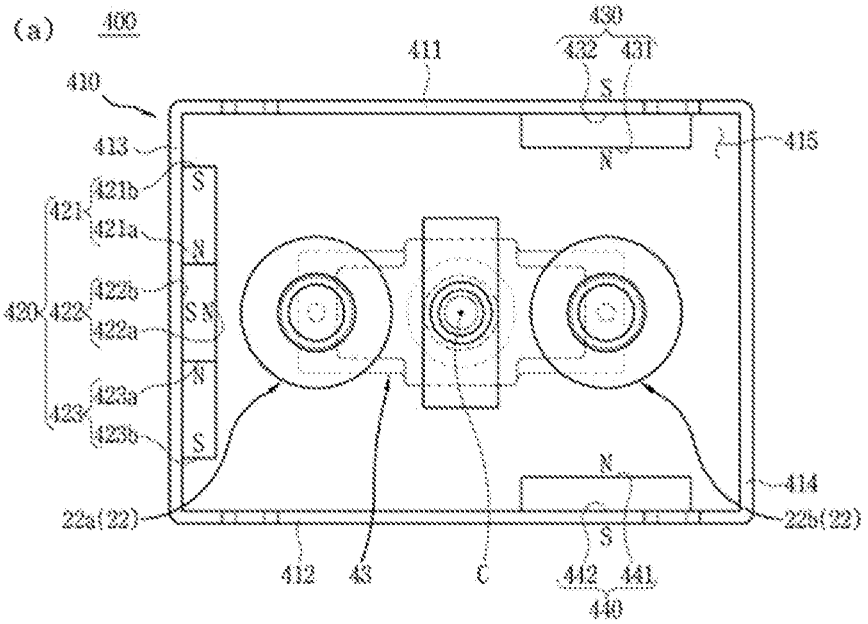
Figure 22:
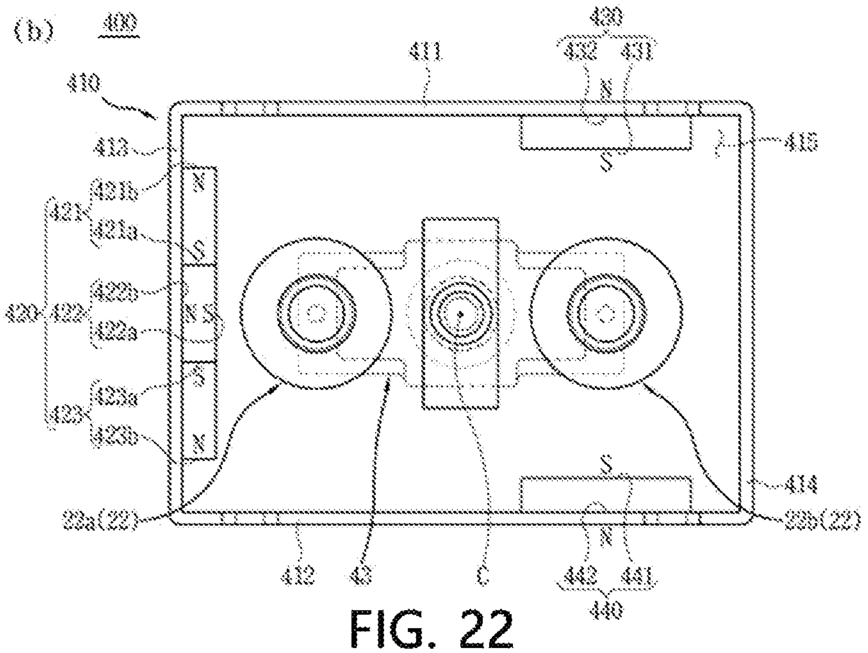

Referring to FIGS. 21 and 22, the arc path formation unit 400 according to the illustrated embodiment includes a magnet frame 410, a Halbach array 420, a first magnet unit 430, and a second magnet unit 440.

The magnet frame 410 according to the present embodiment has the same structure and function as the magnet frame 110 according to the above-described embodiment. However, there is a difference in the arrangement method of the Halbach array 420, the first magnet unit 430, and the second magnet unit 440 disposed in the magnet frame 410 according to the present embodiment.

Accordingly, a description of the magnet frame 410 will be replaced with the description of the magnet frame 110 according to the above-described embodiment.

In the illustrated embodiment, the plurality of magnetic materials constituting the Halbach array 420 are continuously disposed side by side from the left side to the right side. That is, in the illustrated embodiment, the Halbach array 420 is formed to extend in the left-right direction.

The Halbach array 420 may form a magnetic field together with another magnetic material. In the illustrated embodiment, the Halbach array 420 may form magnetic fields together with the first and second magnet units 430 and 440.

The Halbach array 420 may be located adjacent to any one surface of third and fourth surfaces 413 and 414. In one embodiment, the Halbach array 420 may be coupled to an inner side (i.e., the side in a direction toward a space part 415) of the any one surface.

At this point, the Halbach array 420 is located on a surface opposite to the other surface of the third and fourth surfaces 413 and 414, to which first and second magnet units 430 and 440 are located to be biased.

The Halbach array 420 is disposed to face the other surface of the third and fourth surfaces 413 and 414 with the space part 415 therebetween.

In the embodiment illustrated in FIG. 21, Halbach array 420 is located adjacent to the fourth surface 414. At this point, the first and second magnet units 430 and 440 are located to be biased to the third surface 413.

In the embodiment illustrated in FIG. 22, the Halbach array 420 is located adjacent to the third surface 413. At this point, the first and second magnet units 430 and 440 are located to be biased to the fourth surface 414.

The Halbach array 420 is disposed to face any one surface of the third and fourth surfaces 413 and 414. The space part 415, and the fixed contactor 22 and the movable contactor 43 accommodated in the space part 415 are located between the Halbach array 420 and the any one surface.

The Halbach array 420 is located between a first surface 411 and a second surface 412. In one embodiment, the Halbach array 420 may be located at a central portion of the other surface of the third and fourth surfaces 413 and 414.

In other words, the shortest distance between the Halbach array 420 and the first surface 411 and the shortest distance between the Halbach array 420 and the second surface 412 may be the same.

In the illustrated embodiment, the Halbach array 420 includes a first block 421, a second block 422, and a third block 423. It will be understood that the plurality of magnetic materials constituting the Halbach array 420 are named as the blocks 421, 422, and 423, respectively.

The first to third blocks 421, 422, and 423 may each be formed of a magnetic material. In one embodiment, the first to third blocks 421, 422, and 423 may each be provided as a permanent magnet, an electromagnet, or the like.

The first to third blocks 421, 422, and 423 may be disposed in parallel in one direction. In the illustrated embodiment, the first to third blocks 421, 422, and 423 are disposed in parallel in a direction in which the third surface 413 or the fourth surface 414 extends, that is, in the left-right direction.

The first block 421 is located on the rear side. That is, the first block 421 is located adjacent to the first surface 411. In addition, the third block 423 is located at the most front side. That is, the third block 423 is located adjacent to the second surface 412. The second block 422 is located between the first block 421 and the third block 423.

In one embodiment, the blocks 421, 422, and 423 adjacent to each other may be in contact with each other.

The second block 422 may be disposed to overlap the fixed contactors 22*a* and 22*b* in a direction toward the space part 415, i.e., in the left-right direction in the illustrated embodiment.

Each of the blocks 421, 422, and 423 includes a plurality of surfaces.

Specifically, the first block 421 includes a first inner surface 421*a* facing the second block 422 and a first outer surface 421*b* opposite to the second block 422.

The second block 422 includes a second inner surface 422*a* facing the space part 415 and a second outer surface 422*b* opposite to the space part 415.

The third block 423 includes a third inner surface 423*a* facing the second block 422 and a third outer surface 423*b* opposite to the second block 422.

The plurality of surfaces of each of the blocks 421, 422, and 423 may be magnetized according to a predetermined rule to configure a Halbach array.

Specifically, the first to third inner surfaces 421*a*, 422*a*, and 423*a* may be magnetized to the same polarity. In addition, the first to third outer surfaces 421*b*, 422*b*, and 423*b* may be magnetized to a polarity different from the polarity of the first to third inner surfaces 421*a*, 422*a*, and 423*a*.

At this point, the first to third inner surfaces 421*a*, 422*a*, and 423*a* may be magnetized to the same polarity as a first facing surface 431 of the first magnet unit 430 and a second facing surface 441 of the second magnet unit 440.

Similarly, the first to third outer surfaces 421*b*, 422*b*, and 423*b* may be magnetized to the same polarity as a first opposing surface 432 of the first magnet unit 430 and a second opposing surface 442 of the second magnet unit 440.

The first magnet unit 430 forms a magnetic field by itself, or forms magnetic fields together with the Halbach array 420 and the second magnet unit 440. An arc path A.P may be formed inside the arc chamber 21 by the magnetic field formed by the first magnet unit 430.

The first magnet unit 430 may be provided in any form capable of being magnetized to form a magnetic field. In one embodiment, the first magnet unit 430 may be provided as a permanent magnet, an electromagnet, or the like.

The first magnet unit 430 may be located adjacent to any one surface of the first and second surfaces 411 and 412. In one embodiment, the first magnet unit 430 may be coupled to an inner side (i.e., the side in a direction toward the space part 415) of the any one surface.

At this point, the first magnet unit 430 is located on a surface opposite to any one surface of the first and second surfaces 411 and 412, to which the second magnet unit 440 is located adjacent.

In the embodiment illustrated in FIG. 21, the first magnet unit 430 is located adjacent to the first surface 411 and is disposed to face the second magnet unit 440 located adjacent to the second surface 412.

In the embodiment illustrated in FIG. 22, the first magnet unit 430 is located adjacent to the second surface 412 and is disposed to face the second magnet unit 440 located adjacent to the first surface 411.

The space part 415, and the fixed contactor 22 and the movable contactor 43 accommodated in the space part 415 are located between the first magnet unit 430 and the second magnet unit 440.

In addition, the space part 415, and the fixed contactor 22 and the movable contactor 43 accommodated in the space part 415 are located between the first magnet unit 430 and the Halbach array 420.

The first magnet unit 430 may be located to be biased to the other surface of the third surface 413 and the fourth surface 414.

In the embodiment illustrated in FIG. 21, the first magnet unit 430 is located to be biased to the third surface 413. In the embodiment illustrated in FIG. 22, the first magnet unit 430 is located to be biased to the fourth surface 414.

The first magnet unit 430 can enhance the strength of the magnetic field formed by itself and the strength of the magnetic fields formed together with the Halbach array 420 and the second magnet unit 440. Since the process of enhancing the direction and magnetic field of the magnetic field formed by the first magnet unit 430 is well known in the art, a detailed description thereof will be omitted.

The first magnet unit 430 is formed to extend in one direction. In the illustrated embodiment, the first magnet unit 430 is formed to extend in a direction in which the first surface 411 or the second surface 412 extends, that is, in the left-right direction.

The first magnet unit 430 includes a plurality of surfaces.

Specifically, the first magnet unit 430 includes the first facing surface 431 facing the space part 415 or the fixed contactor 22 and the first opposing surface 432 opposite to the space part 415 or the fixed contactor 22.

Each surface of the first magnet unit 430 may be magnetized according to a predetermined rule.

Specifically, the first facing surface 431 may be magnetized to the same polarity as the first to third inner surfaces 421*a*, 422*a*, and 423*a* of the Halbach array 420. In addition, the first facing surface 431 may be magnetized to the same polarity as the second facing surface 441 of the second magnet unit 440.

Similarly, the first opposing surface 432 may be magnetized to the same polarity as the first to third outer surfaces 421*b*, 422*b*, and 423*b* of the Halbach array 420. In addition, the first opposing surface 432 may be magnetized to the same polarity as the second opposing surface 442 of the second magnet unit 440.

At this point, it will be understood that the polarity of the first facing surface 431 and the polarity of the first opposing surface 432 are formed to be different from each other.

The second magnet unit 440 forms a magnetic field by itself, or forms magnetic fields together with the Halbach array 420 and the first magnet unit 430. An arc path A.P may be formed inside the arc chamber 21 by the magnetic field formed by the second magnet unit 440.

The second magnet unit 440 may be provided in any form capable of being magnetized to form a magnetic field. In one embodiment, the second magnet unit 440 may be provided as a permanent magnet, an electromagnet, or the like.

The second magnet unit 440 may be located adjacent to the other surface of the first and second surfaces 411 and 412. In one embodiment, the second magnet unit 440 may be coupled to an inner side (i.e., the side in a direction toward the space part 415) of the other surface.

At this point, the second magnet unit 440 is located on a surface opposite to any one surface of the first and second surfaces 411 and 412, to which the first magnet unit 430 is located adjacent.

In the embodiment illustrated in FIG. 21, the second magnet unit 440 is located adjacent to the first surface 411 and is disposed to face the first magnet unit 430 located adjacent to the second surface 412.

In the embodiment illustrated in FIG. 22, the second magnet unit 440 is located adjacent to the second surface 412 and is disposed to face the first magnet unit 430 located adjacent to the first surface 411.

The space part 415, and the fixed contactor 22 and the movable contactor 43 accommodated in the space part 415 are located between the second magnet unit 440 and the first magnet unit 430.

In addition, the space part 415, and the fixed contactor 22 and the movable contactor 43 accommodated in the space part 415 are located between the second magnet unit 440 and the Halbach array 420.

The second magnet unit 440 may be located to be biased to the other surface of the third surface 413 and the fourth surface 414.

In the embodiment illustrated in FIG. 21, the second magnet unit 440 is located to be biased to the third surface 413. In the embodiment illustrated in FIG. 22, the second magnet unit 440 is located to be biased to the fourth surface 414.

The second magnet unit 440 can enhance the strength of the magnetic field formed by itself and the strength of the magnetic fields formed together with the Halbach array 420 and the first magnet unit 430. Since the process of enhancing the direction and magnetic field of the magnetic field formed by the second magnet unit 440 is well known in the art, a detailed description thereof will be omitted.

The second magnet unit 440 is formed to extend in one direction. In the illustrated embodiment, the second magnet unit 440 is formed to extend in a direction in which the first surface 411 or the second surface 412 extends, that is, in the left-right direction.

The second magnet unit 440 includes a plurality of surfaces.

Specifically, the second magnet unit 440 includes the second facing surface 441 facing the space part 415 or the fixed contactor 22 and the second opposing surface 442 opposite to the space part 415 or the fixed contactor 22.

Each surface of the second magnet unit 440 may be magnetized according to a predetermined rule.

Specifically, the second facing surface 441 may be magnetized to the same polarity as the first to third inner surfaces 421*a*, 422*a*, and 423*a* of the Halbach array 420. In addition, the second facing surface 441 may be magnetized to the same polarity as the first facing surface 431 of the first magnet unit 430.

Similarly, the second opposing surface 442 may be magnetized to the same polarity as the first to third outer surfaces 421*b*, 422*b*, and 423*b* of the Halbach array 420. In addition, the second opposing surface 442 may be magnetized to the same polarity as the first opposing surface 432 of the first magnet unit 430.

At this point, it will be understood that the polarity of the second facing surface 441 and the polarity of the second opposing surface 442 are formed to be different from each other.

Hereinafter, an arc path A.P formed by the arc path formation unit 400 according to the present embodiment will be described in detail with reference to FIGS. 23 and 24.

Figure 23:
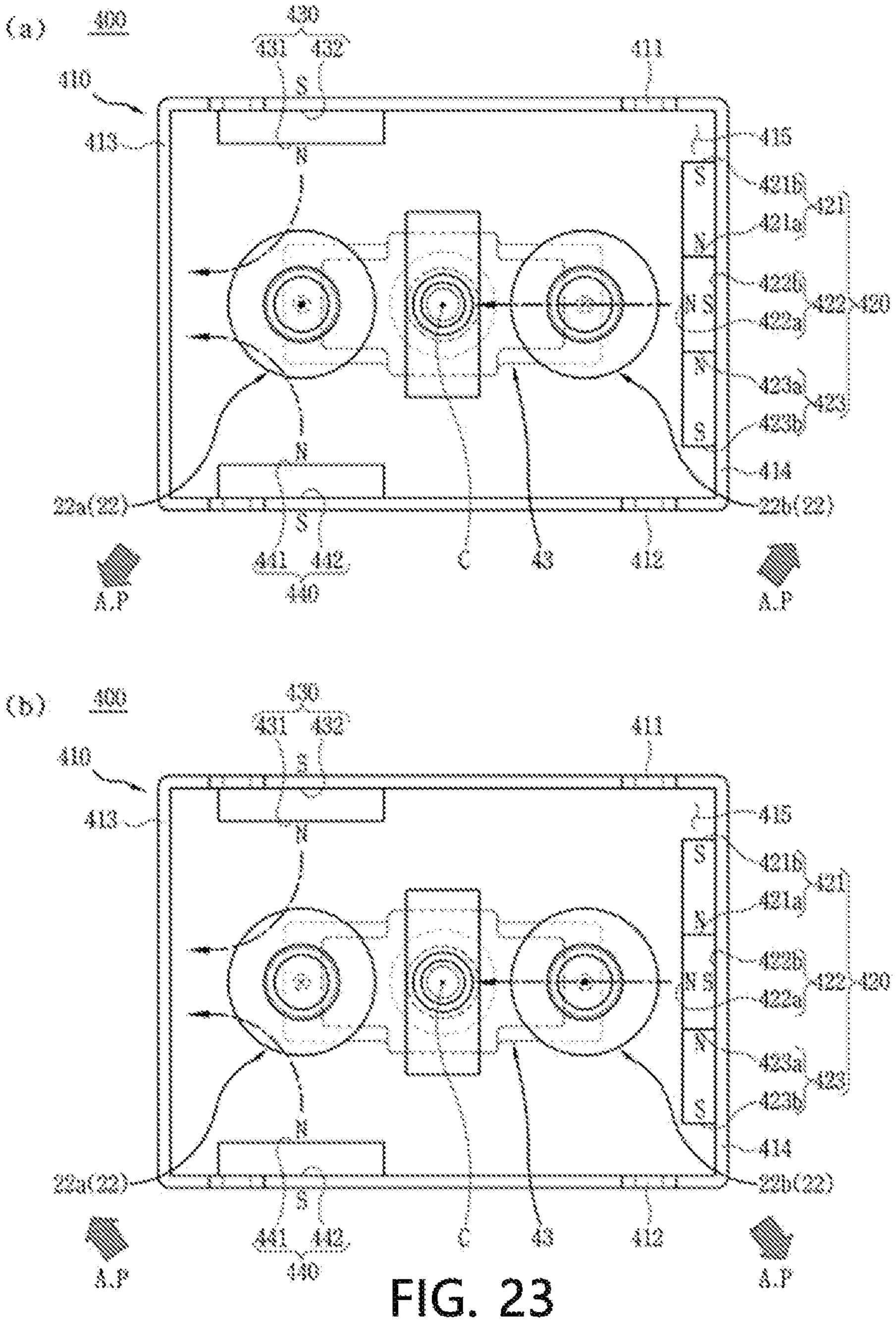
FIGS. 23 and 24 are conceptual views illustrating magnetic fields and arc paths formed by the arc path formation unit according to the embodiment of FIGS. 21 and 22.
Figure 24:
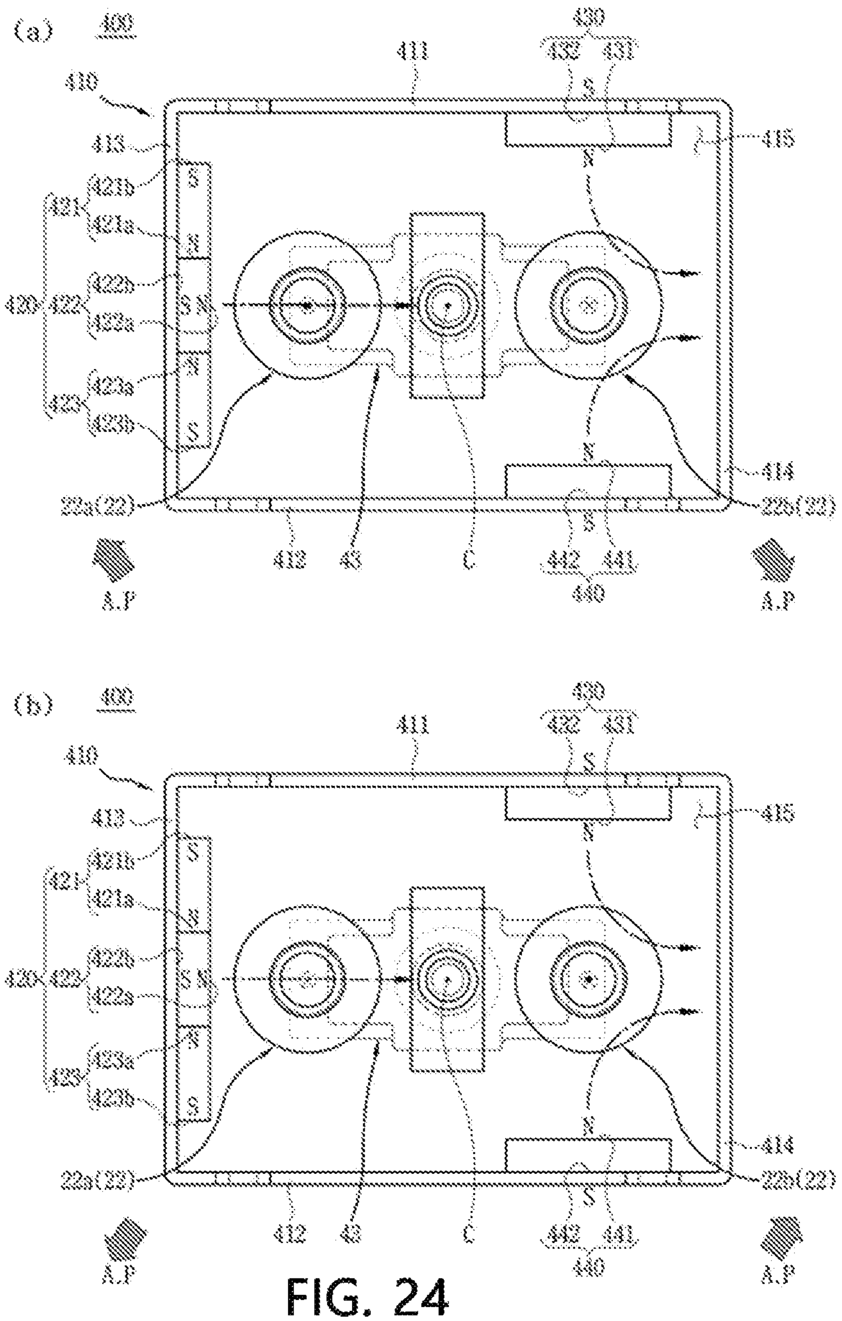

Referring to FIGS. 23 and 24, the first to third inner surfaces 421*a*, 422*a*, and 423*a* of the Halbach array 420 are magnetized to N poles. According to the above-described rule, the first facing surface 431 of the first magnet unit 430 and the second facing surface 441 of the second magnet unit 440 are also magnetized to N poles.

Accordingly, magnetic fields that repel each other are formed between the first magnet unit 430 and the second magnet unit 440. In addition, in the Halbach array 420, a magnetic field diverging in a direction from the second inner surface 422*a* is formed.

Accordingly, in the embodiment illustrated in FIG. 23, the magnetic fields formed by the Halbach array 420 and the first and second magnet units 430 and 440 are formed toward the third surface 413, i.e., toward the left side in the illustrated embodiment.

In addition, in the embodiment illustrated in FIG. 24, the magnetic fields formed by the Halbach array 420 and the first and second magnet units 430 and 440 are formed toward the fourth surface 414, i.e., toward the right side in the illustrated embodiment.

In the embodiment illustrated in FIG. 23A, a direction of current is a direction from the second fixed contactor 22*b* to the first fixed contactor 22*a* via the movable contactor 43.

When the Fleming's left-hand rule is applied to the first fixed contactor 22*a*, an electromagnetic force generated in the vicinity of the first fixed contactor 22*a* is formed toward the front left side.

Accordingly, an arc path A.P generated in the vicinity of the first fixed contactor 22*a* is also formed toward the front left side.

Similarly, when the Fleming's left-hand rule is applied to the second fixed contactor 22*b*, an electromagnetic force generated in the vicinity of the second fixed contactor 22*b* is formed toward the rear right side.

Accordingly, an arc path A.P generated in the vicinity of the second fixed contactor 22*b* is also formed toward the rear right side.

In the embodiment illustrated in FIG. 23B, a direction of current is a direction from the first fixed contactor 22*a* to the second fixed contactor 22*b* via the movable contactor 43.

When the Fleming's left-hand rule is applied to the first fixed contactor 22*a*, an electromagnetic force generated in the vicinity of the first fixed contactor 22*a* is formed toward the rear left side.

Accordingly, the arc path A.P generated in the vicinity of the first fixed contactor 22*a* is also formed toward the rear left side.

Similarly, when the Fleming's left-hand rule is applied to the second fixed contactor 22*b*, an electromagnetic force generated in the vicinity of the second fixed contactor 22*b* is formed toward the front right side.

Accordingly, the arc path A.P generated in the vicinity of the second fixed contactor 22*b* is also formed toward the front right side.

In addition, in the embodiment illustrated in FIG. 24A, a direction of current is a direction from the second fixed contactor 22*b* to the first fixed contactor 22*a* via the movable contactor 43.

When the Fleming's left-hand rule is applied to the first fixed contactor 22*a*, an electromagnetic force generated in the vicinity of the first fixed contactor 22*a* is formed toward the rear left side.

Accordingly, the arc path A.P generated in the vicinity of the first fixed contactor 22*a* is also formed toward the rear left side.

Similarly, when the Fleming's left-hand rule is applied to the second fixed contactor 22*b*, an electromagnetic force generated in the vicinity of the second fixed contactor 22*b* is formed toward the front right side.

Accordingly, the arc path A.P generated in the vicinity of the second fixed contactor 22*b* is also formed toward the front right side.

In the embodiment illustrated in FIG. 24B, a direction of current is a direction from the first fixed contactor 22*a* to the second fixed contactor 22*b* via the movable contactor 43.

When the Fleming's left-hand rule is applied to the first fixed contactor 22*a*, an electromagnetic force generated in the vicinity of the first fixed contactor 22*a* is formed toward the front left side.

Accordingly, the arc path A.P generated in the vicinity of the first fixed contactor 22*a* is also formed toward the front left side.

Similarly, when the Fleming's left-hand rule is applied to the second fixed contactor 22*b*, an electromagnetic force generated in the vicinity of the second fixed contactor 22*b* is formed toward the rear right side.

Accordingly, the arc path A.P generated in the vicinity of the second fixed contactor 22*b* is also formed toward the rear right side.

Although not illustrated in the drawing, when the polarity of each surface of the Halbach array 420 and the first and second magnet units 430 and 440 is changed, the direction of the magnetic field formed in each of the Halbach array 420 and the first and second magnet units 430 and 440 is reversed. Accordingly, the generated electromagnetic force and the arc path A.P are also formed so that the front-rear direction thereof is reversed.

That is, in the electric connection situation shown in FIG. 23A, the electromagnetic force and the arc path A.P in the vicinity of the first fixed contactor 22*a* are formed toward the rear left side. In addition, the electromagnetic force and the arc path A.P in the vicinity of the second fixed contactor 22*b* are formed toward the front right side.

Similarly, in the electric connection situation shown in FIG. 23B, the electromagnetic force and the arc path A.P in the vicinity of the first fixed contactor 22*a* are formed toward the front left side. In addition, the electromagnetic force and the arc path A.P in the vicinity of the second fixed contactor 22*b* are formed toward the rear right side.

In addition, in the electric connection situation shown in FIG. 24A, the electromagnetic force and the arc path A.P in the vicinity of the first fixed contactor 22*a* are formed toward the front left side. In addition, the electromagnetic force and the arc path A.P in the vicinity of the second fixed contactor 22*b* are formed toward the rear right side.

Similarly, in the electric connection situation shown in FIG. 24B, the electromagnetic force and the arc path A.P in the vicinity of the first fixed contactor 22*a* are formed toward the rear left side. In addition, the electromagnetic force and the arc path A.P in the vicinity of the second fixed contactor 22*b* are formed toward the front right side.

Accordingly, in the arc path formation unit 400 according to the present embodiment, the electromagnetic force and the arc path A.P may be formed in a direction away from the central part C regardless of the polarity of each of the Halbach array 420 and the first and second magnet units 430 and 440 or the direction of the current flowing through the direct current relay 1.

Accordingly, damage to each component of the direct current relay 1 disposed adjacent to the central part C can be prevented. Furthermore, since the generated arc can be quickly discharged to the outside, operational reliability of the direct current relay 1 can be improved.

(5) Description of Arc Path Formation Unit 500 According to Yet Another Embodiment of Present Disclosure Hereinafter, an arc path formation unit 500 according to yet another embodiment of the present disclosure will be described in detail with reference to FIGS. 25 to 28.

Figure 25:
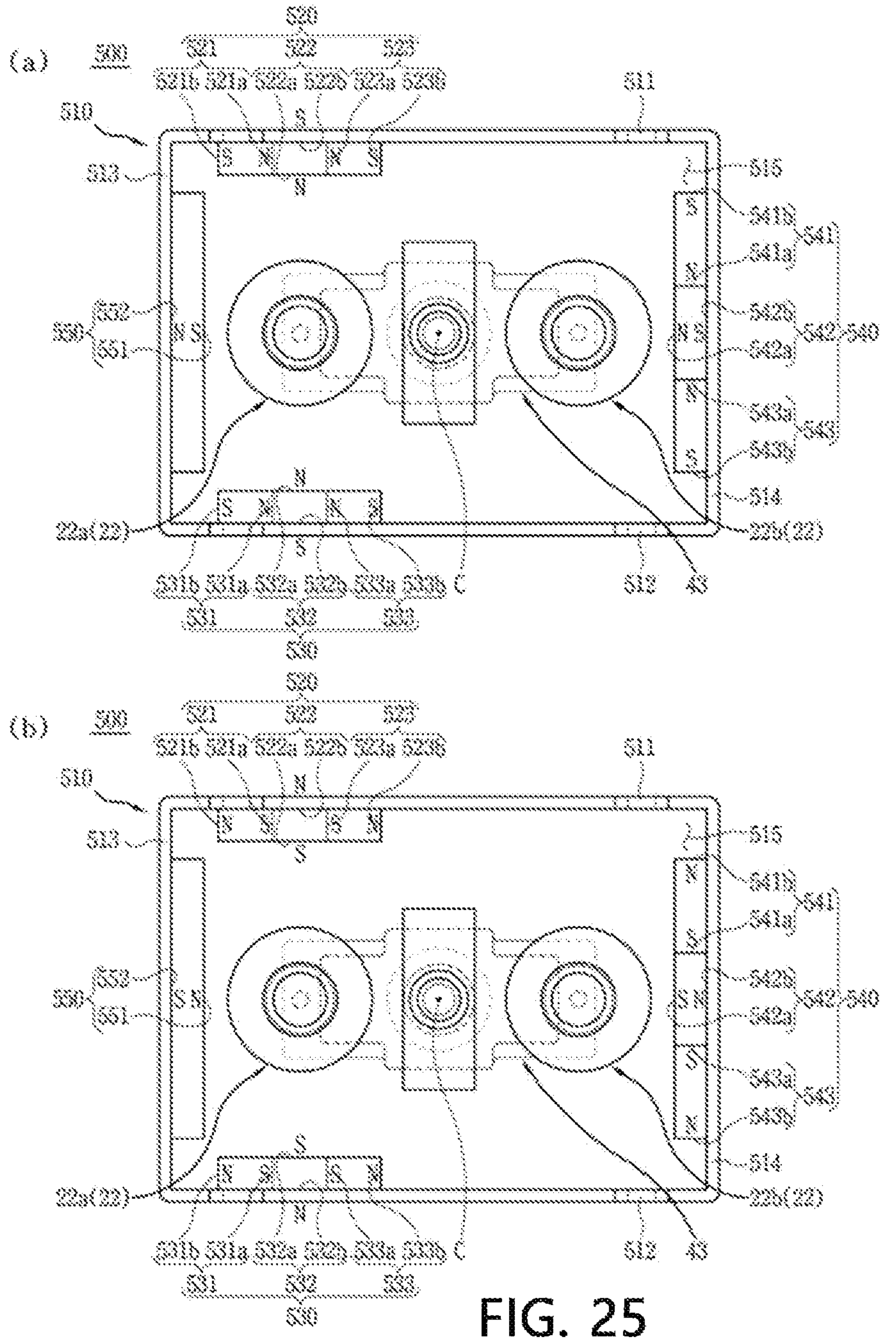
FIGS. 25 and 26 are conceptual views illustrating an arc path formation unit according to yet another embodiment of the present disclosure.
Figure 26:
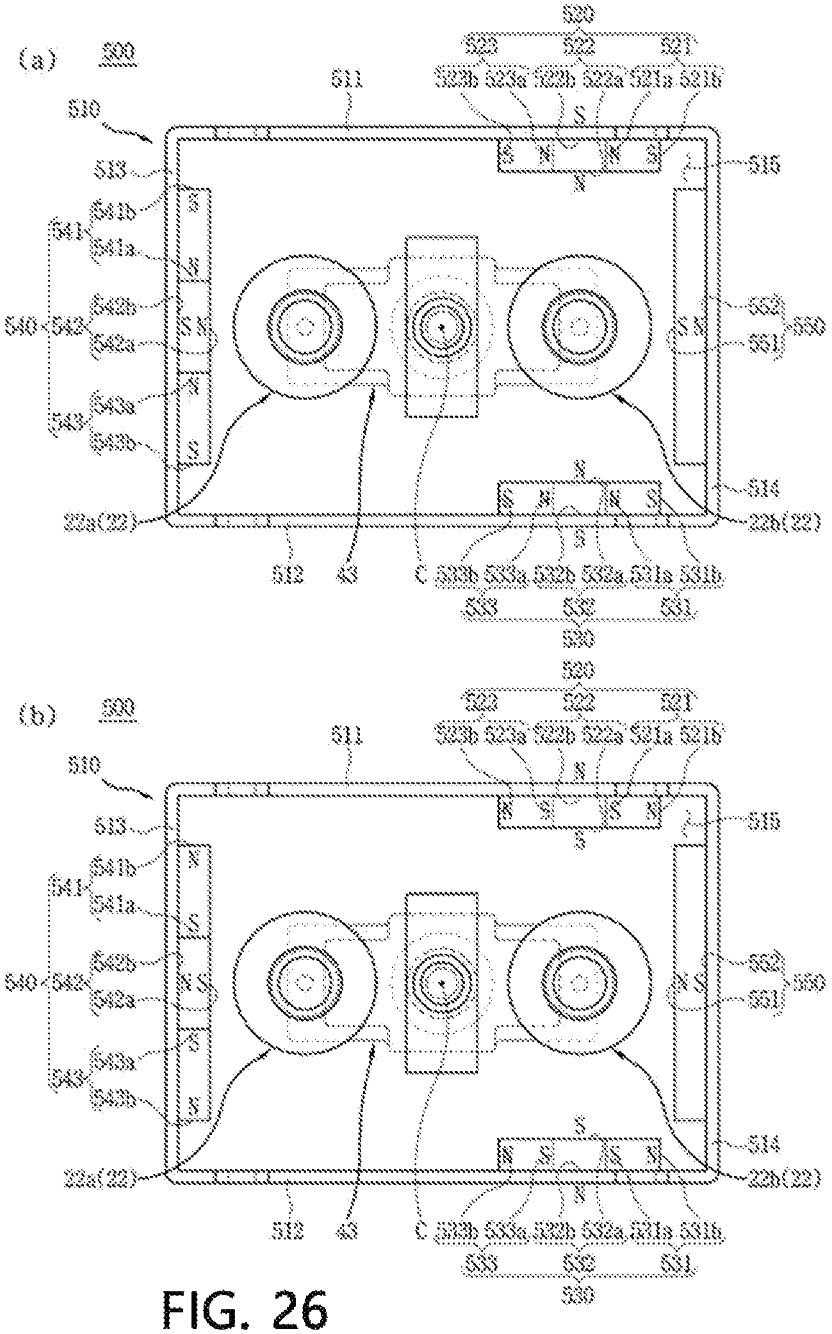

Referring to FIGS. 25 and 26, the arc path formation unit 500 according to the illustrated embodiment includes a magnet frame 510, a first Halbach array 520, a second Halbach array 530, a third Halbach array 540, and a magnet unit 550.

The magnet frame 510 according to the present embodiment has the same structure and function as the magnet frame 110 according to the above-described embodiment. However, there is a difference in the arrangement method of the first Halbach array 520, the second Halbach array 530, the third Halbach array 540, and the magnet unit 550 disposed in the magnet frame 510 according to the present embodiment.

Accordingly, a description of the magnet frame 510 will be replaced with the description of the magnet frame 110 according to the above-described embodiment.

In the illustrated embodiment, the plurality of magnetic materials constituting the first Halbach array 520 are continuously disposed side by side from the left side to the right side. That is, in the illustrated embodiment, the first Halbach array 520 is formed to extend in the left-right direction.

The first Halbach array 520 may form a magnetic field together with another magnetic material. In the illustrated embodiment, the first Halbach array 520 may form magnetic fields together with the second and third Halbach arrays 530 and 540 and the magnet unit 550.

The first Halbach array 520 may be located adjacent to any one surface of first and second surfaces 511 and 512. In one embodiment, the first Halbach array 520 may be coupled to an inner side (i.e., the side in a direction toward a space part 515) of the any one surface.

In the illustrated embodiment, the first Halbach array 520 is disposed on an inner side of the first surface 511 and adjacent to the first surface 511 and faces the second Halbach array 530 located on an inner side of the second surface 512.

The space part 515, and the fixed contactor 22 and the movable contactor 43 accommodated in the space part 515 are located between the first Halbach array 520 and the second Halbach array 530.

In addition, the space part 515, and the fixed contactor 22 and the movable contactor 43 accommodated in the space part 515 are located between the first Halbach array 520 and the third Halbach array 540.

Furthermore, the space part 515, and the fixed contactor 22 and the movable contactor 43 accommodated in the space part 515 are located between the first Halbach array 520 and the magnet unit 550.

The first Halbach array 520 may be located to be biased to any one surface of a third surface 513 and a fourth surface 514. In the embodiment illustrated in FIG. 25, the first Halbach array 520 is located to be biased to the third surface 513. In the embodiment illustrated in FIG. 26, the first Halbach array 520 is located to be biased to the fourth surface 514.

The any one surface, to which the first Halbach array 520 is located to be biased, may be a surface to which the magnet unit 550 is located adjacent. In addition, the any one surface, to which the first Halbach array 520 is located to be biased, may be a surface opposite to a surface to which the third Halbach array 540 is located adjacent.

The first Halbach array 520 can enhance the strength of the magnetic field formed by itself and the strength of the magnetic fields formed together with the second and third Halbach arrays 530 and 540 and the magnet unit 550. Since the process of enhancing the direction and magnetic field of the magnetic field formed by the first Halbach array 520 is a well-known technique, a detailed description thereof will be omitted.

In the illustrated embodiment, the first Halbach array 520 includes a first block 521, a second block 522, and a third block 523. It will be understood that the plurality of magnetic materials constituting the first Halbach array 520 are named as the blocks 521, 522, and 523, respectively.

The first to third blocks 521, 522, and 523 may each be formed of a magnetic material. In one embodiment, the first to third blocks 521, 522, and 523 may each be provided as a permanent magnet, an electromagnet, or the like.

The first to third blocks 521, 522, and 523 may be disposed in parallel in one direction. In the illustrated embodiment, the first to third blocks 521, 522, and 523 are disposed in parallel in a direction in which the first surface 511 extends, that is, in the left-right direction.

The first block 521 is located adjacent to the any one surface of the third surface 513 and the fourth surface 514. In addition, the third block 523 is located adjacent to the other surface of the third surface 513 and the fourth surface 514. The second block 522 is located between the first block 521 and the third block 523.

In one embodiment, the blocks 521, 522, and 523 adjacent to each other may be in contact with each other.

The second block 522 may be disposed to overlap a second block 532 of the second Halbach array 530 and any one of the fixed contactors 22*a* and 22*b* in a direction toward the second Halbach array 530 or the space part 515, i.e., in the front-rear direction in the illustrated embodiment.

Each of the blocks 521, 522, and 523 includes a plurality of surfaces.

Specifically, the first block 521 includes a first inner surface 521*a* facing the second block 522 and a first outer surface 521*b* opposite to the second block 522.

The second block 522 includes a second inner surface 522*a* facing the space part 515 or the second Halbach array 530 and a second outer surface 522*b* opposite to the space part 515 or the second Halbach array 530.

The third block 523 includes a third inner surface 523*a* facing the second block 522 and a third outer surface 523*b* opposite to the second block 522.

The plurality of surfaces of each of the blocks 521, 522, and 523 may be magnetized according to a predetermined rule to configure a Halbach array.

Specifically, the first to third inner surfaces 521*a*, 522*a*, and 523*a* may be magnetized to the same polarity. Similarly, the first to third outer surfaces 521*b*, 522*b*, and 523*b* may be magnetized to a polarity different from the polarity of the first to third inner surfaces 521*a*, 522*a*, and 523*a*.

At this point, the first to third inner surfaces 521*a*, 522*a*, and 523*a* may be magnetized to the same polarity as first to third inner surfaces 531*a*, 532*a*, and 533*a* of the second Halbach array 530 and first to third inner surfaces 541*a*, 542*a*, and 543*a* of the third Halbach array 540. In addition, the first to third inner surfaces 521*a*, 522*a*, and 523*a* may be magnetized to the same polarity as an opposing surface 552 of the magnet unit 550.

Similarly, the first to third outer surfaces 521*b*, 522*b*, and 523*b* may be magnetized to the same polarity as first to third outer surfaces 531*b*, 532*b*, and 533*b* of the second Halbach array 530 and first to third outer surfaces 541*b*, 542*b*, and 543*b* of the third Halbach array 540. In addition, the first to third outer surfaces 541*b*, 542*b*, and 543*b* may be magnetized to the same polarity as a facing surface 551 of the magnet unit 550.

In the illustrated embodiment, the plurality of magnetic materials constituting the second Halbach array 530 are continuously disposed side by side from the left side to the right side. That is, in the illustrated embodiment, the second Halbach array 530 is formed to extend in the left-right direction.

The second Halbach array 530 may form a magnetic field together with another magnetic material. In the illustrated embodiment, the second Halbach array 530 may form magnetic fields together with the first and third Halbach arrays 520 and 540 and the magnet unit 550.

The second Halbach array 530 may be located adjacent to the other surface of the first and second surfaces 511 and 512. In one embodiment, the second Halbach array 530 may be coupled to an inner side (i.e., the side in a direction toward the space part 515) of the other surface.

In the illustrated embodiment, the second Halbach array 530 is disposed on the inner side of the second surface 512 and adjacent to the second surface 512 and faces the first Halbach array 520 located on the inner side of the first surface 511.

The space part 515, and the fixed contactor 22 and the movable contactor 43 accommodated in the space part 515 are located between the second Halbach array 530 and the first Halbach array 520.

In addition, the space part 515, and the fixed contactor 22 and the movable contactor 43 accommodated in the space part 515 are located between the second Halbach array 530 and the third Halbach array 540.

Furthermore, the space part 515, and the fixed contactor 22 and the movable contactor 43 accommodated in the space part 515 are located between the second Halbach array 530 and the magnet unit 550.

The second Halbach array 530 may be located to be biased to any one surface of the third surface 513 and the fourth surface 514. In the embodiment illustrated in FIG. 25, the second Halbach array 530 is located to be biased to the third surface 513. In the embodiment illustrated in FIG. 26, the second Halbach array 530 is located to be biased to the fourth surface 514.

The any one surface, to which the second Halbach array 530 is located to be biased, may be a surface to which the magnet unit 550 is located adjacent. In addition, the any one surface, to which the second Halbach array 530 is located to be biased, may be a surface opposite to a surface to which the third Halbach array 540 is located adjacent.

The second Halbach array 530 can enhance the strength of the magnetic field formed by itself and the strength of the magnetic fields formed together with the first and third Halbach arrays 520 and 540 and the magnet unit 550. Since the process of enhancing the direction and magnetic field of the magnetic field formed by the second Halbach array 530 is a well-known technique, a detailed description thereof will be omitted.

In the illustrated embodiment, the second Halbach array 530 includes a first block 531, the second block 532, and a third block 533. It will be understood that the plurality of magnetic materials constituting the second Halbach array 530 are named as the blocks 531, 532, and 533, respectively.

The first to third blocks 531, 532, and 533 may each be formed of a magnetic material. In one embodiment, the first to third blocks 531, 532, and 533 may each be provided as a permanent magnet, an electromagnet, or the like.

The first to third blocks 531, 532, and 533 may be disposed in parallel in one direction. In the illustrated embodiment, the first to third blocks 531, 532, and 533 are disposed in parallel in a direction in which the second surface 512 extends, that is, in the left-right direction.

The first block 531 is located adjacent to the any one surface of the third surface 513 and the fourth surface 514. In addition, the third block 533 is located adjacent to the other surface of the third surface 513 and the fourth surface 514. The second block 532 is located between the first block 531 and the third block 533.

In one embodiment, the blocks 531, 532, and 533 adjacent to each other may be in contact with each other.

The second block 532 may be disposed to overlap the second block 522 of the first Halbach array 520 and any one of the fixed contactors 22*a* and 22*b* in a direction toward the first Halbach array 520 or the space part 515, i.e., in the front-rear direction in the illustrated embodiment.

Each of the blocks 531, 532, and 533 includes a plurality of surfaces.

Specifically, the first block 531 includes the first inner surface 531*a* facing the second block 532 and the first outer surface 531*b* opposite to the second block 532.

The second block 532 includes the second inner surface 532*a* facing the space part 515 or the first Halbach array 520, and the second outer surface 532*b* opposite to the space part 515 or the first Halbach array 520.

The third block 533 includes the third inner surface 533*a* facing the second block 532 and the third outer surface 533*b* opposite to the second block 532.

The plurality of surfaces of each of the blocks 531, 532, and 533 may be magnetized according to a predetermined rule to configure a Halbach array.

Specifically, the first to third inner surfaces 531*a*, 532*a*, and 533*a* may be magnetized to the same polarity. Similarly, the first to third outer surfaces 531*b*, 532*b*, and 533*b* may be magnetized to a polarity different from the polarity of the first to third inner surfaces 531*a*, 532*a*, and 533*a*.

At this point, the first to third inner surfaces 531*a*, 532*a*, and 533*a* may be magnetized to the same polarity as the first to third inner surfaces 521*a*, 522*a*, and 523*a* of the first Halbach array 520 and the first to third inner surfaces 541*a*, 542*a*, and 543*a* of the third Halbach array 540. In addition, the first to third inner surfaces 531*a*, 532*a*, and 533*a* may be magnetized to the same polarity as the opposing surface 552 of the magnet unit 550.

Similarly, the first to third outer surfaces 531*b*, 532*b*, and 533*b* may be magnetized to the same polarity as the first to third outer surfaces 521*b*, 522*b*, and 523*b* of the first Halbach array 520 and the first to third outer surfaces 541*b*, 542*b*, and 543*b* of the third Halbach array 540. In addition, the first to third outer surfaces 541*b*, 542*b*, and 543*b* may be magnetized to the same polarity as the facing surface 551 of the magnet unit 550.

The third Halbach array 540 may be defined as an assembly of a plurality of magnetic materials. The plurality of magnetic materials included in the third Halbach array 540 may be disposed with predetermined regularity. In the illustrated embodiment, the plurality of magnetic materials constituting the third Halbach array 540 are continuously disposed side by side from the left side to the right side. That is, in the illustrated embodiment, the third Halbach array 540 is formed to extend in the left-right direction.

The third Halbach array 540 may form a magnetic field by itself. That is, a magnetic field may be formed between the plurality of magnetic materials included in the third Halbach array 540.

In addition, the third Halbach array 540 may form a magnetic field together with another magnetic material. In the illustrated embodiment, the third Halbach array 540 may form magnetic fields together with the first and second Halbach arrays 520 and 530 and the magnet unit 550.

The third Halbach array 540 may be located adjacent to the other surface of the third and fourth surfaces 513 and 514. In one embodiment, the third Halbach array 540 may be coupled to an inner side (i.e., the side in a direction toward a space part 515) of the any one surface.

At this point, the third Halbach array 540 is located on a surface opposite to any one surface of the third and fourth surfaces 513 and 514, to which the first and second Halbach arrays 520 and 530 are located to be biased.

In the embodiment illustrated in FIG. 25, the third Halbach array 540 is located adjacent to the fourth surface 514. At this point, the first and second Halbach arrays 520 and 530 are located to be biased to the third surface 513.

In the embodiment illustrated in FIG. 26, the third Halbach array 540 is located adjacent to the third surface 513. At this point, the first and second Halbach arrays 520 and 530 are located to be biased to the fourth surface 514.

The third Halbach array 540 is disposed to face any one surface of the third and fourth surfaces 513 and 514 and the magnet unit 550 located adjacent to the any one surface. The space part 515, and the fixed contactor 22 and the movable contactor 43 accommodated in the space part 515 are located between the third Halbach array 540 and the any one surface.

The third Halbach array 540 is located between the first surface 511 and the second surface 512. In one embodiment, a third Halbach array 540 may be located at a central portion of the other surface of the third and fourth surfaces 513 and 514.

In other words, the shortest distance between the third Halbach array 540 and the first surface 511 and the shortest distance between the third Halbach array 540 and the second surface 512 may be the same.

The third Halbach array 540 can enhance the strength of the magnetic field formed by itself and the strength of the magnetic fields formed together with the first and second Halbach arrays 520 and 530 and the magnet unit 550. Since the process of enhancing the direction and magnetic field of the magnetic field formed by the third Halbach array 540 is a well-known technique, a detailed description thereof will be omitted.

In the illustrated embodiment, the third Halbach array 540 includes a first block 541, a second block 542, and a third block 543. It will be understood that the plurality of magnetic materials constituting the third Halbach array 540 are named as the blocks 541, 542, and 543, respectively.

The first to third blocks 541, 542, and 543 may each be formed of a magnetic material. In one embodiment, the first to third blocks 541, 542, and 543 may each be provided as a permanent magnet, an electromagnet, or the like.

The first to third blocks 541, 542, and 543 may be disposed in parallel in one direction. In the illustrated embodiment, the first to third blocks 541, 542, and 543 are disposed in parallel in a direction in which the third surface 513 or the fourth surface 514 extends, that is, in the front-rear direction.

The first block 541 is located at the most rear side. That is, the first block 541 is located adjacent to the first surface 511. In addition, the third block 543 is located at the most front side. That is, the third block 543 is located adjacent to the second surface 512. The second block 542 is located between the first block 541 and the third block 543.

In one embodiment, the blocks 541, 542, and 543 adjacent to each other may be in contact with each other.

The second block 542 may be disposed to overlap the fixed contactors 22*a* and 22*b* in a direction toward the space part 515, i.e., in the front-rear direction in the illustrated embodiment.

Each of the blocks 541, 542, and 543 includes a plurality of surfaces.

Specifically, the first block 541 includes the first inner surface 541*a* facing the second block 542 and the first outer surface 541*b* opposite to the second block 542.

The second block 542 includes the second inner surface 542*a* facing the space part 515 and the second outer surface 542*b* opposite to the space part 515.

The third block 543 includes the third inner surface 543*a* facing the second block 542 and the third outer surface 543*b* opposite to the second block 542.

The plurality of surfaces of each of the blocks 541, 542, and 543 may be magnetized according to a predetermined rule to configure a Halbach array.

Specifically, the first to third inner surfaces 541*a*, 542*a*, and 543*a* may be magnetized to the same polarity. Similarly, the first to third outer surfaces 541*b*, 542*b*, and 543*b* may be magnetized to a polarity different from the polarity of the first to third inner surfaces 541*a*, 542*a*, and 543*a*.

At this point, the first to third inner surfaces 541*a*, 542*a*, and 543*a* may be magnetized to the same polarity as the first to third inner surfaces 521*a*, 522*a*, and 523*a* of the first Halbach array 520 and the first to third inner surfaces 531*a*, 532*a*, and 533*a* of the second Halbach array 530. In addition, the first to third inner surfaces 541*a*, 542*a*, and 543*a* may be magnetized to the same polarity as the opposing surface 552 of the magnet unit 550.

Similarly, the first to third outer surfaces 541*b*, 542*b*, and 543*b* may be magnetized to the same polarity as the first to third outer surfaces 521*b*, 522*b*, and 523*b* of the first Halbach array 520 and the first to third outer surfaces 531*b*, 532*b*, and 533*b* of the second Halbach array 530. In addition, the first to third outer surfaces 541*b*, 542*b*, and 543*b* may be magnetized to the same polarity as the facing surface 551 of the magnet unit 550.

The magnet unit 550 forms a magnetic field by itself, or forms magnetic fields together with the first to third Halbach arrays 520, 530, and 540. An arc path A.P may be formed inside the arc chamber 21 by the magnetic field formed by the magnet unit 550.

The magnet unit 550 may be provided in any form capable of being magnetized to form a magnetic field. In one embodiment, the magnet unit 550 may be provided as a permanent magnet, an electromagnet, or the like.

The magnet unit 550 may be located adjacent to any one surface of the third and fourth surfaces 513 and 514. In one embodiment, the magnet unit 550 may be coupled to an inner side (i.e., the side in a direction toward the space part 515) the any one surface.

At this point, the magnet unit 550 is located on any one surface of the third and fourth surfaces 513 and 514, to which the first and second Halbach arrays 520 and 530 are located to be biased.

The magnet unit 550 is disposed to face the other surface of the third and fourth surfaces 513 and 514 with the space part 315 therebetween.

In the embodiment illustrated in FIG. 25, the magnet unit 550 is located adjacent to the third surface 513. At this point, the first and second Halbach arrays 520 and 530 are located to be biased to the third surface 513.

In the embodiment illustrated in FIG. 26, the magnet unit 550 is located adjacent to the fourth surface 514. At this point, the first and second Halbach arrays 520 and 530 are located to be biased to the fourth surface 514.

The magnet unit 550 is disposed to face the other surface of the third and fourth surfaces 513 and 514 and the third Halbach array 540 located adjacent to the other surface. The space part 515, and the fixed contactor 22 and the movable contactor 43 accommodated in the space part 515 are located between the magnet unit 550 and the other surface.

The magnet unit 550 is located between the first surface 511 and the second surface 512. In one embodiment, the magnet unit 550 may be located at a central portion of any one surface of the third and fourth surfaces 513 and 514.

In other words, the shortest distance between the magnet unit 550 and the first surface 511 and the shortest distance between the magnet unit 550 and the second surface 512 may be the same.

The magnet unit 550 can enhance the strength of the magnetic field formed by itself and the strength of the magnetic fields formed together with the first to third Halbach arrays 520, 530, and 540. Since the process of enhancing the direction and magnetic field of the magnetic field formed by the first magnet unit 550 is well known in the art, a detailed description thereof will be omitted.

The magnet unit 550 is formed to extend in one direction. In the illustrated embodiment, the magnet unit 550 is formed to extend in a direction in which the third surface 513 or the fourth surface 514 extends, that is, in the front-rear direction.

The magnet unit 550 includes a plurality of surfaces.

Specifically, the magnet unit 550 includes the facing surface 551 facing the space part 515 or the fixed contactor 22 and the opposing surface 552 opposite to the space part 515 or the fixed contactor 22.

Each surface of the magnet unit 550 may be magnetized according to a predetermined rule.

Specifically, the facing surface 551 may be magnetized to the same polarity as the first to third outer surfaces 521*b*, 522*b*, and 523*b* of the first Halbach array 520 and the first to third outer surfaces 531*b*, 532*b*, and 533*b* of the second Halbach array 530. In addition, the facing surface 551 may be magnetized to the same polarity as the first to third outer surfaces 541*b*, 542*b*, and 543*b* of the third Halbach array 540.

Similarly, the opposing surface 552 may be magnetized to the same polarity as the first to third inner surfaces 521*a*, 522*a*, and 523*a* of the first Halbach array 520 and the first to third inner surfaces 531*a*, 532*a*, and 533*a* of the second Halbach array 530. In addition, the opposing surface 552 may be magnetized to the same polarity as the first to third inner surfaces 541*a*, 542*a*, and 543*a* of the third Halbach array 540.

At this point, it will be understood that the polarity of the facing surface 551 and the polarity of the opposing surface 552 are formed to be different from each other.

Hereinafter, an arc path A.P formed by the arc path formation unit 500 according to the present embodiment will be described in detail with reference to FIGS. 27 and 28.

Figure 27:
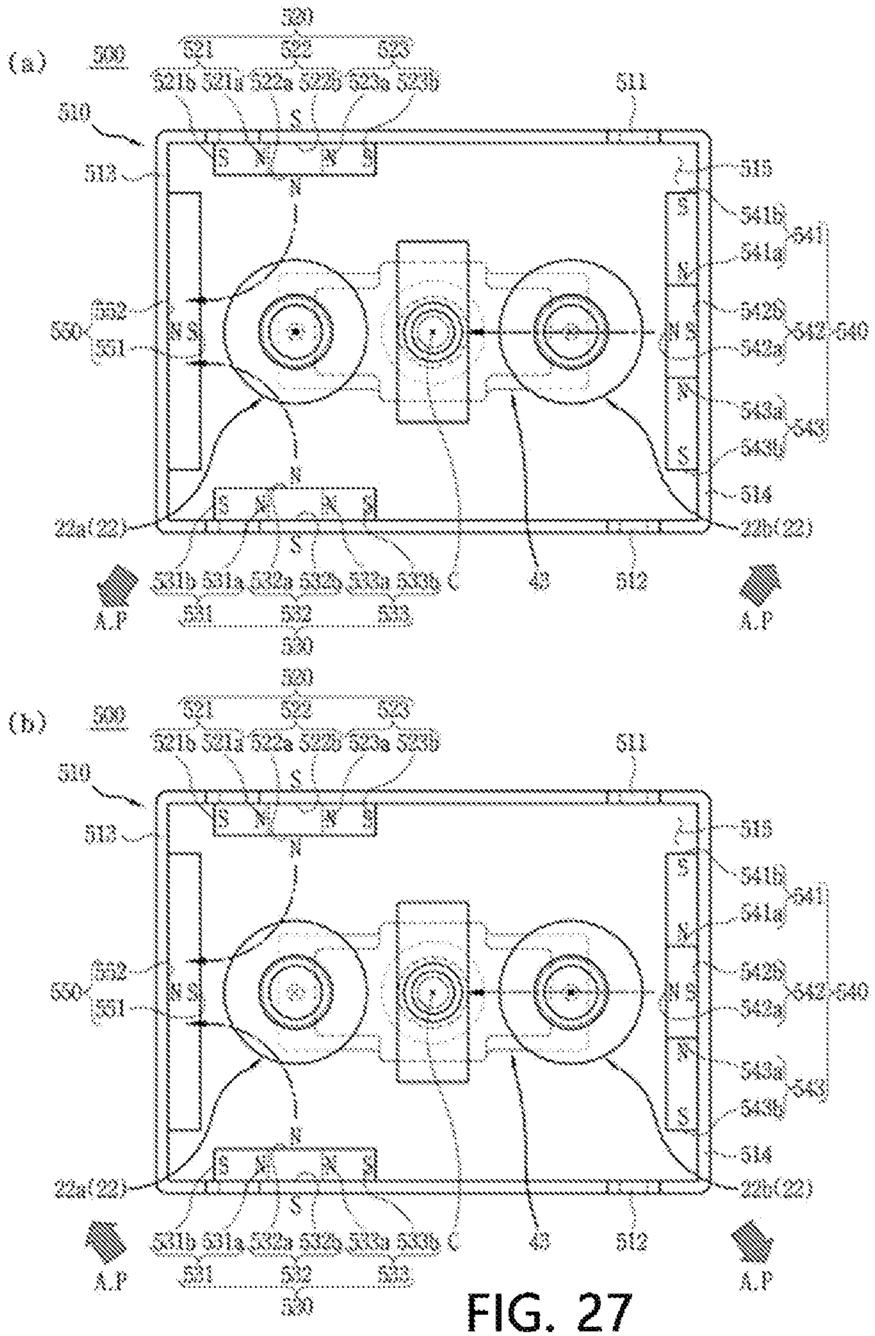
FIGS. 27 and 28 are conceptual views illustrating magnetic fields and arc paths formed by the arc path formation unit according to the embodiment of FIGS. 25 and 26.
Figure 28:
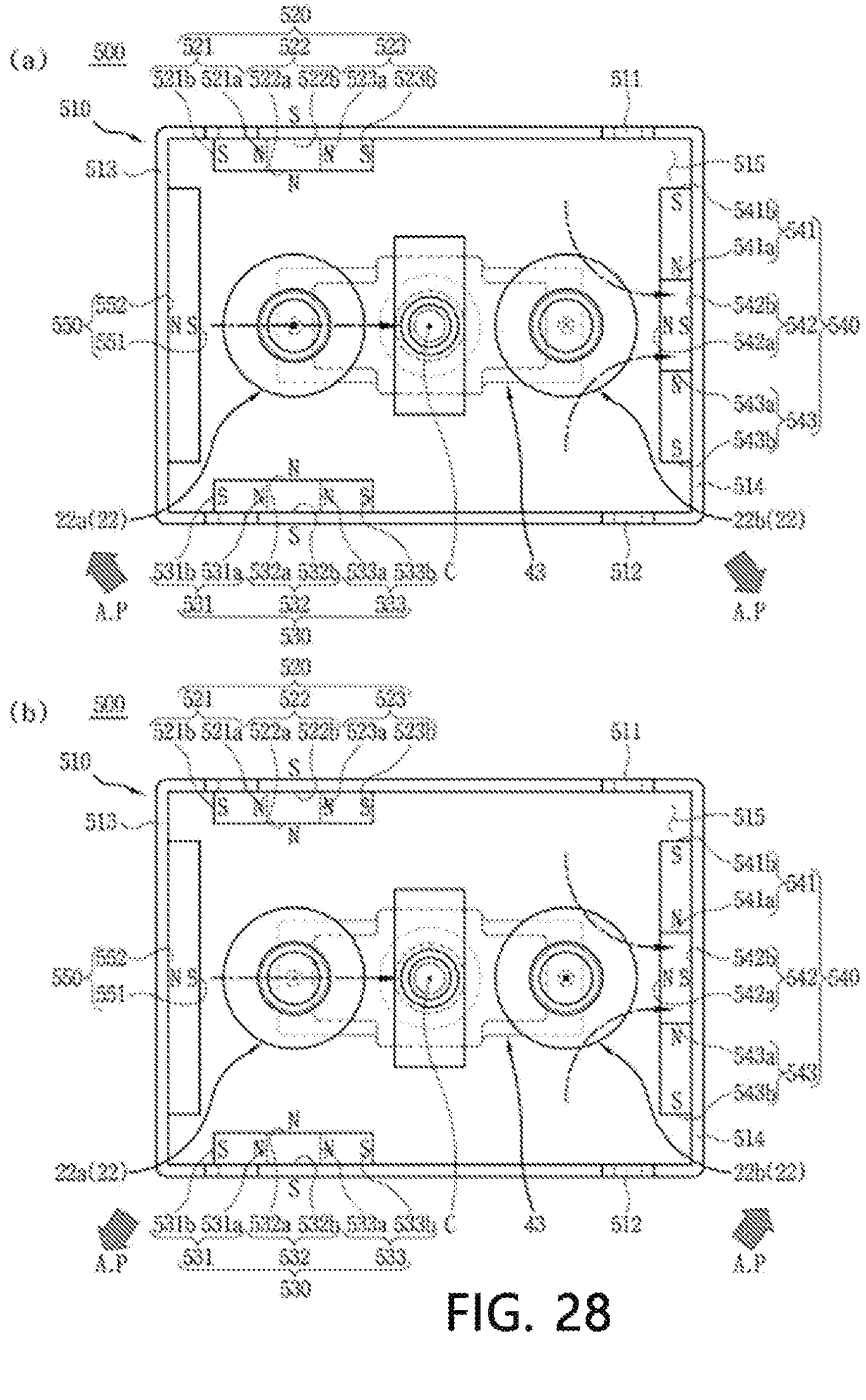

Referring to FIGS. 27 and 28, the first to third inner surfaces 521*a*, 522*a*, and 523*a* of the first Halbach array 520 are magnetized to N poles. According to the above-described rule, the first to third inner surfaces 531*a*, 532*a*, and 533*a* of the second Halbach array 530 and the first to third inner surfaces 541*a*, 542*a*, and 543*a* of the third Halbach array 540 are also magnetized to N poles.

Furthermore, the facing surface 551 of the magnet unit 550 is magnetized to an S pole.

Accordingly, magnetic fields that repel each other are formed between the first Halbach array 520 and the second Halbach array 530. In addition, in the third Halbach array 540, a magnetic field in a direction from the second inner surface 542*a* toward the facing surface 551 of the magnet unit 550 is formed.

Accordingly, in the embodiment illustrated in FIG. 27, the magnetic fields formed by the first to third Halbach arrays 520, 530, and 540 and the magnet unit 550 are formed toward the third surface 513, i.e., toward the left side in the illustrated embodiment.

In addition, in the embodiment illustrated in FIG. 28, the magnetic fields formed by the first to third Halbach arrays 520, 530, and 540 and the magnet unit 550 are formed toward the fourth surface 514, i.e., toward the right side in the illustrated embodiment.

In the embodiment illustrated in FIG. 27A, a direction of current is a direction from the second fixed contactor 22*b* to the first fixed contactor 22*a* via the movable contactor 43.

When the Fleming's left-hand rule is applied to the first fixed contactor 22*a*, an electromagnetic force generated in the vicinity of the first fixed contactor 22*a* is formed toward the front left side.

Accordingly, an arc path A.P generated in the vicinity of the first fixed contactor 22*a* is also formed toward the front left side.

Similarly, when the Fleming's left-hand rule is applied to the second fixed contactor 22*b*, an electromagnetic force generated in the vicinity of the second fixed contactor 22*b* is formed toward the rear right side.

Accordingly, an arc path A.P generated in the vicinity of the second fixed contactor 22*b* is also formed toward the rear right side.

In the embodiment illustrated in FIG. 27B, a direction of current is a direction from the first fixed contactor 22*a* to the second fixed contactor 22*b* via the movable contactor 43.

When the Fleming's left-hand rule is applied to the first fixed contactor 22*a*, an electromagnetic force generated in the vicinity of the first fixed contactor 22*a* is formed toward the rear left side.

Accordingly, the arc path A.P generated in the vicinity of the first fixed contactor 22*a* is also formed toward the rear left side.

Similarly, when the Fleming's left-hand rule is applied to the second fixed contactor 22*b*, an electromagnetic force generated in the vicinity of the second fixed contactor 22*b* is formed toward the front right side.

Accordingly, the arc path A.P generated in the vicinity of the second fixed contactor 22*b* is also formed toward the front right side.

In the embodiment illustrated in FIG. 28A, a direction of current is a direction from the second fixed contactor 22*b* to the first fixed contactor 22*a* via the movable contactor 43.

When the Fleming's left-hand rule is applied to the first fixed contactor 22*a*, an electromagnetic force generated in the vicinity of the first fixed contactor 22*a* is formed toward the rear left side.

Accordingly, the arc path A.P generated in the vicinity of the first fixed contactor 22*a* is also formed toward the rear left side.

Similarly, when the Fleming's left-hand rule is applied to the second fixed contactor 22*b*, an electromagnetic force generated in the vicinity of the second fixed contactor 22*b* is formed toward the front right side.

Accordingly, the arc path A.P generated in the vicinity of the second fixed contactor 22*b* is also formed toward the front right side.

In the embodiment illustrated in FIG. 28B, a direction of current is a direction from the first fixed contactor 22*a* to the second fixed contactor 22*b* via the movable contactor 43.

When the Fleming's left-hand rule is applied to the first fixed contactor 22*a*, an electromagnetic force generated in the vicinity of the first fixed contactor 22*a* is formed toward the front left side.

Accordingly, the arc path A.P generated in the vicinity of the first fixed contactor 22*a* is also formed toward the front left side.

Similarly, when the Fleming's left-hand rule is applied to the second fixed contactor 22*b*, an electromagnetic force generated in the vicinity of the second fixed contactor 22*b* is formed toward the rear right side.

Accordingly, the arc path A.P generated in the vicinity of the second fixed contactor 22*b* is also formed toward the rear right side.

Although not illustrated in the drawing, when the polarity of each surface of the first to third Halbach arrays 520, 530, and 540 and the magnet unit 550 is changed, the direction of the magnetic field formed in each of first to third Halbach arrays 520, 530, and 540 and the magnet unit 550 is reversed. Accordingly, the generated electromagnetic force and the arc path A.P are also formed so that the front-rear direction thereof is reversed.

That is, in the electric connection situation shown in FIG. 27A, the electromagnetic force and the arc path A.P generated in the vicinity of the first fixed contactor 22*a* are formed toward the rear left side. In addition, the electromagnetic force and the arc path A.P generated in the vicinity of the second fixed contactor 22*b* are formed toward the front right side.

Similarly, in the electric connection situation shown in FIG. 27B, the electromagnetic force and the arc path A.P generated in the vicinity of the first fixed contactor 22*a* are formed toward the front left side. In addition, the electromagnetic force and the arc path A.P generated in the vicinity of the second fixed contactor 22*b* are formed toward the rear right side.

In addition, in the electric connection situation shown in FIG. 28A, the electromagnetic force and the arc path A.P in the vicinity of the first fixed contactor 22*a* are formed toward the front left side. In addition, the electromagnetic force and the arc path A.P generated in the vicinity of the second fixed contactor 22*b* are formed toward the rear right side.

Similarly, in the electric connection situation shown in FIG. 28B, the electromagnetic force and the arc path A.P in the vicinity of the first fixed contactor 22*a* are formed toward the rear left side. In addition, the electromagnetic force and the arc path A.P generated in the vicinity of the second fixed contactor 22*b* are formed toward the front right side.

Accordingly, in the arc path formation unit 500 according to the present embodiment, the electromagnetic force and the arc path A.P may be formed in a direction away from the central part C regardless of the polarity of each of the first to third Halbach arrays 520, 530, and 540 and the magnet unit 550 or the direction of the current flowing through the direct current relay 1.

Accordingly, damage to each component of the direct current relay 1 disposed adjacent to the central part C can be prevented. Furthermore, since the generated arc can be quickly discharged to the outside, operational reliability of the direct current relay 1 can be improved.

(6) Description of Arc Path Formation Unit 600 According to Yet Another Embodiment of Present Disclosure Hereinafter, an arc path formation unit 600 according to yet another embodiment of the present disclosure will be described in detail with reference to FIGS. 29 to 36.

Referring to FIGS. 29 to 32, the arc path formation unit 600 according to the illustrated embodiment includes a magnet frame 610, a first Halbach array 620, a second Halbach array 630, a first magnet unit 640, and a second magnet unit 650.

The magnet frame 610 according to the present embodiment has the same structure and function as the magnet frame 110 according to the above-described embodiment. However, there is a difference in the arrangement method of the first Halbach array 620, the second Halbach array 630, the first magnet unit 640, and the second magnet unit 650 disposed in the magnet frame 610 according to the present embodiment.

Accordingly, a description of the magnet frame 610 will be replaced with the description of the magnet frame 110 according to the above-described embodiment.

In the illustrated embodiment, the plurality of magnetic materials constituting the first Halbach array 620 are continuously disposed side by side from the left side to the right side. That is, in the illustrated embodiment, the first Halbach array 620 is formed to extend in the left-right direction.

The first Halbach array 620 may form a magnetic field together with another magnetic material. In the illustrated embodiment, the first Halbach array 620 may form a magnetic field together with the second Halbach array 630, the first and second magnet units 640 and 650.

The first Halbach array 620 may be located adjacent to any one surface of first and second surfaces 611 and 612. In one embodiment, the first Halbach array 620 may be coupled to an inner side (i.e., the side in a direction toward a space part 615) of the any one surface.

Figure 29:
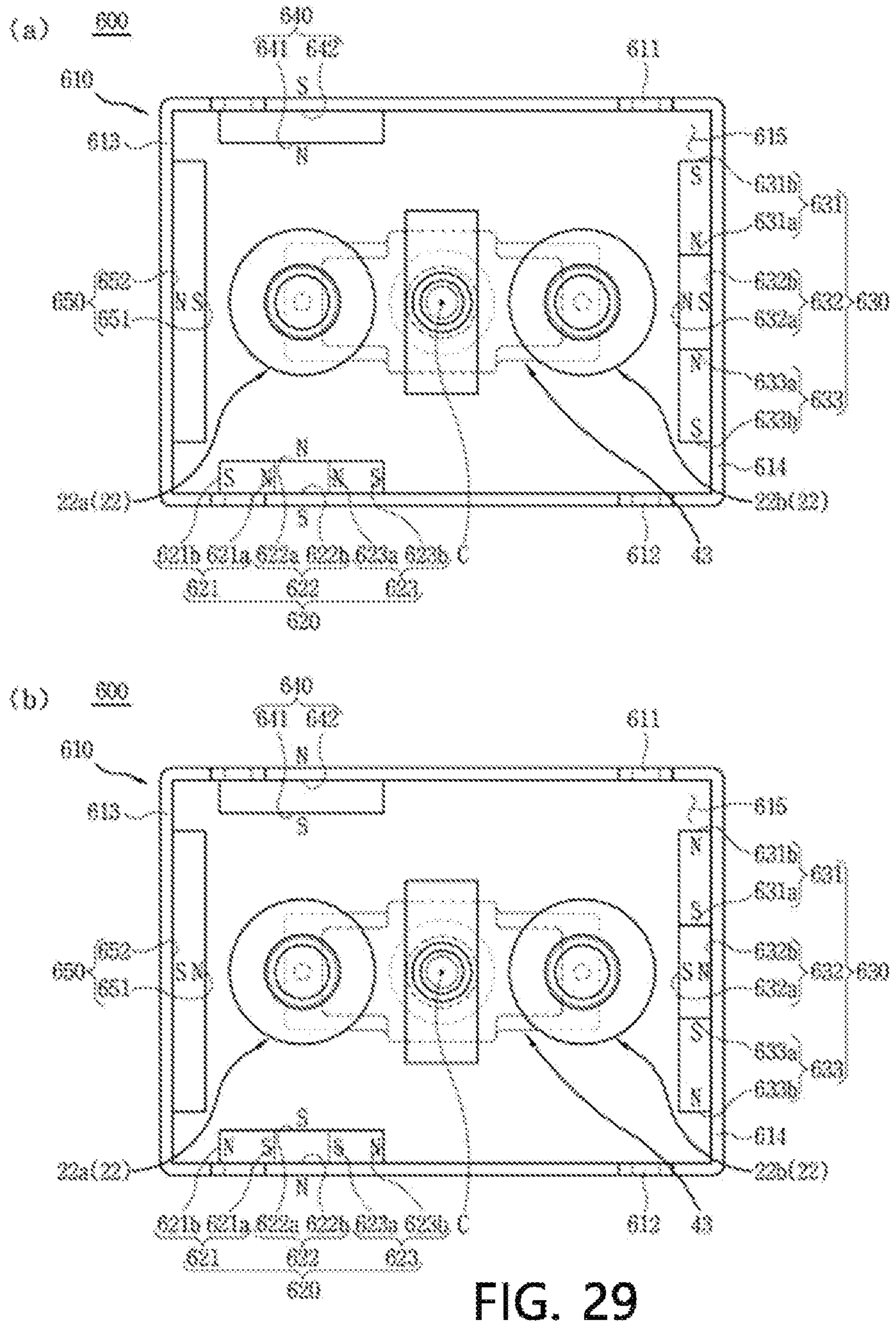
FIGS. 29 to 32 are conceptual views illustrating an arc path formation unit according to yet another embodiment of the present disclosure.
Figure 31:
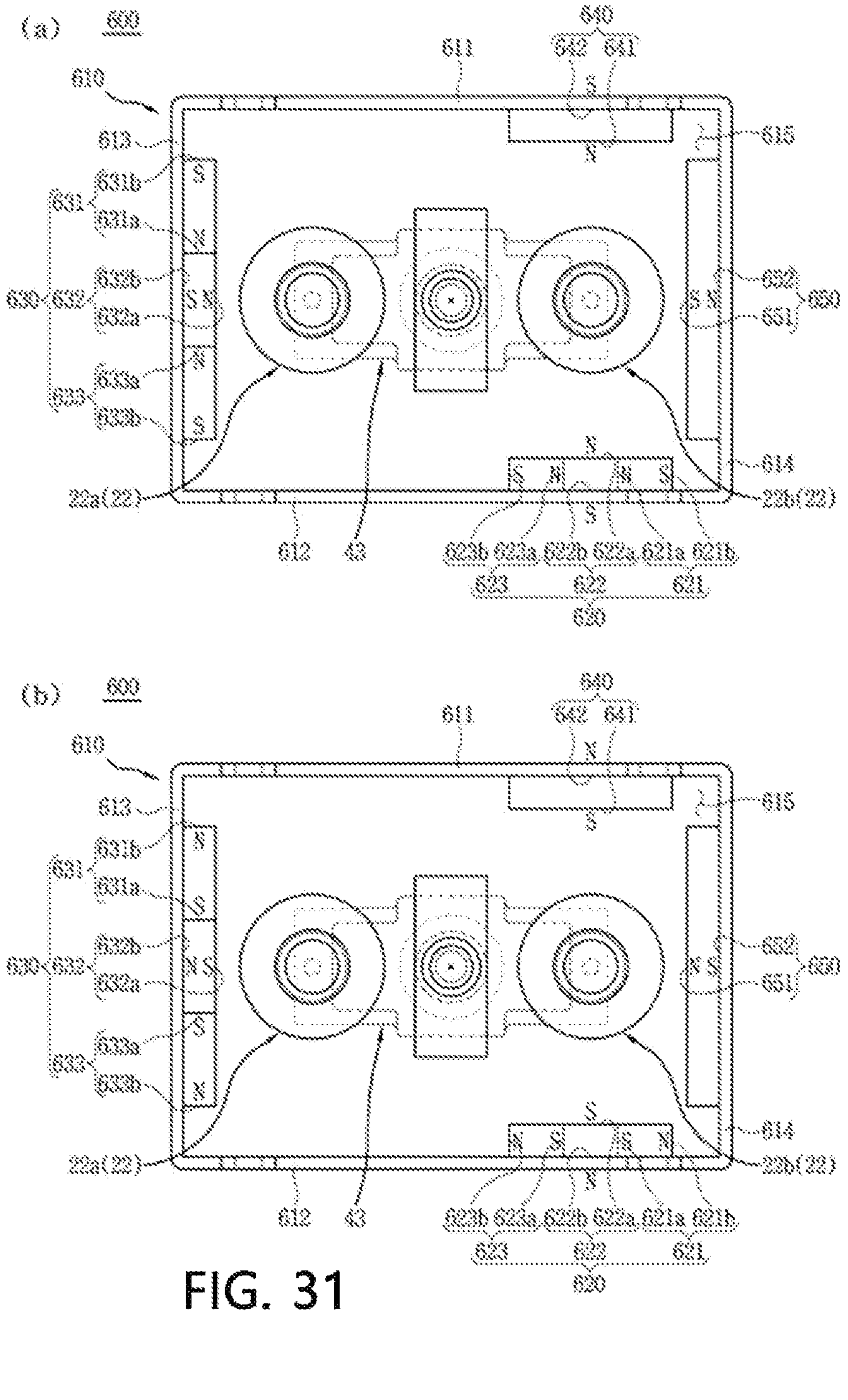

In the embodiment illustrated in FIGS. 29 and 31, the first Halbach array 620 is disposed on an inner side of the second surface 612 and adjacent to the second surface 612 and face the first magnet unit 640 located on an inner side of the first surface 611.

Figure 30:
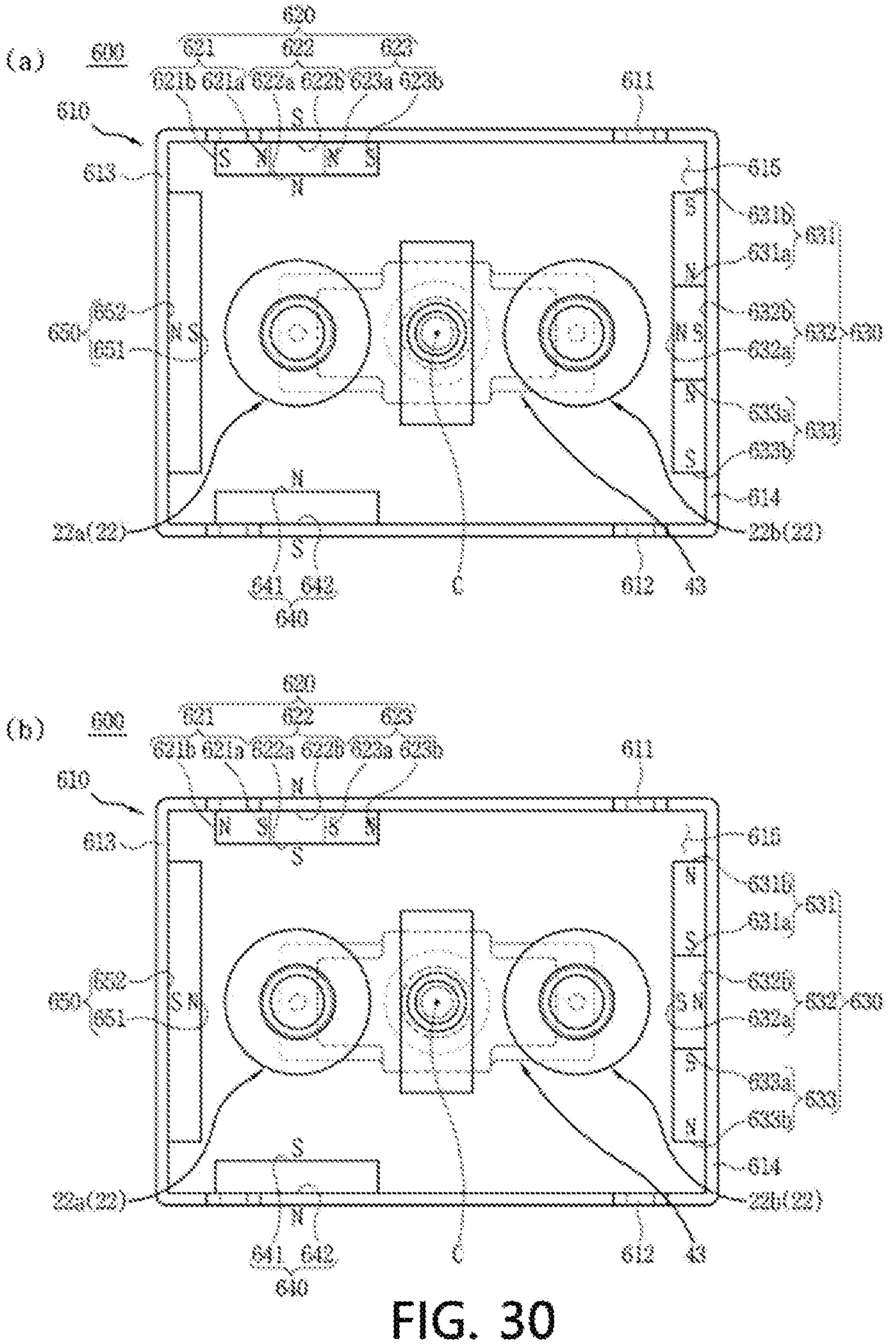
Figure 32:
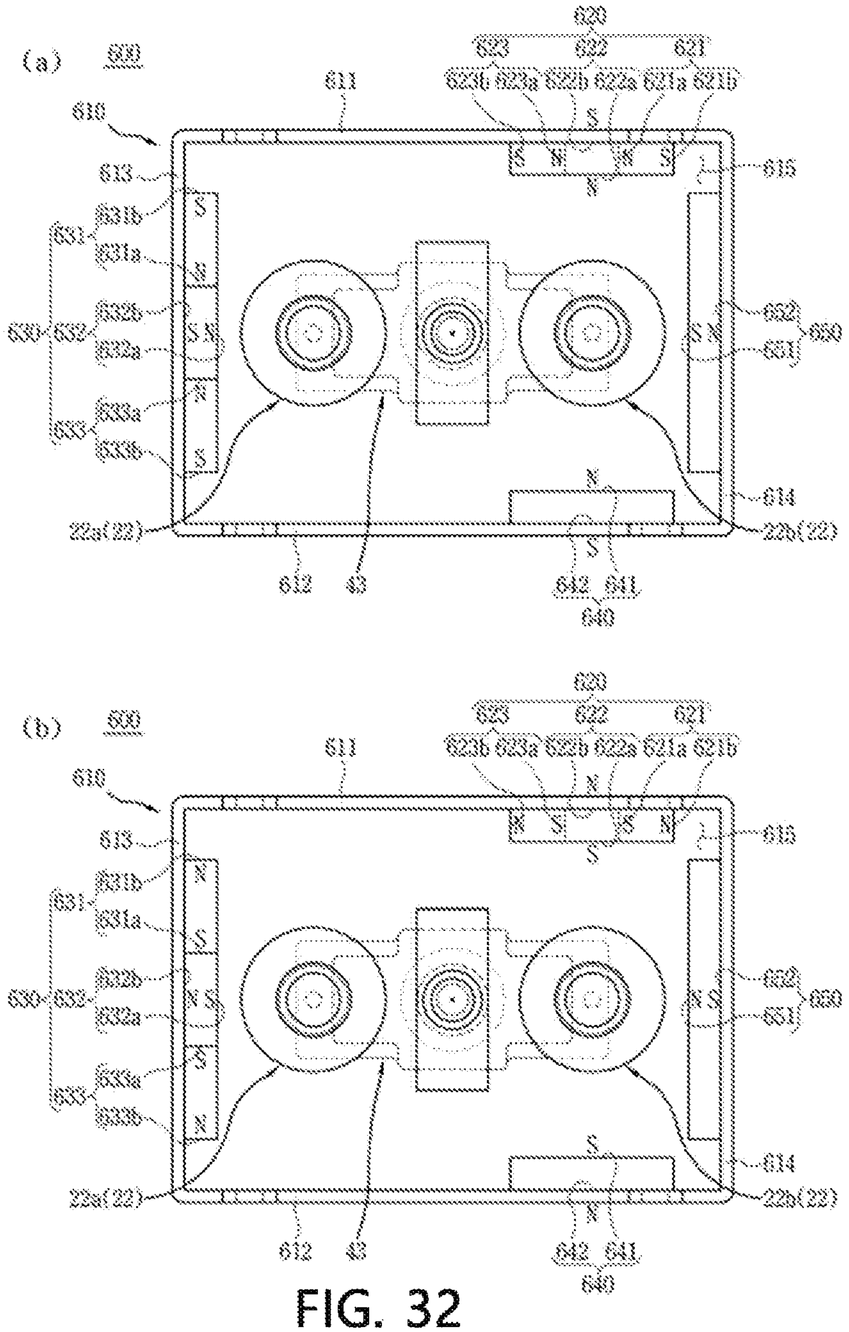

In the embodiment illustrated in FIGS. 30 and 32, the first Halbach array 620 is disposed on the inner side of the first surface 611 and adjacent to the first surface 611 and faces the first magnet unit 640 located on the inner side of the second surface 612.

The space part 615, and the fixed contactor 22 and the movable contactor 43 accommodated in the space part 615 are located between the first Halbach array 620 and the second Halbach array 630.

In addition, the space part 615, and the fixed contactor 22 and the movable contactor 43 accommodated in the space part 615 are located between the first Halbach array 620 and the first magnet unit 640.

Furthermore, the space part 615, and the fixed contactor 22 and the movable contactor 43 accommodated in the space part 615 are located between the first Halbach array 620 and the second magnet unit 650.

The first Halbach array 620 may be located to be biased to any one surface of a third surface 613 and a fourth surface 614. In the embodiment illustrated in FIGS. 29 and 30, the first Halbach array 620 is located to be biased to the fourth surface 614. In the embodiment illustrated in FIGS. 31 and 32, the first Halbach array 620 is located to be biased to the third surface 613.

The any one surface, to which the first Halbach array 620 is located to be biased, may be a surface to which the second magnet unit 650 is located adjacent. In addition, the any one surface, to which the first Halbach array 620 is located to be biased, may be a surface opposite to a surface to which the second Halbach array 630 is located adjacent.

The first Halbach array 620 may enhance the strength of the magnetic field formed by itself and the magnetic fields formed together with the second Halbach array 630 and the first and second magnet units 640 and 650. Since the process of enhancing the direction and magnetic field of the magnetic field formed by the first Halbach array 620 is a well-known technique, a detailed description thereof will be omitted.

In the illustrated embodiment, the first Halbach array 620 includes a first block 621, a second block 622, and a third block 623. It will be understood that the plurality of magnetic materials constituting the first Halbach array 620 are named as the blocks 621, 622, and 623, respectively.

The first to third blocks 621, 622, and 623 may each be formed of a magnetic material. In one embodiment, the first to third blocks 621, 622, and 623 may each be provided as a permanent magnet, an electromagnet, or the like.

The first to third blocks 621, 622, and 623 may be disposed in parallel in one direction. In the illustrated embodiment, the first to third blocks 621, 622, and 623 are disposed in parallel in a direction in which the first surface 611 extends, that is, in the left-right direction.

The first block 621 is located adjacent to the any one surface of the third surface 613 and the fourth surface 614. In addition, the third block 623 is located adjacent to the other surface of the third surface 613 and the fourth surface 614. The second block 622 is located between the first block 621 and the third block 623.

In one embodiment, the blocks 621, 622, and 623 adjacent to each other may be in contact with each other.

The second block 622 may be disposed to overlap the first magnet unit 640 and any one of the fixed contactors **22*a* and 22*b* in a direction toward the first magnet unit 640 or the space part 615**, i.e., in the front-rear direction in the illustrated embodiment.

Each of the blocks 621, 622, and 623 includes a plurality of surfaces.

Specifically, the first block 621 includes a first inner surface **621*a* facing the second block 622 and a first outer surface 621*b* opposite to the second block 622**.

The second block 622 includes a second inner surface **622*a* facing the space part 615 or the first magnet unit 640 and a second outer surface 622*b* opposite to the space part 615 or the first magnet unit 640**.

The third block 623 includes a third inner surface **623*a* facing the second block 622 and a third outer surface 623*b* opposite to the second block 622**.

The plurality of surfaces of each of the blocks 621, 622, and 623 may be magnetized according to a predetermined rule to configure a Halbach array.

Specifically, the first to third inner surfaces **621*a*, 622*a*, and 623*a* may be magnetized to the same polarity. Similarly, the first to third outer surfaces 621*b*, 622*b*, and 623*b* are magnetized to a polarity different from the polarity of the first to third inner surfaces 621*a*, 622*a*, and 623*a***.

At this point, the first to third inner surfaces **621*a*, 622*a*, and 623*a* may be magnetized to the same polarity as first to third inner surfaces 631*a*, 632*a*, and 633*a* of the second Halbach array 630 and a first facing surface 641 of the first magnet unit 640. In addition, the first to third inner surfaces 621*a*, 622*a*, and 623*a* may be magnetized to the same polarity as a second opposing surface 652 of the second magnet unit 650**.

Similarly, the first to third outer surfaces **621*b*, 622*b*, and 623*b* may be magnetized to the same polarity as first to third outer surfaces 631*b*, 632*b*, and 633*b* of the second Halbach array 630 and a first opposing surface 642 of the first magnet unit 640. In addition, the first to third outer surfaces 621*b*, 622*b*, and 623*b* may be magnetized to the same polarity as a second facing surface 651 of the second magnet unit 650**.

In the illustrated embodiment, the plurality of magnetic materials constituting the second Halbach array 630 are continuously disposed side by side from the front side to the rear side. That is, in the illustrated embodiment, the second Halbach array 630 is formed to extend in the front-rear direction.

The second Halbach array 630 may form a magnetic field together with another magnetic material. In the illustrated embodiment, the second Halbach array 630 may form magnetic fields together with the first Halbach array 620 and the first and second magnet units 640 and 650.

The second Halbach array 630 may be located adjacent to the other surface of the third and fourth surfaces 613 and 614. In one embodiment, the second Halbach array 630 may be coupled to an inner side (i.e., the side in a direction toward the space part 615) of the other surface.

The second Halbach array 630 may be located adjacent to a surface opposite to any one surface to which the first Halbach array 620 and the first magnet unit 640 are located to be biased.

In the embodiment illustrated in FIGS. 29 and 30, the second Halbach array 630 is disposed on an inner side of the fourth surface 614 and adjacent to the fourth surface 614 and faces the second magnet unit 650 located on an inner side of the third surface 613.

In the embodiment illustrated in FIGS. 31 and 32, the second Halbach array 630 is disposed on the inner side of the third surface 613 and adjacent to the third surface 613 and faces the second magnet unit 650 located on the inner side of the fourth surface 614.

The space part 615, and the fixed contactor 22 and the movable contactor 43 accommodated in the space part 615 are located between the second Halbach array 630 and the first Halbach array 620.

In addition, the space part 615, and the fixed contactor 22 and the movable contactor 43 accommodated in the space part 615 are located between the second Halbach array 630 and the first magnet unit 640.

Furthermore, the space part 615, and the fixed contactor 22 and the movable contactor 43 accommodated in the space part 615 are located between the second Halbach array 630 and the second magnet unit 650.

The second Halbach array 630 is located between the first surface 611 and the second surface 612. In one embodiment, the second Halbach array 630 may be located at a central portion of any one surface of the third and fourth surfaces 613 and 614.

In other words, the shortest distance between the second Halbach array 630 and the first surface 611 and the shortest distance between the second Halbach array 630 and the second surface 612 may be the same.

The second Halbach array 630 may enhance the strength of the magnetic field formed by itself and the magnetic fields formed together with the first Halbach array 620 and the first and second magnet units 640 and 650. Since the process of enhancing the direction and magnetic field of the magnetic field formed by the second Halbach array 630 is a well-known technique, a detailed description thereof will be omitted.

In the illustrated embodiment, the second Halbach array 630 includes a first block 631, a second block 632, and a third block 633. It will be understood that the plurality of magnetic bodies constituting the second Halbach array 630 are named as the blocks 631, 632, and 633, respectively.

The first to third blocks 631, 632, and 633 may each be formed of a magnetic material. In one embodiment, the first to third blocks 631, 632, and 633 may each be provided as a permanent magnet, an electromagnet, or the like.

The first to third blocks 631, 632, and 633 may be disposed in parallel in one direction. In the illustrated embodiment, the first to third blocks 631, 632, and 633 are disposed in parallel in a direction in which the third surface 613 or the fourth surface 614 extends, that is, in the front-rear direction.

The first block 631 is located at the most front side. That is, the first block 631 is located adjacent to the first surface 611. In addition, the third block 633 is located at the most rear side. That is, the third block 633 is located adjacent to the second surface 612. The second block 632 is located between the first block 631 and the third block 633.

In one embodiment, the blocks 631, 632, and 633 adjacent to each other may be in contact with each other.

The second block 632 may be disposed to overlap the fixed contactors **22*a* and 22*b* in a direction toward the second Halbach array 630 or the space part 615**, i.e., in the front-rear direction in the illustrated embodiment.

Each of the blocks 631, 632, and 633 includes a plurality of surfaces.

Specifically, the first block 631 includes the first inner surface **631*a* facing the second block 632 and the first outer surface 631*b* opposite to the second block 632**.

The second block 632 includes the second inner surface **632*a* facing the space part 615 or the second magnet unit 650 and the second outer surface 632*b* opposite to the space part 615 or the second magnet unit 650**.

The third block 633 includes the third inner surface **633*a* facing the second block 632 and the third outer surface 633*b* opposite to the second block 632**.

The plurality of surfaces of each of the blocks 631, 632, and 633 may be magnetized according to a predetermined rule to configure a Halbach array.

Specifically, the first to third inner surfaces **631*a*, 632*a*, and 633*a* may be magnetized to the same polarity. Similarly, the first to third outer surfaces 631*b*, 632*b*, and 633*b* may be magnetized to a polarity different from the polarity of the first to third inner surfaces 631*a*, 632*a*, and 633*a***.

At this point, the first to third inner surfaces **631*a*, 632*a*, and 633*a* may be magnetized to the same polarity as the first to third inner surfaces 621*a*, 622*a*, and 623*a* of the first Halbach array 620 and the first facing surface 641 of the first magnet unit 640. In addition, the first to third inner surfaces 631*a*, 632*a*, and 633*a* may be magnetized to the same polarity as the second opposing surface 652 of the second magnet unit 650**.

Similarly, the first to third outer surfaces **631*b*, 632*b*, and 633*b* may be magnetized to the same polarity as the first to third outer surfaces 621*b*, 622*b*, and 623*b* of the first Halbach array 620 and the first opposing surface 642 of the first magnet unit 640. In addition, the first to third outer surfaces 631*b*, 632*b*, and 633*b* may be magnetized to the same polarity as the second facing surface 651 of the second magnet unit 650**.

The first magnet unit 640 forms a magnetic field by itself, or forms magnetic fields together with the first and second Halbach arrays 620 and 630 and the second magnet unit 650. An arc path A.P may be formed inside the arc chamber 21 by the magnetic field formed by the first magnet unit 640.

The first magnet unit 640 may be provided in any form capable of being magnetized to form a magnetic field. In one embodiment, the first magnet unit 640 may be provided as a permanent magnet, an electromagnet, or the like.

The first magnet unit 640 may be located adjacent to the other surface of the first and second surfaces 611 and 612. In one embodiment, the first magnet unit 640 may be coupled to an inner side (i.e., the side in a direction toward the space part 615) of the other surface.

At this point, the first magnet unit 640 is located to be biased to any one surface of the third and fourth surfaces 613 and 614, to which the second magnet unit 650 is located adjacent. In other words, the first magnet unit 640 is located to be biased to a surface opposite to the other surface of the third and fourth surfaces 613 and 614, to which the second Halbach array 630 is located adjacent.

The first magnet unit 640 is disposed to face the first Halbach array 620 with the space part 615 therebetween.

In the embodiment illustrated in FIGS. 29 and 31, the first magnet unit 640 is located adjacent to the first surface 611. In addition, in the embodiment illustrated in FIGS. 30 and 32, the first magnet unit 640 is located adjacent to the second surface 612.

In the embodiment illustrated in FIGS. 29 and 30, the first magnet unit 640 is located to be biased to the third surface 613. In the embodiment illustrated in FIGS. 31 and 32, the first magnet unit 640 is located to be biased to the fourth surface 614.

The first magnet unit 640 is disposed to face the other surface of the first and second surfaces 611 and 612 and the first Halbach array 620 located adjacent to the other surface. The space part 615, and the fixed contactor 22 and the movable contactor 43 accommodated in the space part 615 are located between the first magnet unit 640 and the other surface.

In one embodiment, the first magnet unit 640 may be disposed to overlap the first Halbach array 620 and any one of the fixed contactors **22*a* and 22*b*** in the front-rear direction.

The first magnet unit 640 can enhance the strength of the magnetic field formed by itself and the strength of the magnetic fields formed together with the first and second Halbach arrays 620 and 630 and the second magnet unit 650. Since the process of enhancing the direction and magnetic field of the magnetic field formed by the first magnet unit 640 is well known in the art, a detailed description thereof will be omitted.

The first magnet unit 640 is formed to extend in one direction. In the illustrated embodiment, the first magnet unit 640 is formed to extend in a direction in which the first surface 611 or the second surface 612 extends, that is, in the left-right direction.

The first magnet unit 640 includes a plurality of surfaces.

Specifically, the first magnet unit 640 includes the first facing surface 641 facing the space part 615 or the fixed contactor 22 and the first opposing surface 642 opposite to the space part 615 or the fixed contactor 22.

Each surface of the first magnet unit 640 may be magnetized according to a predetermined rule.

Specifically, the first facing surface 641 may be magnetized to the same polarity as the first to third inner surfaces 621*a*, 622*a*, and 623*a* of the first Halbach array 620 and the first to third inner surfaces 631*a*, 632*a*, and 633*a* of the second Halbach array 630. In addition, the first facing surface 641 may be magnetized to the same polarity as the second opposing surface 652 of the second magnet unit 650.

Similarly, the first opposing surface 642 may be magnetized to the same polarity as the first to third outer surfaces 621*b*, 622*b*, and 623*b* of the first Halbach array 620 and the first to third outer surfaces 631*b*, 632*b*, and 633*b* of the second Halbach array 630. In addition, the first opposing surface 642 may be magnetized to the same polarity as the second facing surface 651 of the second magnet unit 650.

At this point, it will be understood that the polarity of the first facing surface 641 and the polarity of the first opposing surface 642 are formed to be different from each other.

The second magnet unit 650 forms a magnetic field by itself, or forms magnetic fields together with the first and second Halbach arrays 620 and 630 and the first magnet unit 640. An arc path A.P may be formed inside the arc chamber 21 by the magnetic field formed by the second magnet unit 650.

The second magnet unit 650 may be provided in any form capable of being magnetized to form a magnetic field. In one embodiment, the second magnet unit 650 may be provided as a permanent magnet, an electromagnet, or the like.

The second magnet unit 650 may be located adjacent to any one surface of the third and fourth surfaces 613 and 614. In one embodiment, the second magnet unit 650 may be coupled to an inner side (i.e., the side in a direction toward the space part 615) of the any one surface.

At this point, the second magnet unit 650 is located on any one surface of the third and fourth surfaces 613 and 614, to which the first Halbach array 620 and the first magnet unit 640 are located to be biased.

The second magnet unit 650 is disposed to face the other surface of the third and fourth surfaces 613 and 614 and the second Halbach array 630, which is located adjacent to the other surface, with the space part 615 therebetween.

In the embodiment illustrated in FIGS. 29 and 30, the second magnet unit 650 is located adjacent to the third surface 613. At this point, the first Halbach array 620 and the first magnet unit 640 are located to be biased to the third surface 613. In addition, the second Halbach array 630 is located adjacent to the fourth surface 614.

In the embodiment illustrated in FIGS. 31 and 32, the second magnet unit 650 is located adjacent to the fourth surface 614. At this point, the first Halbach array 620 and the first magnet unit 640 are located to be biased to the fourth surface 614. In addition, the second Halbach array 630 is located to be biased to the third surface 613.

The second magnet unit 650 is disposed to face the other surface of the third and fourth surfaces 613 and 614 and the second Halbach array 630 located adjacent to the other surface. The space part 615, and the fixed contactor 22 and the movable contactor 43 accommodated in the space part 615 are located between the second magnet unit 650 and the other surface.

The second magnet unit 650 is located between the first surface 611 and the second surface 612. In one embodiment, the second magnet unit 650 may be located at a central portion of any one surface of the third and fourth surfaces 613 and 614.

In other words, the shortest distance between the second magnet unit 650 and the first surface 611 and the shortest distance between the second magnet unit 650 and the second surface 612 may be the same.

The second magnet unit 650 can enhance the strength of the magnetic field formed by itself and the strength of the magnetic fields formed together with the first and second Halbach arrays 620 and 630 and the first magnet unit 640. Since the process of enhancing the direction and magnetic field of the magnetic field formed by the second magnet unit 650 is well known in the art, a detailed description thereof will be omitted.

The second magnet unit 650 is formed to extend in one direction. In the illustrated embodiment, the second magnet unit 650 is formed to extend in a direction in which the third surface 613 or the fourth surface 614 extends, that is, in the front-rear direction.

The second magnet unit 650 includes a plurality of surfaces.

Specifically, the second magnet unit 650 includes the second facing surface 651 facing the space part 615 or the fixed contactor 22 and the second opposing surface 652 opposite to the space part 615 or the fixed contactor 22.

Each surface of the second magnet unit 650 may be magnetized according to a predetermined rule.

Specifically, the second facing surface 651 may be magnetized to the same polarity as the first to third outer surfaces 621*b*, 622*b*, and 623*b* of the first Halbach array 620 and the first to third outer surfaces 631*b*, 632*b*, and 633*b* of the second Halbach array 630. In addition, the second facing surface 651 may be magnetized to the same polarity as the first opposing surface 642 of the first magnet unit 640.

Similarly, the second opposing surface 652 may be magnetized to the same polarity as the first to third inner surfaces 621*a*, 622*a*, and 623*a* of the first Halbach array 620 and the first to third inner surfaces 631*a*, 632*a*, and 633*a* of the second Halbach array 630. In addition, the second opposing surface 652 may be magnetized to the same polarity as the first facing surface 641 of the first magnet unit 640.

At this point, it will be understood that the polarity of the second facing surface 651 and the polarity of the second opposing surface 652 are formed to be different from each other.

Hereinafter, an arc path A.P formed by the arc path formation unit 600 according to the present embodiment will be described in detail with reference to FIGS. 33 to 36.

Referring to FIGS. 33 to 36, the first to third inner surfaces 621*a*, 622*a*, and 623*a* of the first Halbach array 620 are magnetized to N poles. According to the above-described rule, the first to third inner surfaces 631*a*, 632*a*, and 633*a* of the second Halbach array 630 and the first facing surface 641 of the first magnet unit 640 are also magnetized to N poles. At this point, the second facing surface 651 of the second magnet unit 650 is magnetized to an S pole.

Accordingly, magnetic fields that repel each other are formed between the first Halbach array 620 and the first magnet unit 640. In addition, a magnetic field in a direction from the second inner surface 632*a* toward the second facing surface 651 is formed between the second Halbach array 630 and the second magnet unit 650.

Figure 33:
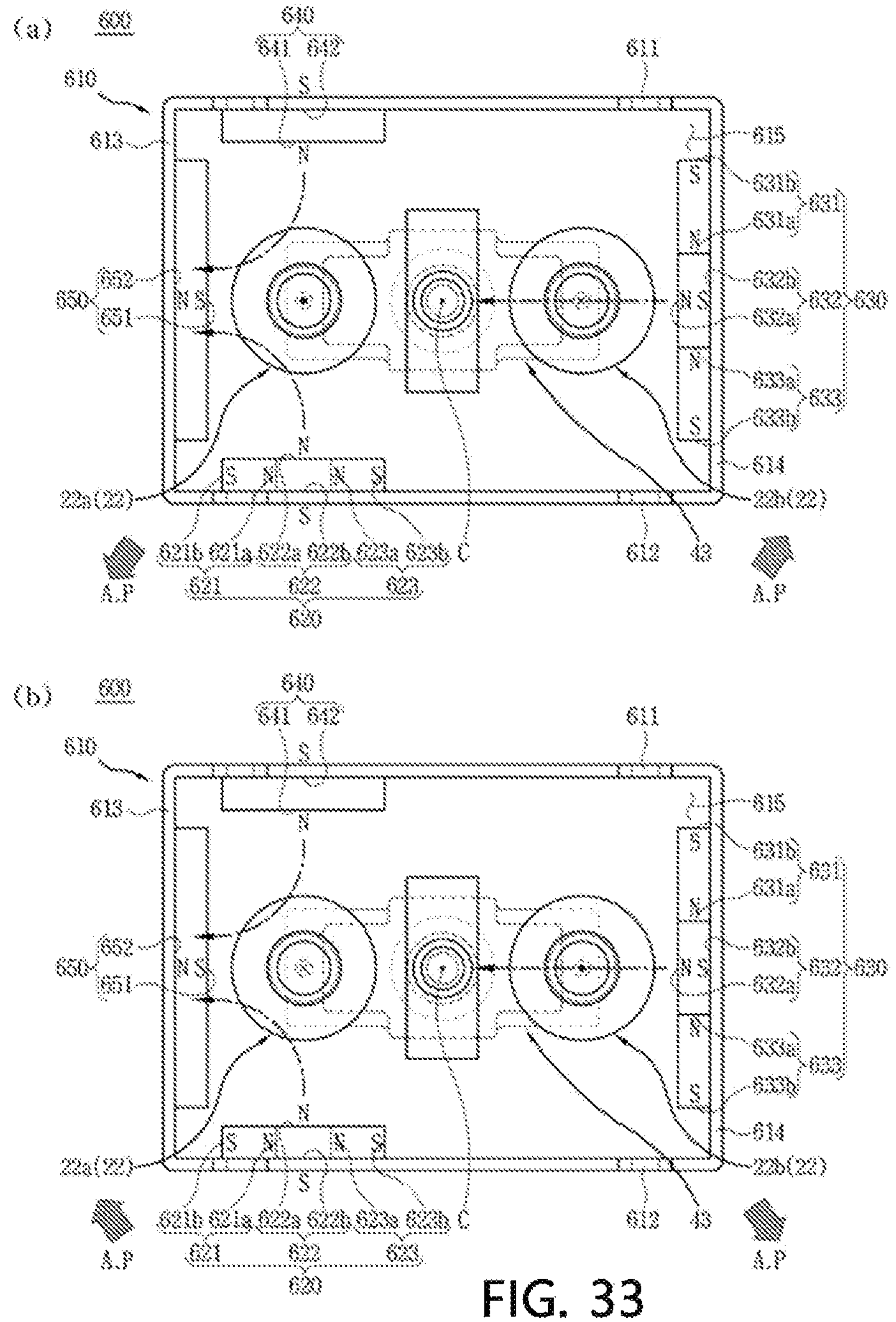
FIGS. 33 to 36 are conceptual views illustrating magnetic fields and arc paths formed by the arc path formation unit according to the embodiment of FIGS. 29 to 32.
Figure 34:
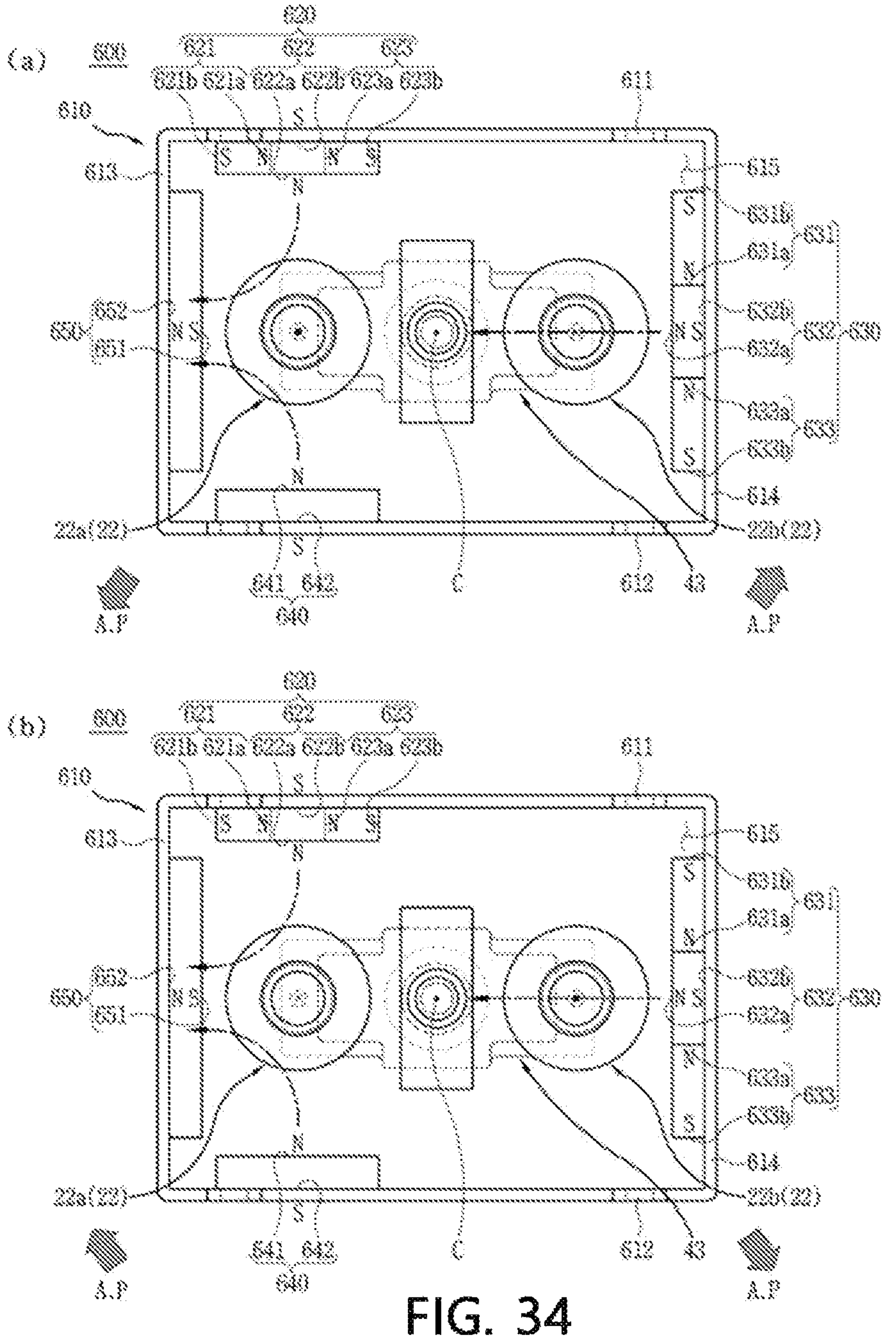

Accordingly, in the embodiment illustrated in FIGS. 33 and 34, the magnetic fields formed by the first and second Halbach arrays 620 and 630 and the first and second magnet units 640 and 650 are formed toward the third surface 613, i.e., toward the left side in the illustrated embodiment.

Figure 35:
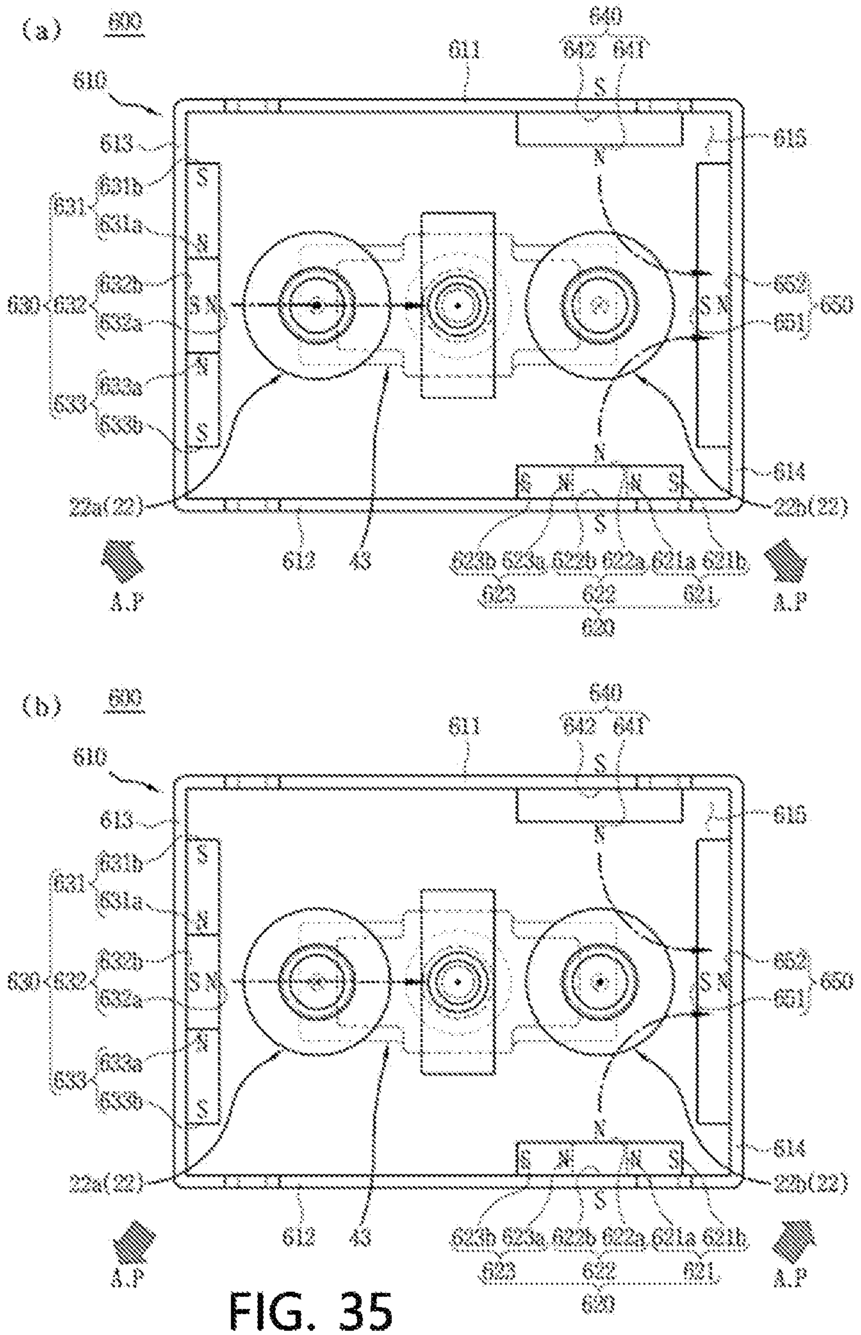
Figure 36:
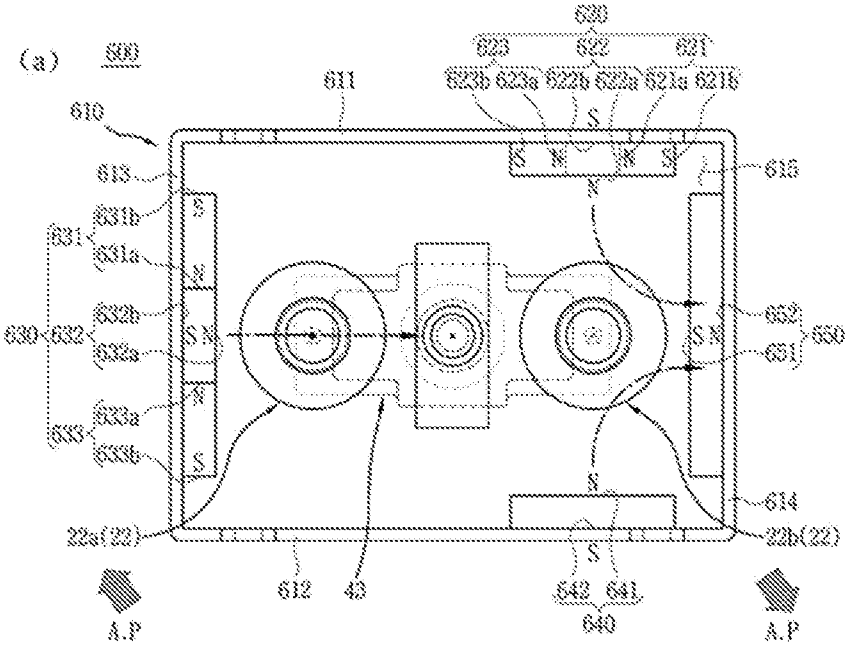
Figure 36:
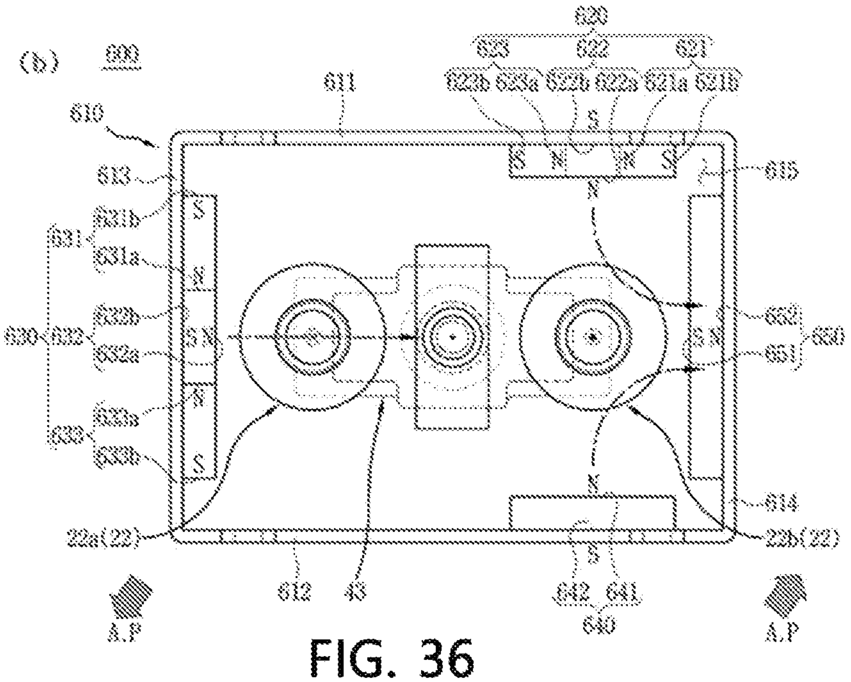

In addition, in the embodiment illustrated in FIGS. 35 and 36, the magnetic fields formed by the first and second Halbach arrays 620 and 630 and the first and second magnet units 640 and 650 are formed toward the fourth surface 614, i.e., toward the right side in the illustrated embodiment.

In the embodiment illustrated in FIGS. 33A and 34A, a direction of current is a direction from the second fixed contactor 22*b* to the first fixed contactor 22*a* via the movable contactor 43.

When the Fleming's left-hand rule is applied to the first fixed contactor 22*a*, an electromagnetic force generated in the vicinity of the first fixed contactor 22*a* is formed toward the front left side.

Accordingly, an arc path A.P generated in the vicinity of the first fixed contactor 22*a* is also formed toward the front left side.

Similarly, when the Fleming's left-hand rule is applied to the second fixed contactor 22*b*, an electromagnetic force generated in the vicinity of the second fixed contactor 22*b* is formed toward the rear right side.

Accordingly, an arc path A.P generated in the vicinity of the second fixed contactor 22*b* is also formed toward the rear right side.

In the embodiment illustrated in FIGS. 33B and 34B, a direction of current is a direction from the first fixed contactor 22*a* to the second fixed contactor 22*b* via the movable contactor 43.

When the Fleming's left-hand rule is applied to the first fixed contactor 22*a*, an electromagnetic force generated in the vicinity of the first fixed contactor 22*a* is formed toward the rear left side.

Accordingly, the arc path A.P generated in the vicinity of the first fixed contactor 22*a* is also formed toward the rear left side.

Similarly, when the Fleming's left-hand rule is applied to the second fixed contactor 22*b*, an electromagnetic force generated in the vicinity of the second fixed contactor 22*b* is formed toward the front right side.

Accordingly, the arc path A.P generated in the vicinity of the second fixed contactor 22*b* is also formed toward the front right side.

In the embodiment illustrated in FIGS. 35A and 36A, a direction of current is a direction from the second fixed contactor 22*b* to the first fixed contactor 22*a* via the movable contactor 43.

When the Fleming's left-hand rule is applied to the first fixed contactor 22*a*, an electromagnetic force generated in the vicinity of the first fixed contactor 22*a* is formed toward the rear left side.

Accordingly, the arc path A.P generated in the vicinity of the first fixed contactor 22*a* is also formed toward the rear left side.

Similarly, when the Fleming's left-hand rule is applied to the second fixed contactor 22*b*, an electromagnetic force generated in the vicinity of the second fixed contactor 22*b* is formed toward the front right side.

Accordingly, the arc path A.P generated in the vicinity of the second fixed contactor 22*b* is also formed toward the front right side.

In the embodiment illustrated in FIGS. 35B and 36B, a direction of current is a direction from the first fixed contactor 22*a* to the second fixed contactor 22*b* via the movable contactor 43.

When the Fleming's left-hand rule is applied to the first fixed contactor 22*a*, an electromagnetic force generated in the vicinity of the first fixed contactor 22*a* is formed toward the front left side.

Accordingly, the arc path A.P generated in the vicinity of the first fixed contactor 22*a* is also formed toward the front left side.

Similarly, when the Fleming's left-hand rule is applied to the second fixed contactor 22*b*, an electromagnetic force generated in the vicinity of the second fixed contactor 22*b* is formed toward the rear right side.

Accordingly, the arc path A.P generated in the vicinity of the second fixed contactor 22*b* is also formed toward the rear right side.

Although not illustrated in the drawing, when the polarity of each surface of the first and second Halbach arrays 620 and 630 and the first and second magnet units 640 and 650 is changed, the directions of the magnetic fields formed in the first and second Halbach arrays 620 and 630 and the first and second magnet units 640 and 650 are reversed. Accordingly, the generated electromagnetic force and the arc path A.P are also formed so that the front-rear direction thereof is reversed.

That is, in the electric connection situation shown in FIGS. 33A and 34A, the electromagnetic force and the arc path A.P in the vicinity of the first fixed contactor 22*a* are formed toward the rear left side. In addition, the electromagnetic force and the arc path A.P generated in the vicinity of the second fixed contactor 22*b* are formed toward the front right side.

Similarly, in the electric connection situation shown in FIGS. 33B and 34B, the electromagnetic force and the arc path A.P in the vicinity of the first fixed contactor 22*a* are formed toward the front left side. In addition, the electromagnetic force and the arc path A.P generated in the vicinity of the second fixed contactor 22*b* are formed toward the rear right side.

In addition, in the electric connection situation shown in FIGS. 35A and 36A, the electromagnetic force and the arc path A.P in the vicinity of the first fixed contactor 22*a* are formed toward the front left side. In addition, the electromagnetic force and the arc path A.P generated in the vicinity of the second fixed contactor 22*b* are formed toward the rear right side.

Similarly, in the electric connection situation shown in FIGS. 35B and 36B, the electromagnetic force and the arc path A.P in the vicinity of the first fixed contactor 22*a* are formed toward the rear left side. In addition, the electromagnetic force and the arc path A.P generated in the vicinity of the second fixed contactor 22*b* are formed toward the front right side.

Accordingly, in the arc path formation unit 600 according to the present embodiment, the electromagnetic force and the arc path A.P may be formed in a direction away from the central part C regardless of the polarity of each of the first and second Halbach arrays 620 and 630 and the first and second magnet units 640 and 650 or the direction of the current flowing through the direct current relay 1.

Accordingly, damage to each component of the direct current relay 1 disposed adjacent to the central part C can be prevented. Furthermore, since the generated arc can be quickly discharged to the outside, operational reliability of the direct current relay 1 can be improved.

Although it has been described above with reference to preferred embodiments of the present disclosure, it will be understood that those skilled in the art are able to variously modify and change the present disclosure without departing from the spirit and scope of the disclosure described in the claims below.

1: direct current relay
10: frame part
11: upper frame
12: lower frame
13: insulating plate
14: supporting plate
20: opening/closing part
21: arc chamber
22: fixed contactor
**22*a***: first fixed contactor
**22*b***: second fixed contactor
23: sealing member
30: core part
31: fixed core
32: movable core
33: yoke
34: bobbin
35: coil
36: return spring
37: cylinder
40: movable contactor part
41: housing
42: cover
43: movable contactor
44: shaft
45: elastic part
100: arc path formation unit according to one embodiment of present disclosure
110: magnet frame
111: first surface
112: second surface
113: third surface
114: fourth surface
115: space part
120: first Halbach array
121: first block
**121*a***: first inner surface
**121*b***: first outer surface
122: second block
**122*a***: second inner surface
**122*b***: second outer surface
123: third block
**123*a***: third inner surface
**123*b***: third outer surface
130: second Halbach array
131: first block
**131*a***: first inner surface
**131*b***: first outer surface
132: second block
**132*a***: second inner surface
**132*b***: second outer surface
133: third block
**133*a***: third inner surface
**133*b***: third outer surface
140: third Halbach array
141: first block
**141*a***: first inner surface
**141*b***: first outer surface
142: second block
**142*a***: second inner surface
**142*b***: second outer surface
143: Third block
**143*a***: third inner surface
**143*b***: third outer surface
200: arc path formation unit according to another embodiment of present disclosure
210: magnet frame
211: first surface
212: second surface
213: third surface
214: fourth surface
215: space part
220: first Halbach array
221: first block
**221*a***: first inner surface
**221*b***: first outer surface
222: second block
**222*a***: second inner surface
**222*b***: second outer surface
223: third block
**223*a***: third inner surface
**223*b***: third outer surface
230: second Halbach array
231: first block
**231*a***: first inner surface
**231*b***: first outer surface
232: second block
**232*a***: second inner surface
**232*b***: second outer surface
233: third block
**233*a***: third inner surface
**233*b***: third outer surface
240: magnet unit
241: facing surface
242: opposing surface
300: arc path formation unit according still another embodiment of present disclosure
310: magnet frame
311: first surface
312: second surface
313: third surface
314: fourth surface
315: space part
320: first Halbach array
321: first block
**321*a***: first inner surface
**321*b***: first outer surface
322: second block
**322*a***: second inner surface
**322*b***: second outer surface
323: third block
**323*a***: third inner surface
**323*b***: third outer surface
330: first magnet unit
331: first facing surface
332: first opposing surface
340: second magnet unit
341: second facing surface
342: second opposing surface
400: arc path formation unit according yet another embodiment of present disclosure
410: magnet frame
411: first surface

412: second surface
413: third surface
414: fourth surface
415: space part
420: first Halbach array
421: first block
421*a*: first inner surface
421*b*: first outer surface
422: second block
422*a*: second inner surface
422*b*: second outer surface
423: Third block
423*a*: third inner surface
423*b*: third outer surface
430: first magnet unit
431: first facing surface
432: first opposing surface
440: second magnet unit
441: second facing surface
442: second opposing surface
500: arc path formation unit according to yet another embodiment of present disclosure
510: magnet frame
511: first surface
512: second surface
513: third surface
514: fourth surface
515: space part
520: first Halbach array
521: first block
521*a*: first inner surface
521*b*: first outer surface
522: second block
522*a*: second inner surface
522*b*: second outer surface
523: Third block
523*a*: third inner surface
523*b*: third outer surface
530: second Halbach array
531: first block
531*a*: first inner surface
531*b*: first outer surface
532: second block
532*a*: second inner surface
532*b*: second outer surface
533: Third block
533*a*: third inner surface
533*b*: third outer surface
540: third Halbach array
541: first block
541*a*: first inner surface
541*b*: first outer surface
542: second block
542*a*: second inner surface
542*b*: second outer surface
543: third block
343*a*: third inner surface
543*b*: third outer surface
550: magnet unit
551: facing surface
552: opposing surface
600: arc path formation unit according yet another embodiment of present disclosure
610: magnet frame
611: first surface
612: second surface
613: third surface
614: fourth surface
615: space part
620: first Halbach array
621: first block
621*a*: first inner surface
621*b*: first outer surface
622: second block
622*a*: second inner surface
622*b*: second outer surface
623: Third block
623*a*: third inner surface
623*b*: third outer surface
630: second Halbach array
631: first block
631*a*: first inner surface
631*b*: first outer surface
632: second block
632*a*: second inner surface
632*b*: second outer surface
633: Third block
633*a*: third inner surface
640: first magnet unit
641: first facing surface
642: first opposing surface
650: second magnet unit
651: second facing surface
652: second opposing surface
1000: direct current relay according to related art
1100: fixed contact according to related art
1200: movable contact according to related art
1300: permanent magnet according to related art
1310: first permanent magnet according to related art
1320: second permanent magnet according to related art
C: central part of each of space parts 115, 215, 315, 415, 515, and 615
A.P: arc path

The invention claimed is:

1. An arc path formation unit comprising:

a magnet frame having a space part, in which a fixed contactor and a movable contactor are accommodated, formed therein; and a Halbach array located in the space part of the magnet frame and configured to form a magnetic field in the space part, wherein a length of the space part in a first direction is formed to be greater than a length thereof in a second direction, wherein the magnet frame includes:

a first surface and a second surface which extend in the first direction, are disposed to face each other, and are configured to surround a portion of the space part; and a third surface and a fourth surface which extend in the second direction, are continuous with the first surface and the second surface, respectively, are disposed to face each other, and are configured to surround a remaining portion of the space part, wherein the fixed contactor includes:

a first fixed contactor located closer to the fourth surface than to the third surface; and a second fixed contactor located closer to the third surface than to the fourth surface; and wherein the Halbach array includes:

a first Halbach array located adjacent to the first surface, located closer to the fourth surface than to the third surface;

a second Halbach array located adjacent to the second surface, located closer to the fourth surface than to the third surface, and disposed to face the first Halbach array with the first fixed contactor therebetween; and a third Halbach array located adjacent to the third surface, wherein each of the first Halbach array, the second Halbach array, and the third Halbach array comprises:

a first block;

a second block disposed adjacent to the first block, wherein with a first magnetic pole of the first block is directed toward the second block, wherein the first magnetic pole of the second block is directed toward the first fixed contactor; and a third block disposed adjacent to the second block, with the first magnetic pole of the third block directed toward the second block, wherein:

the first Halbach array is located on a first half of the first surface that is located closer to the fourth surface than to the third surface;

a second half of the first surface extends from the first half of the first surface to the third surface and is free of magnets;

the second Halbach array located on a first half of the second surface, located closer to the fourth surface than to the third surface;

a second half of the second surface extends from the first half of the second surface to the third surface and is free of magnets;

the first fixed contactor is disposed between the first half of the first surface and the first half of the second surface and not disposed between the second half of the first surface and the second half of the second surface; and the second fixed contactor is disposed between the second half of the first surface and the second half of the second surface and not disposed between the first half of the first surface and the first half of the second surface.

2. The arc path formation unit of claim 1, comprising a magnet unit provided separately from the Halbach array, located in the space part of the magnet frame to form a magnetic field in the space part, located adjacent to the fourth surface, and disposed to overlap the first fixed contactor and the third Halbach array in the first direction.

3. A direct current relay comprising:

a plurality of fixed contactors located to be spaced apart from each other in a first direction;

a movable contactor configured to be brought into contact with or separated from the fixed contactors;

a magnet frame having a space part, in which the fixed contactors and the movable contactor are accommodated, formed therein; and a Halbach array located in the space part of the magnet frame and configured to form a magnetic field in the space part, wherein a length of the space part in the first direction is formed to be greater than a length thereof in a second direction, wherein the magnet frame includes:

a first surface and a second surface which extend in the first direction, are disposed to face each other, and are configured to surround a portion of the space part; and a third surface and a fourth surface which extend in the second direction, are continuous with the first surface and the second surface, respectively, are disposed to face each other, and are configured to surround a remaining portion of the space part, wherein the plurality of fixed contactors includes:

a first fixed contactor located closer to the fourth surface than to the third surface; and a second fixed contactor located closer the third surface than to the fourth surface, and wherein the Halbach array includes:

a first Halbach array located adjacent to the first surface, located closer to the fourth surface than to the third surface;

a second Halbach array located adjacent to the second surface, located closer to the fourth surface than to the third surface, and disposed to face the first Halbach array with the first fixed contactor therebetween; and a third Halbach array located adjacent to the third surface, wherein each of the first Halbach array, the second Halbach array, and the third Halbach array includes:

a first block;

a second block disposed adjacent to the first block, wherein with a first magnetic pole of the first block is directed toward the second block, wherein the first magnetic pole of the second block is directed toward the first fixed contactor; and a third block disposed adjacent to the second block, with the first magnetic pole of the third block directed toward the second block, wherein:

the first Halbach array is located on a first half of the first surface that is located closer to the fourth surface than to the third surface;

a second half of the first surface extends from the first half of the first surface to the third surface and is free of magnets;

the second Halbach array located on a first half of the second surface, located closer to the fourth surface than to the third surface;

a second half of the second surface extends from the first half of the second surface to the third surface and is free of magnets;

the first fixed contactor is disposed between the first half of the first surface and the first half of the second surface and not disposed between the second half of the first surface and the second half of the second surface; and the second fixed contactor is disposed between the second half of the first surface and the second half of the second surface and not disposed between the first half of the first surface and the first half of the second surface.

4. The direct current relay of claim 3, comprising a magnet unit provided separately from the Halbach array, located in the space part of the magnet frame to form a magnetic field in the space part, located adjacent to the third surface, and disposed to overlap the first fixed contactor and the third Halbach array in the first direction, wherein:

among surfaces of the magnet unit, a surface facing the space part has a second magnetic polarity, the second magnetic polarity being opposite to the first magnetic polarity.

* * * * *